United States Patent
Nakagami et al.

(10) Patent No.: US 10,666,959 B2
(45) Date of Patent: *May 26, 2020

(54) IMAGE CODING APPARATUS AND METHOD, AND IMAGE DECODING APPARATUS AND METHOD

(71) Applicant: SONY CORPORATION, Tokyo (JP)

(72) Inventors: Ohji Nakagami, Tokyo (JP); Shinobu Hattori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/219,330

(22) Filed: Dec. 13, 2018

(65) Prior Publication Data

US 2019/0132601 A1     May 2, 2019

Related U.S. Application Data

(63) Continuation of application No. 15/116,285, filed as application No. PCT/JP2015/001397 on Mar. 12, 2015, now Pat. No. 10,230,968.

(30) Foreign Application Priority Data

Mar. 24, 2014   (JP) ................................ 2014-060644

(51) Int. Cl.
| | |
|---|---|
| H04N 7/12 | (2006.01) |
| H04N 11/02 | (2006.01) |
| H04N 11/04 | (2006.01) |
| H04N 19/39 | (2014.01) |
| H04N 19/70 | (2014.01) |
| H04N 19/30 | (2014.01) |

(Continued)

(52) U.S. Cl.
CPC ............. *H04N 19/39* (2014.11); *H04N 19/30* (2014.11); *H04N 19/46* (2014.11); *H04N 19/70* (2014.11); *H04N 19/17* (2014.11)

(58) Field of Classification Search
None
See application file for complete search history.

(56) References Cited

U.S. PATENT DOCUMENTS

| | | |
|---|---|---|
| 2011/0063407 A1 | 3/2011 | Wang |
| 2012/0230431 A1 | 9/2012 | Boyce et al. |

(Continued)

FOREIGN PATENT DOCUMENTS

CN       101588252 A       11/2009

OTHER PUBLICATIONS

Jul. 29, 2019, European Search Report issued for related EP Application No. 19178458.6.

(Continued)

*Primary Examiner* — Chikaodili E Anyikire
(74) *Attorney, Agent, or Firm* — Paratus Law Group, PLLC

(57) ABSTRACT

There is provided an image coding apparatus including: circuitry configured to set a correspondence relationship between resolution information and an enhancement layer, in a case where the number of the layers is greater than the number of multiple candidates for the resolution information on a layer of an image; and code the image and generate a bitstream including information relating to the set correspondence relationship.

15 Claims, 48 Drawing Sheets

(51) Int. Cl.
*H04N 19/46* (2014.01)
*H04N 19/17* (2014.01)

(56) References Cited

U.S. PATENT DOCUMENTS

| | | | |
|---|---|---|---|
| 2013/0182755 A1* | 7/2013 | Chen .................. | H04N 19/70 375/240.01 |
| 2015/0063453 A1 | 3/2015 | Kang et al. | |
| 2015/0078457 A1* | 3/2015 | Hendry .............. | H04N 19/597 375/240.25 |
| 2015/0103886 A1* | 4/2015 | He ..................... | H04N 19/46 375/240.02 |
| 2016/0212437 A1 | 7/2016 | Tsukuba et al. | |

OTHER PUBLICATIONS

Nov. 27, 2018, Chinese Office Action issued for related CN application No. 201580014245.2.
Apr. 3, 2018, Japanese Office Action issued for related JP Application No. 2017-095641.
Aug. 15, 2017, SG communication issued for related SG application No. 11201607801U.
Feb. 14, 2017, Japanese communication issued for related JP application No. 2014-060644.
Nov. 29, 2016, Japanese communication issued for related JP application No. 2014-060644.
Cho et al., MV-HEVC/SHVC HLS: VPS extension clean-up, Joint Collaborative Team on Video Coding (JCT-VC) of ITU-T SG 16 WP 3 and ISO/IEC JTC 1/SC 29/WG 11, 15$^{th}$ Meeting, Oct. 23-Nov.1, 2013, pp. 1-6, Geneva, CH.
Cho et al., MV-HEVC/SHVC HLS: VPS extension clean-up, Joint Collaborative Team on 3D Video Coding Extensions of ITU-T SG 16 WP 3 and ISO/IEC JTC 1/SC 29/WG 11, 6$^{th}$ Meeting, Oct. 25-Nov.1, 2013, pp. 1-6, Geneva, CH.
Chen et al., "High efficiency video coding (HEVC) scalable extensions Draft 5", Joint Collaborative Team on Video Coding (JCT-VC) of ITU-T SG16 WP3 and ISO/IEC JTC1/SC29/WG11, Jan. 9-17, 2014, pp. i-119, 16$^{th}$ Meeting: San Jose, US.
Ramasubramonian et al., "MV-HEVC/SHVC HLS: Representation format information in VPS", Joint Collaborative Team on Video Coding (JCT-VC) of ITU-T SG16 WP3 and ISO/IEC JTC1/SC29/WG11, Jul. 25-Aug. 2, 2013, pp. 1-5, 14$^{th}$ Meeting: Vienna, AT.
Boyace et al., "Layers display info SEI message", Joint Collaborative Team on Video Coding (JCT-VC) of ITU-T SG16 WP3 and ISO/IEC JTC1/SC29/WG11, Apr. 18-26, 2013, pp. 1-3, 13$^{th}$ Meeting: Incheon, KR.

* cited by examiner

FIG. 2

| | |
|---|---|
| rep_format_idx_present_flag | u(1) |
| if(rep_format_idx_present_flag) | |
|   vps_num_rep_formats_minus1 | ue(v) |
| for( i = 0; i <= vps_num_rep_formats_minus1; i++) | |
|   rep_format( ) | |
| if(rep_format_idx_present_flag) | |
|   for( i = 1; i <= MaxLayersMinus1; i++) | |
|     if(vps_num_rep_formats_minus1 > 0) | |
|       vps_rep_format_idx[i] | u(v) |

FIG. 3

| | |
|---|---|
| if(nuh_layer_id>0) { | |
| update_rep_format_flag | u(1) |
| if(update_rep_format_flag) | |
| sps_rep_format_idx | u(8) |
| } else { | |
| chroma_format_idc | ue(v) |
| if(chroma_format_idc == 3) | |
| separate_colour_plane_flag | u(1) |
| pic_width_in_luma_samples | ue(v) |
| pic_height_in_luma_samples | ue(v) |
| } | |

FIG. 4

VPS

- rep_format_idx_present_flag equal to 1 specifies that the syntax elements vps_num_rep_formats_minus1 and vps_rep_format_idx[i] are present. rep_format_idx_present_flag equal to 0 specifies that the syntax elements vps_num_rep_formats_minus1 and vps_rep_format_idx[i] are not present.

- vps_num_rep_formats_minus1 plus 1 specifies the number of the following rep_format( ) syntax structures in the VPS. When not present, the value of vps_num_rep_formats_minus1 is inferred to be equal to MaxLayersMinus1. The value of vps_num_rep_formats_minus1 shall be in the range of 0 to 255, inclusive.

- vps_rep_format_idx[i] specifies the index, into the list of rep_format( ) syntax structures in the VPS, of the rep_format( ) syntax structure that applies to the layer with nuh_layer_id equal to layer_id_in_nuh[i]. When not present, the value of vps_rep_format_idx[i] is inferred to be equal to (rep_format_idx_present_flag ? 0 : i). The value of vps_rep_format_idx[i] shall be in the range of 0 to vps_num_rep_formats_minus1, inclusive. The number of bits used for the representation of vps_rep_format_idx[i] is Ceil(Log2(vps_num_rep_formats_minus1+1)).

SPS

- update_rep_format_flag equal to 1 specifies that sps_rep_format_idx is present and that the sps_rep_format_idx-th rep_format( ) syntax structures in the active VPS applies to the layers that refer to this SPS. update_rep_format_flag equal to 0 specifies that sps_rep_format_idx is not present. When not present, the value of update_rep_format_flag is inferred to be equal to 0.

FIG. 12

| | |
|---|---|
| vps_num_rep_formats_minus1 | ue(v) |
| for( i = 0; i <= vps_num_rep_formats_minus1; i++ ) | |
|   rep_format( ) | |
|   if( vps_num_rep_formats_minus1 > 0 ) | |
|     rep_format_idx_present_flag | u(1) |
| if( rep_format_idx_present_flag ) | |
|   for( i = 1; i <= MaxLayersMinus1; i++ ) | |
|     vps_rep_format_idx[ i ] | u(v) |

FIG. 13

| | |
|---|---|
| if(nuh_layer_id>0){ | |
| update_rep_format_flag | u(1) |
| if(update_rep_format_flag) | |
| sps_rep_format_idx | u(8) |
| } else { | |
| chroma_format_idc | ue(v) |
| if(chroma_format_idc == 3) | |
| separate_colour_plane_flag | u(1) |
| pic_width_in_luma_samples | ue(v) |
| pic_height_in_luma_samples | ue(v) |
| } | |

FIG. 14

VPS
- vps_num_rep_formats_minus1 plus 1 specifies the number of the following rep_format( ) syntax structures in the VPS. The value of vps_num_rep_formats_minus1 shall be in the range of 0 to 255, inclusive.
- rep_format_idx_present_flag equal to 1 specifies that the syntax elements vps_rep_format_idx[i] is present. rep_format_idx_present_flag equal to 0 specifies that the syntax element vps_rep_format_idx[i] is not present. When not present, the value of rep_format_idx_present_flag is inferred to be equal to 0.
- vps_rep_format_idx[i] specifies the index, into the list of rep_format( ) syntax structures in the VPS, of the rep_format( ) syntax structure that applies to the layer with nuh_layer_id equal to layer_id_in_nuh[i]. The value of vps_rep_format_idx[i] shall be in the range of 0 to vps_num_rep_formats_minus1, inclusive. The number of bits used for the representation of vps_rep_format_idx[i] is Ceil(Log2(vps_num_rep_formats_minus1+1)). When not present, the value of vps_rep_format_idx[i] is inferred to be equal to (rep_format_idx_present_flag ? 0 : Min (i, vps_num_rep_formats_minus1)).

SPS
- update_rep_format_flag equal to 1 specifies that sps_rep_format_idx is present and that the sps_rep_format_idx-th rep_format( ) syntax structures in the active VPS applies to the layers that refer to this SPS. update_rep_format_flag equal to 0 specifies that sps_rep_format_idx is not present. When not present, the value of update_rep_format_flag is inferred to be equal to 0. If the value of vps_num_rep_formats_minus1 in the active VPS is equal to 0, the value of update_rep_format_flag shall be equal to 0.

FIG. 15

SNR/VIEW SCALABILITY (ALL LAYERS HAVE THE SAME RESOLUTION), 3 LAYER

| Layer0 | Layer1 | Layer2 |
|---|---|---|
| W*H | W*H | W*H |

VALUE TO SEND ("—" INDICATES THAT DECODER PERFORMS ESTIMATION WITHOUT VALUE BEING TRANSFERRED)

| Syntax | METHOD 1 | METHOD 2 | METHOD 3 |
|---|---|---|---|
| rep_format_idx_present_flag | 1 | 1 | — |
| vps_num_rep_formats_minus1 | 0 | (MaxLayersMinus1 = 3 − 1 = 2) (ESTIMATION AT DECODER SIDE) | NO TRANSFER 0 |
| 0th rep_format() | W*H | W*H | W*H |
| 1st rep_format() | — | W*H | — |
| 2nd rep_format() | — | W*H | — |
| vps_rep_format_idx[0] | — (DECODER ESTIMATES THAT Layer0 USES 0th rep_format) | — (DECODER ESTIMATES THAT Layer0 USES 0th rep_format) | — (DECODER ESTIMATES THAT Layer0 USES 0th rep_format) |
| vps_rep_format_idx[1] | — (DECODER ESTIMATES THAT Layer1 USES 0th rep_format) | — (DECODER ESTIMATES THAT Layer1 USES 1st rep_format) | — (DECODER ESTIMATES THAT Layer1 USES 0th rep_format) |
| vps_rep_format_idx[2] | — (DECODER ESTIMATES THAT Layer2 USES 0th rep_format) | — (DECODER ESTIMATES THAT Layer2 USES 3rd rep_format) | — (DECODER ESTIMATES THAT Layer2 USES 0th rep_format) |

FIG. 16

SPATIAL AND SNR SCALABILITY, 3 LAYER

Layer0 W*H   Layer1 2W*2H   Layer2 2W*2H

VALUE TO SEND ("—" INDICATES THAT DECODER PERFORMS ESTIMATION WITHOUT VALUE BEING TRANSFERRED)

| Syntax | METHOD 1 | METHOD 2 | METHOD 3 |
|---|---|---|---|
| rep_format_idx_present_flag | 1 | 0 | 0 |
| vps_num_rep_formats_minus1 | 1 | (MaxLayersMinus1=3−1=2) (ESTIMATION AT DECODER SIDE) | 1 |
| 0th rep_format() | W*H | W*H | W*H |
| 1st rep_format() | 2W*2H | 2W*2H | 2W*2H |
| 2nd rep_format() | | 2W*2H | — |
| vps_rep_format_idx[0] | (DECODER ESTIMATES THAT Layer0 USES 0th rep_format) | (DECODER ESTIMATES THAT Layer0 USES 0th rep_format) | (DECODER ESTIMATES THAT Layer0 USES 0th rep_format) |
| vps_rep_format_idx[1] | 1 | (DECODER ESTIMATES THAT Layer1 USES 1st rep_format) | (DECODER ESTIMATES THAT Layer1 USES 1st rep_format) |
| vps_rep_format_idx[2] | 1 | (DECODER ESTIMATES THAT Layer2 USES 3rd rep_format) | (DECODER ESTIMATES THAT Layer2 USES 1st rep_format) |

FIG. 17

SPATIAL SCALABILITY, 2 LAYER (REPRESENTATIONS ARE OF THREE TYPES)

Layer0: W*H
Layer1: 2W*2H
[RESOLUTION THAT HAS THE LIKELIHOOD OF BEING CHANGED ALONG THE WAY]: 3W*3H VALUE TO SEND ("—" INDICATES THAT DECODER PERFORMS ESTIMATION WITHOUT VALUE BEING TRANSFERRED)

| Syntax | METHOD 1 | METHOD 2 | METHOD 3 |
|---|---|---|---|
| rep_format_idx_present_flag | 1 | 0 | 0 |
| vps_num_rep_formats_minus1 | 2 | | 2 |
| 0th rep_format() | W*H | | W*H |
| 1st rep_format() | 2W*2H | NO EXPRESSION | 2W*2H |
| 2nd rep_format() | 3W*3H | | 3W*3H |
| vps_rep_format_idx[0] | — (DECODER ESTIMATES THAT Layer0 USES 0th rep_format) | | — (DECODER ESTIMATES THAT Layer0 USES 0th rep_format) |
| vps_rep_format_idx[1] | 1 | | — (DECODER ESTIMATES THAT Layer1 USES 1st rep_format) |
| vps_rep_format_idx[2] | — | | — |

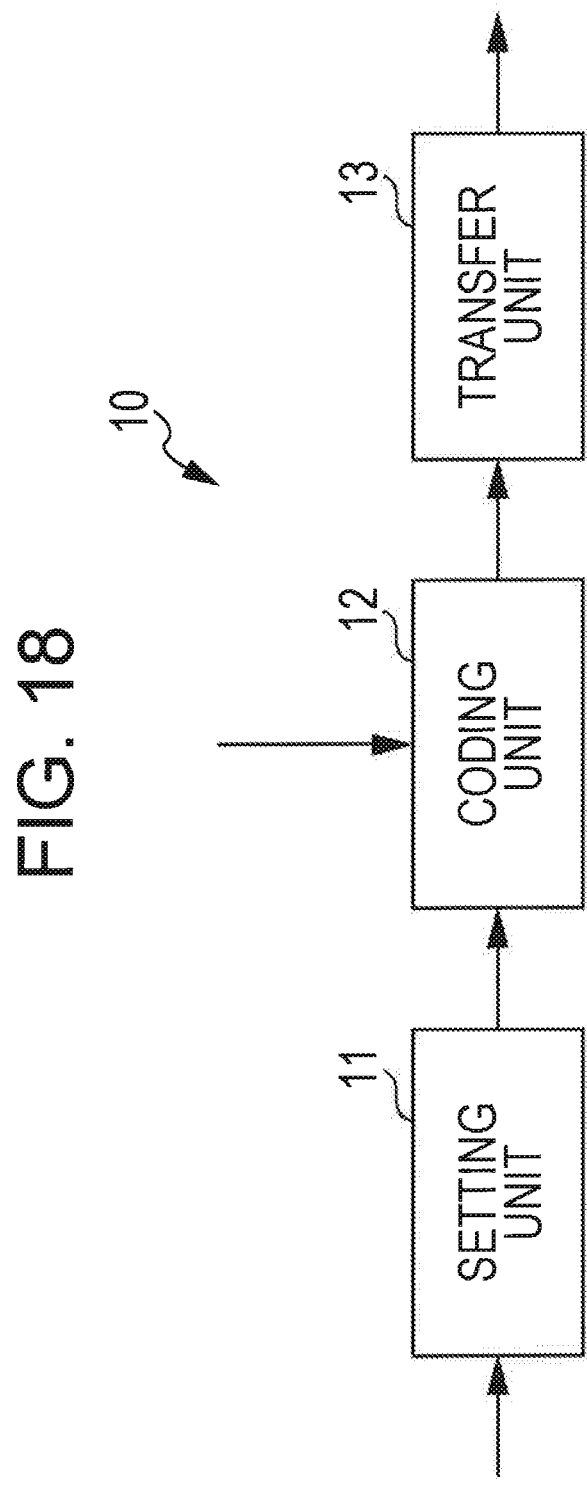

IMAGE CODING APPARATUS AND METHOD, AND IMAGE DECODING APPARATUS AND METHOD

CROSS REFERENCE TO PRIOR APPLICATION

This application is a continuation of U.S. patent application Ser. No. 15/116,285 (filed on Aug. 3, 2016), which is a National Stage patent application of PCT International Patent Application No. PCT/JP2015/001397 (filed on Mar. 12, 2015) under 35 U.S.C. § 371, which claims priority to Japanese Patent Application No. 2014-060644 (filed on Mar. 24, 2014), which are all hereby incorporated by reference in their entirety.

TECHNICAL FIELD

The present disclosure relates to an image coding apparatus and method and an image decoding apparatus and method, and more particularly to an image coding apparatus and method for, and an image decoding apparatus and method for improving default mapping between an enhancement layer and resolution information.

BACKGROUND ART

In recent years, an apparatus has become widespread that handles image information as digital information, and in such a case, compression-codes an image for highly efficient transfer and storage of information by using redundancy specific to the image information and by employing a coding scheme that performs compression by orthogonal transformation such as a discrete cosine transformation, and motion compensation. As the coding scheme, for example, there are Moving Picture Experts Group (MPEG) or H.264, MPEG-4 Part 10 (Advanced Video Coding, hereinafter referred to as AVC), and the like.

Thus, for the purpose of improving coding efficiency to higher than in H.264/AVC, a coding scheme called High Efficiency Video Coding (HEVC) is currently in the process of standardization, which is being undertaken by the Joint Collaboration Team-Video Coding (JCTVC) that is a standardization body that is working in cooperation with ITU-T and ISO/IEC.

Incidentally, an image coding scheme such as MPEG-2 or AVC has a scalability function in which an image is hierarchically divided into multiple layers and the multiple-layered image is coded.

In scalable extension (SHVC) or MV-HEVC associated with such HEVC, because an outline of a bitstream can be understood only in a VPS, a structure is provided in which resolution information (rep_format) on each enhancement layer is described in VPS_EXT.

For example, two types of method of mapping the enhancement layer and the resolution information onto each other are as follows. That is, the first type is a method of specifying a value for every layer with VPS_EXT. The second type is a method of pointing to transfer-finished rep_format information in an SPS of the enhancement layer and overwriting VPS information, with VPS_EXT. NPL 1 is the related art of the present disclosure.

CITATION LIST

Non Patent Literature

NPL 1: J. Chen, J. Boyce, Y. Ye, M. M. Hannuksela, G. J. Sullivan, Y.-K. Wang (editors), "High efficiency video coding (HEVC) scalable extension Draft 5", JCTVC-P1008_v4, January 2014.

SUMMARY OF INVENTION

Technical Problem

However, for information on the default mapping between the enhancement layer and the resolution information, which is described above, a flag like rep_format_idx_present_flag, a relationship between the number of the pieces of resolution information and the number of the layers, or the like is used, but because these are insufficient, there is room for improvement.

It is desirable to improve default mapping between an enhancement layer and resolution information.

Solution to Problem

According to an embodiment of the present disclosure, there is provided an image coding apparatus including: circuitry configured to set a correspondence relationship between resolution information and an enhancement layer, in a case where the number of the layers is greater than the number of multiple candidates for the resolution information on a layer of an image; and code the image and generate a bitstream including information relating to the set correspondence relationship.

According to another embodiment of the present disclosure, there is provided an image coding method including: setting a correspondence relationship between resolution information and an enhancement layer, in a case where the number of the layers is greater than the number of multiple candidates for the resolution information on a layer of an image; coding the image and generating a bitstream including information relating to the correspondence relationship that is set.

According to another embodiment of the present disclosure, there is provided an image decoding apparatus including: circuitry configured to extract, from a bitstream generated by coding an image, information relating to a correspondence relationship between resolution information and an enhancement layer, wherein the correspondence information is set in a case where the number of the layers is greater than the number of multiple candidates for the resolution information on a layer of the image; and decode the bitstream using the extracted information relating to the correspondence relationship between the resolution information and the enhancement layer.

According to another embodiment of the present disclosure, there is provided an image decoding method including: extracting, from a bitstream generated by coding an image, information relating to a correspondence relationship between resolution information and an enhancement layer, wherein the correspondence information is set in a case where the number of the layers is greater than the number of multiple candidates for the resolution information on a layer of the image; and decoding the bitstream using the extracted information relating to the correspondence relationship between the resolution information and the enhancement layer.

According to another embodiment of the present disclosure, there is provided a non-transitory computer-readable medium having embodied thereon a program, which when executed by a computer causes the computer to execute an image coding method, the method including: setting a correspondence relationship between resolution information and an enhancement layer, in a case where the number of the layers is greater than the number of multiple candidates for the resolution information on a layer of an image; coding the image and generating a bitstream including information relating to the correspondence relationship that is set.

According to another embodiment of the present disclosure, there is provided a non-transitory computer-readable medium having embodied thereon a program, which when executed by a computer causes the computer to execute an image decoding method, the method including: extracting, from a bitstream generated by coding an image, information relating to a correspondence relationship between resolution information and an enhancement layer, wherein the correspondence information is set in a case where the number of the layers is greater than the number of multiple candidates for the resolution information on a layer of the image; and decoding the bitstream using the extracted information relating to the correspondence relationship between the resolution information and the enhancement layer.

According to another embodiment of the present disclosure, there is provided an image coding apparatus including: a setting unit configured to set a correspondence relationship between resolution information and an enhancement layer, in a case where the number of the layers is greater than the number of multiple candidates for the resolution information on a layer of an image; and a coding unit configured to code the image and generate a bitstream including information relating to the correspondence relationship that is set by the setting unit.

According to another embodiment of the present disclosure, there is provided an image coding apparatus including: circuitry configured to set a correspondence relationship between resolution information and an enhancement layer, in a case where the number of the layers is greater than the number of multiple candidates for the resolution information on a layer of an image; automatically map the layers and the multiple candidates onto each other; and code the image and generate a bitstream including information relating to the set correspondence relationship.

According to another embodiment of the present disclosure, there is provided an image coding apparatus including: circuitry configured to set a correspondence relationship between Rep_formats on a layer of an image and an enhancement layer, in a case where a number of Rep_formats is less than the number of the layers; and code the image and generate a bitstream including information relating to the set correspondence relationship, wherein in a case where the number of Rep_formats is less than the number of the layers, the correspondence relationship between the Rep_formats and the enhancement layer is set, beginning with a leading candidate, and an automatic mapping is performed between the Rep_formats and the layers.

According to another embodiment of the present disclosure, there is provided an image coding apparatus including: a setting unit that sets a correspondence relationship between resolution information and an enhancement layer in a case where multiple candidates for the resolution information on a layer of an image are present, and the number of the layers is greater than the number of the candidates; a coding unit that codes the image and generates a bitstream; and a transfer unit that transfers information relating to the correspondence relationship that is set by the setting unit and the bitstream that is generated by the coding unit.

In a case where the number of the candidates is greater than the number of the layers, the setting unit may set the correspondence relationship between the resolution information and the enhancement layer, beginning with the leading candidate.

In a case where multiple candidates are present, the setting unit may set information that indicates whether or not the correspondence relationship between the resolution information and the enhancement layer is present.

In a case where the number of the candidates is 1, the setting unit may prohibit updating of the correspondence relationship between the resolution information and the enhancement layer in a sequence parameter set.

According to another embodiment of the present disclosure, there is provided an image coding method causing an image coding apparatus to perform: setting a correspondence relationship between resolution information and an enhancement layer in a case where multiple candidates for the resolution information on a layer of an image are present, and the number of the layers is greater than the number of the candidates; coding the image and generating a bitstream; and transferring information relating to the correspondence relationship that is set and the generated bitstream.

According to a further embodiment of the present disclosure, there is provided an image decoding apparatus including: a receiving unit that receives a bitstream generated by coding an image; an extraction unit that extracts information relating to a correspondence relationship between resolution information and an enhancement layer from the bitstream received by the receiving unit, which is set in a case where multiple candidates for the resolution information on a layer of the image are present, and the number of the layers is greater than the number of the candidates; and a decoding unit that decodes the bitstream received by the receiving unit and generates the image, using the information relating to the correspondence relationship between the resolution information and the enhancement layer, which is extracted by the extraction unit.

In a case where the number of the candidates is greater than the number of the layers, the correspondence relationship between the resolution information and the enhancement layer may be set, beginning with the leading candidate.

In a case where multiple candidates are present, information may be set that indicates whether or not the correspondence relationship between the resolution information and the enhancement layer is present.

In a case where the number of the candidates is 1, updating of the correspondence relationship between the resolution information and the enhancement layer in a sequence parameter set may be prohibited.

According to a still further embodiment of the present disclosure, there is provided an image decoding method causing an image decoding apparatus to perform: receiving a bitstream generated by coding an image; extracting information relating to a correspondence relationship between resolution information and an enhancement layer from the bitstream received by the receiving unit, which is set in a case where multiple candidates for the resolution information on a layer of the image are present, and the number of the layers is greater than the number of the candidates; and decoding the bitstream and generating the image, using the extracted information relating to the correspondence relationship between the resolution information and the enhancement layer.

According to an embodiment of the present disclosure, in a case where multiple candidates for the resolution information on the layer of the image are present and the number of the layers is greater than the number of the candidates, the correspondence relationship between the resolution information and the enhancement layer is set. Then, the image is coded, the bitstream is generated, and the information relating to the correspondence being set and the generated bitstream are transferred.

According to a further embodiment of the present disclosure, the image is coded, the generated bitstream is received, and the information relating to the correspondence relationship between the resolution information and the enhancement layer, which is set in a case where multiple candidates for the resolution information on the layer of the image are present and the number of the layers is greater than the number of the candidates, is extracted from the received bitstream. Then, the bitstream is decoded, and the image is generated, using the extracted information relating to the correspondence relationship between the resolution information and the enhancement layer.

Moreover, the image coding apparatus and the image decoding apparatus, which are described above, may be an independent image processing apparatus, and may be an internal block that makes up one image coding apparatus or image decoding apparatus.

Advantageous Effects of Invention

According to a further embodiment of the present disclosure, the image can be coded. Particularly, the default mapping between the enhancement layer and the resolution information is improved.

According to an embodiment of the present disclosure, the image can be decoded. Particularly, the default mapping between the enhancement layer and the resolution information is improved.

Moreover, these effects are no necessarily limited, and any effects that are described in the present disclosure may be possible.

BRIEF DESCRIPTION OF DRAWINGS

FIG. 2 is a diagram illustrating an example of syntax of VPS_EXT.

FIG. 3 is a diagram illustrating an example of syntax of an SPS associated with an RBSP.

FIG. 4 is a diagram illustrating an example of semantics.

FIG. 12 is a diagram illustrating an example of the syntax according to the present technology.

FIG. 13 is a diagram illustrating an example of the syntax according to the present technology.

FIG. 14 is a diagram illustrating an example of semantics according to the present technology.

FIG. 15 is a diagram illustrating a specific example.

FIG. 16 is a diagram illustrating a specific example.

FIG. 17 is a diagram illustrating a specific example.

FIG. 18 is a block diagram illustrating a configuration example of a coding apparatus according to a first embodiment, to which the present disclosure is applied.

DESCRIPTION OF EMBODIMENTS

Embodiments according to the present disclosure (hereinafter referred to as embodiments) are described below. An order in which descriptions are provided is as follows.
 0. Outline
 1. First Embodiment (Coding Apparatus or Decoding Apparatus)
 2. Second Embodiment (Computer)
 3. Third Embodiment (Multiview Image Coding Apparatus or Multiview Image Decoding Apparatus)
 4. Fourth Embodiment (Layered image Coding Apparatus or Layered Image Decoding Apparatus)
 5. Fifth Embodiment (Television Apparatus)
 6. Sixth Embodiment (Portable Telephone)
 7. Seventh Embodiment (Recording and Reproducing Apparatus)
 8. Eighth Embodiment (Imaging Apparatus)
 9. Application Example of Scalable Coding
 10. Other Examples 0. Outline (Coding Scheme)

The present technology is described below with an example in which the present technology is applied to image coding/decoding in accordance with a High Efficiency Video Coding (HEVC) scheme.

(Description of Coding Unit)

Figure 1:
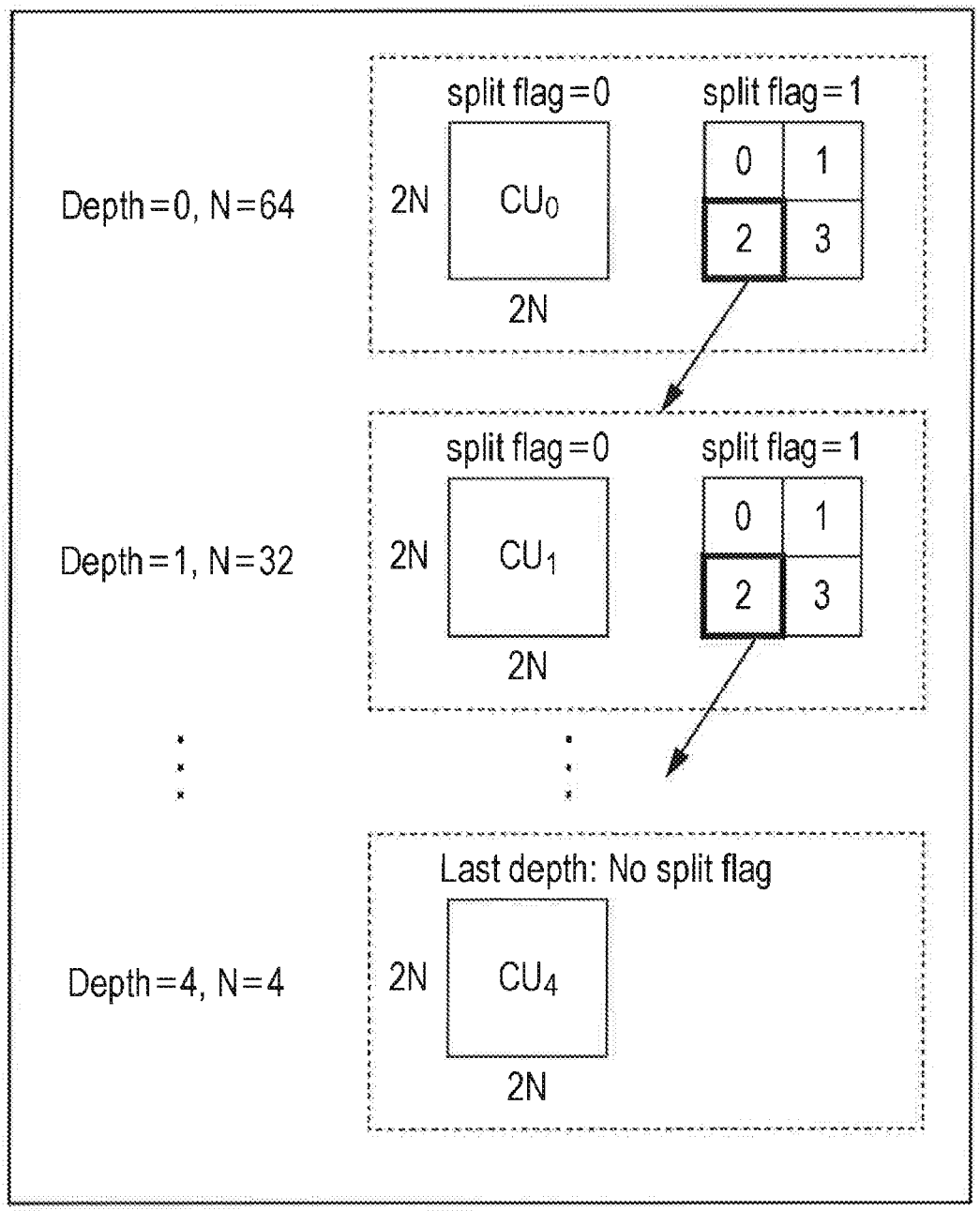
FIG. 1 is a diagram for describing a configuration example of a coding unit.

FIG. 1 is a diagram for describing a coding unit (CU) in the HEVC scheme.

Because the HEVC scheme is also for an image in a large-sized picture frame, such as with an Ultra High Definition (UHD) of 4,000*2,000 pixels, it is not optimal for fixing a size of the coding unit at 16*16 pixels. Therefore, in the HEVC scheme, the CU is defined as the coding unit.

The CU plays the same role as a macroblock in an AVC scheme. Specifically, the CU is divided into PU's or is divided into TU's.

However, the size of the CU is a square that is expressed by the number of pixels to the power of 2 that is variable for every sequence. Specifically, the CU is set by dividing an LCU, that is, a maximum-sized CU, an arbitrary number of times by 2 in the horizontal direction and in the vertical direction in such a manner that LCU that is a maximum-sized CU does not become smaller than a smallest coding unit (SCU) that is a minimum-sized CU. That is, the size of the CU is a size at an arbitrary level of hierarchy that results when layering is performed until the LCU becomes the SCU in such a manner that a size at a high level of hierarchy is ¼ of a size at a low level of hierarchy.

For example, in FIG. 1, the size of the LCU is 128, and the size of the SCU is 8. Therefore, a hierarchy depth of the LCU is 0 to 4, and the number of the hierarchy depths is 5. That is, the number of times of division corresponding to the CU is 0 to 4.

Moreover, information designating the sizes of the LCU and the SCU is included in an SPS. Furthermore, the number of times of division corresponding to the CU is designated by split_flag indicating whether or not division is further performed at each level of hierarchy. The CU is described in detail in NPL 1.

A size of a TU can be designated using split_transform_flag like split_flag in the case of the CU. The maximum number of times of division of the TU at the time of inter-prediction and the maximum number of times of division of the TU at the time of intra-prediction are designated by an SPC as max_transform_hierarchy_depth_inter, and max_transform_hierarchy_depth_intra, respectively.

Furthermore, in the present specification, a coding tree unit (CTU) is set to include a coding tree block of the LCU and a parameter that is used when processing is performed at an LCU base (level). Furthermore, the CU that makes up the CTU is set to include a coding block (CB) and a parameter that is used when the processing is performed at a CU base (level).

(Selection of a Mode)

Incidentally, selection of a suitable prediction mode is important in accomplishing higher coding efficiency in AVC and HEVC coding schemes.

A method that is embedded in reference software (available in the public domain at http://iphome.hhi.de/suehring/tml/index.htm) for H.264/MPEC-4 AVC, called a joint mode (JM), can be referred to for an example of such a selection method.

In the JM, it is possible to select two types of mode determination method, that is, a high complexity mode and a low complexity mode, which are described below. Either of the two types calculates a cost function value associated with a prediction mode of each, and selects the prediction mode in which the calculated cost function value is minimized, as a mode optimal for the block and the macroblock.

A cost function in the high complexity mode is expressed by the following equation (1).

[Math. 1]

$$\text{Cost}(\text{Mode}\in\Omega)=D+\lambda*R \quad (1)$$

At this point, omega is a universal set of candidate modes for coding the block and the macroblock, and D is a difference in energy between a decoded image and an input image in the case of the coding in the prediction mode. Lamda is a lagrange undetermined multiplier that is given as a function of a quantization parameter. R is a total amount of coding performed in the mode, which includes an orthogonal transformation coefficient.

In other words, if coding is performed in the high complexity mode, because the parameters D and R have to be calculated, it is necessary to perform temporary encoding processing once in all the candidate modes, and thus a greater amount of calculation is necessary.

The cost function in the low complexity mode is expressed by the following equation (2).

[Math. 2]

$$\text{Cost}(\text{Mode}\in\Omega)=D+\text{QP2Quant}(QP)*\text{HeaderBit} \quad (2)$$

At this point, unlike in the case of the high complexity mode, D is the difference in energy between a prediction image and the input image. QP2Quant (QP) is given as a function of a quantization parameter QP, and HeaderBit is a total amount of coding associated with information that belongs to a header, such as a motion vector or a mode. The headerBit does not include the orthogonal transformation coefficient.

That is, in the low complexity mode, prediction processing in each candidate mode has to be performed, but because the prediction processing on the decode image does not have to be performed, coding processing also does not have to be performed. For this reason, it is possible to realize a smaller amount of calculation than in the high complexity mode.

(Transfer of Rep_Format)

Incidentally, image coding schemes such as MPEG-2 or AVC have a scalability function in which an image is hierarchically divided into multiple layers and a multiple-layered image is coded.

That is, for example, it is possible to transfer image compression information only in a base layer to a terminal that has a limited processing capability, such as a portable telephone. Alternatively, it is possible to transfer the image compression information in an enhancement layer in addition to the one in the base layer to a terminal that has a high processing capability, such as a television set or a personal computer that reproduces a moving image that has low spatial and temporal resolution or has low quality. Alternatively, it is possible to transmit from a server the image compression information that depends on a capability of the terminal or a network, as is the case when a moving image that has high spatial and temporal resolution or has high-quality is reproduced without performing transcode processing.

In scalable extension (SHVC) or MV-HEVC associated with such HEVC, because an outline of a bitstream can be understood only in a VPS, a structure is provided in which resolution information (rep_format) on each enhancement layer is described in VPS_EXT (Video_parameter set extension syntax).

For example, two types of method of mapping the enhancement layer and the resolution information onto each other are as follows. That is, the first type is a method of specifying a value for every layer with VPS-EXT. The second type is a method of pointing to transfer-finished rep_format information with the sequence parameter set (SPS) of the enhancement layer and overwriting VPS information, with VPS_EXT. An example in the case of NPL 1 is described below.

(Example of Syntax of VPS_EXT)

FIG. 2 is a diagram illustrating an example of syntax of VPS_EXT. In the example in FIG. 2, if a value of rep_format_idx_present_flag in the first row is 1, next, the number of rep_format's to be sent is set as vps_num_rep_formats_minus1. That is, rep_format_idx_present_flag is information indicating whether or not a correspondence relationship between the resolution information and the enhancement layer is present.

In a loop in the fourth row, as many rep_format's as the number indicated by vps_num_rep_formats_minus are set, and in the next loop in the seventh row, vps_rep_format_idx [i] is set that is an index indicating which layer uses which rep_format.

(Example of the Syntax of the SPS)

FIG. 3 is a diagram illustrating an example of the syntax of the SPC associated with an RBSP. In an example in FIG. 3, in all the enhancement layers, if update_rep_format_flag in the second row is 1, this index indicates that the index which is set in the VPS by sps_rep_format_idx in the fourth row can be changed.

(Semantics of Each of the VPS and the SPS)

FIG. 4 is a diagram illustrating semantics of the VPS in FIG. 2 and semantics of the SPS in FIG. 3.

Figure 5:
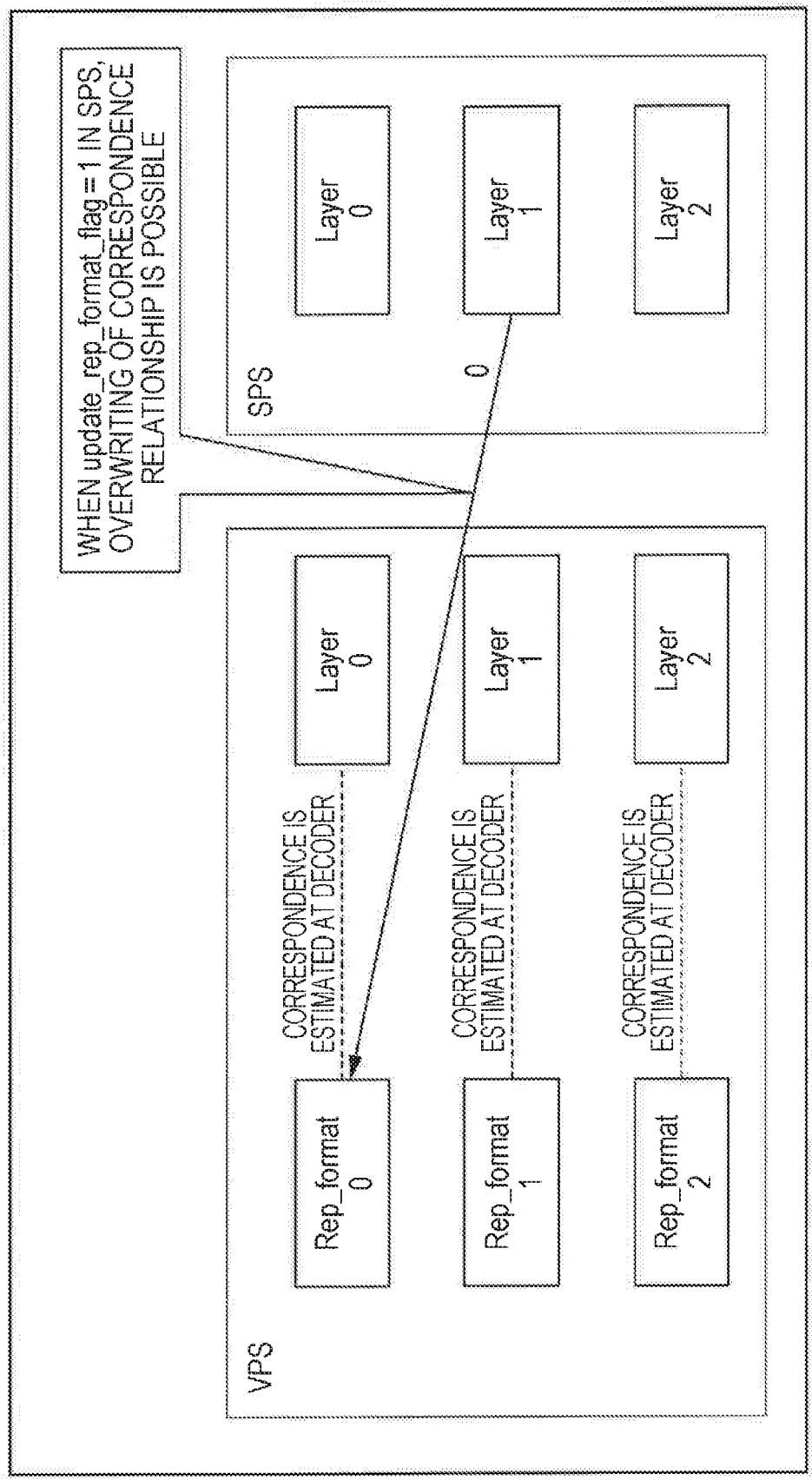
FIG. 5 is a diagram for describing pointing in a case of the syntax in FIG. 2.

To sum up, in specifications for the syntax described above and semantics, as illustrated in FIG. 5, in a case where rep_format_idx_present_flag is 0, the number of Rep_format's has to be the same as the number of layers. Furthermore, index transfer for every layer is omitted. That is, if the number of layers is 3, three Rep_format's have to be transferred.

On the other hand, when in the SPS, update_rep_format_flag=1, overwriting of the correspondence relationship is possible.

At this point, if this relationship is defined in the VPS, when layer>0, it is noted that Rep_format to be referred to can be updated in the SPS. In other words, in the VPS, only the default relationship can be defined.

Figure 6:
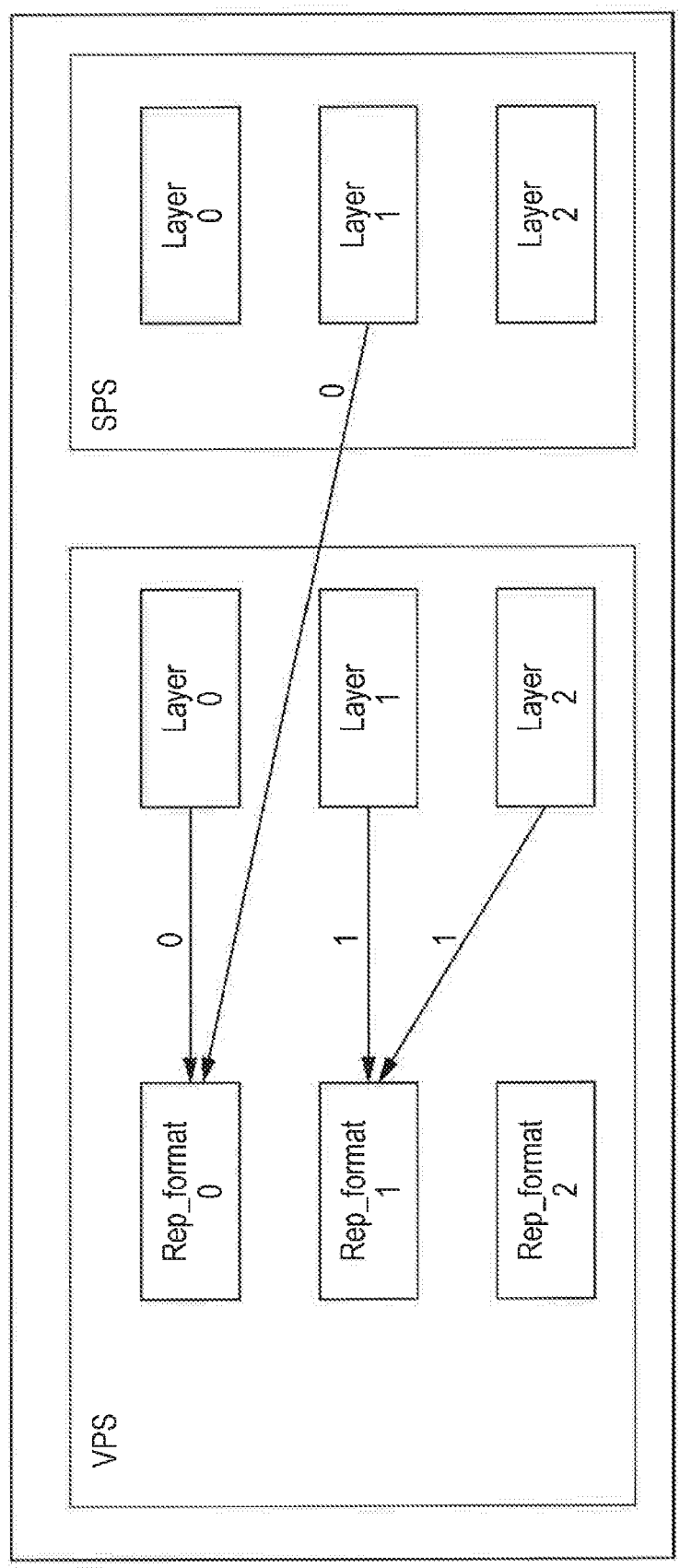
FIG. 6 is a diagram for describing the pointing in the case of the syntax in FIG. 2.

Next, as illustrated in FIG. 6, in a case where rep_format_idx_present_flag is 1 and the number of Rep_format's is 2 or greater, the index is transferred for every enhancement layer. Layer 0 (base layer) is fixed to the 0-th Rep_format. Moreover, there is no limit to the number of Rep_format's (a maximum value is 256).

Although repeatedly done, but after in the VPS, this relationship is defined, when layer>0, Rep_format can be updated in the SPS.

Figure 7:
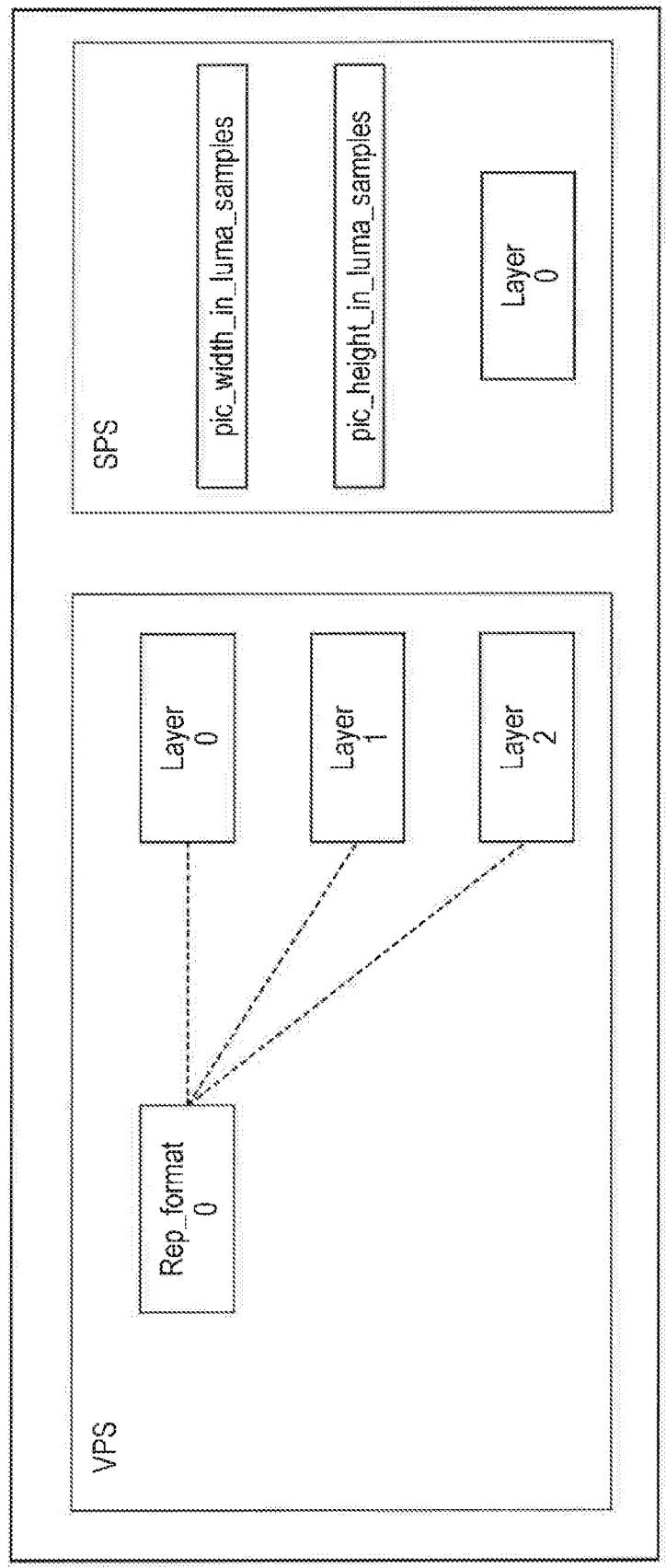
FIG. 7 is a diagram for describing the pointing in the case of the syntax in FIG. 2.

Moreover, as illustrated in FIG. 7, in a case where rep_format_idx_present_flag is 1 and the number of Rep_format's is only one, the index transfer for every layer is omitted. That is, all the layers are fixed to the 0-th Rep_format. In this case, rep_format_idx_present_flag is not intended to be coded, and the desired transfer of rep_format_idx_present_flag is redundant.

(Outline of the Present Technology)

Figure 8:
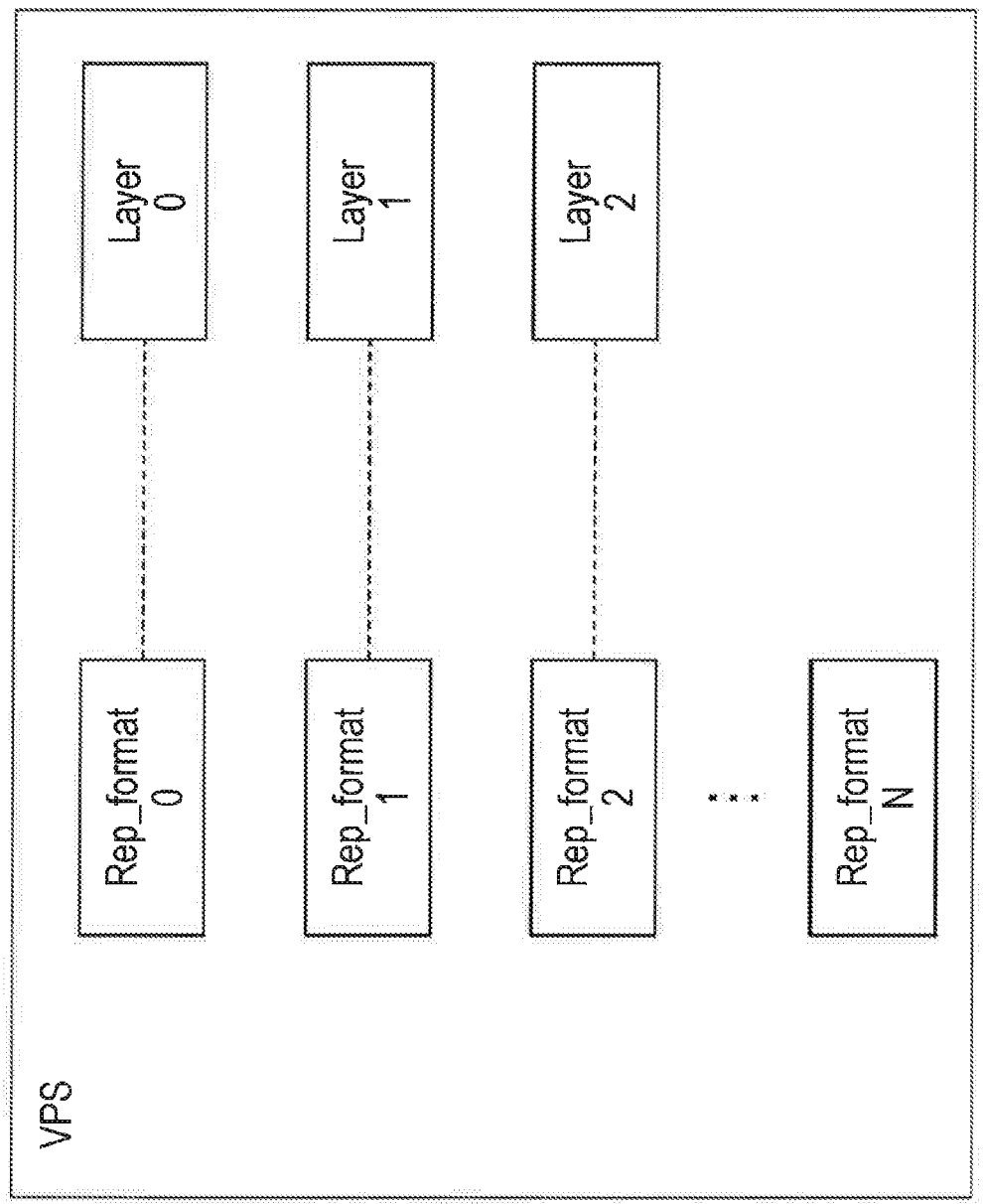
FIG. 8 is a diagram for describing the pointing in a case of the syntax according to the present technology.

The relationship between the number of Rep_format's and the number of layers described so far is a one-to-one correspondence relationship. In contrast, according to the present technology, in a case where the number of Rep_format's is greater than the number of layers, defining of the correspondence relationship between Rep_format and the layer begins with the leading Rep_format, as illustrated in FIG. 8.

Figure 9:
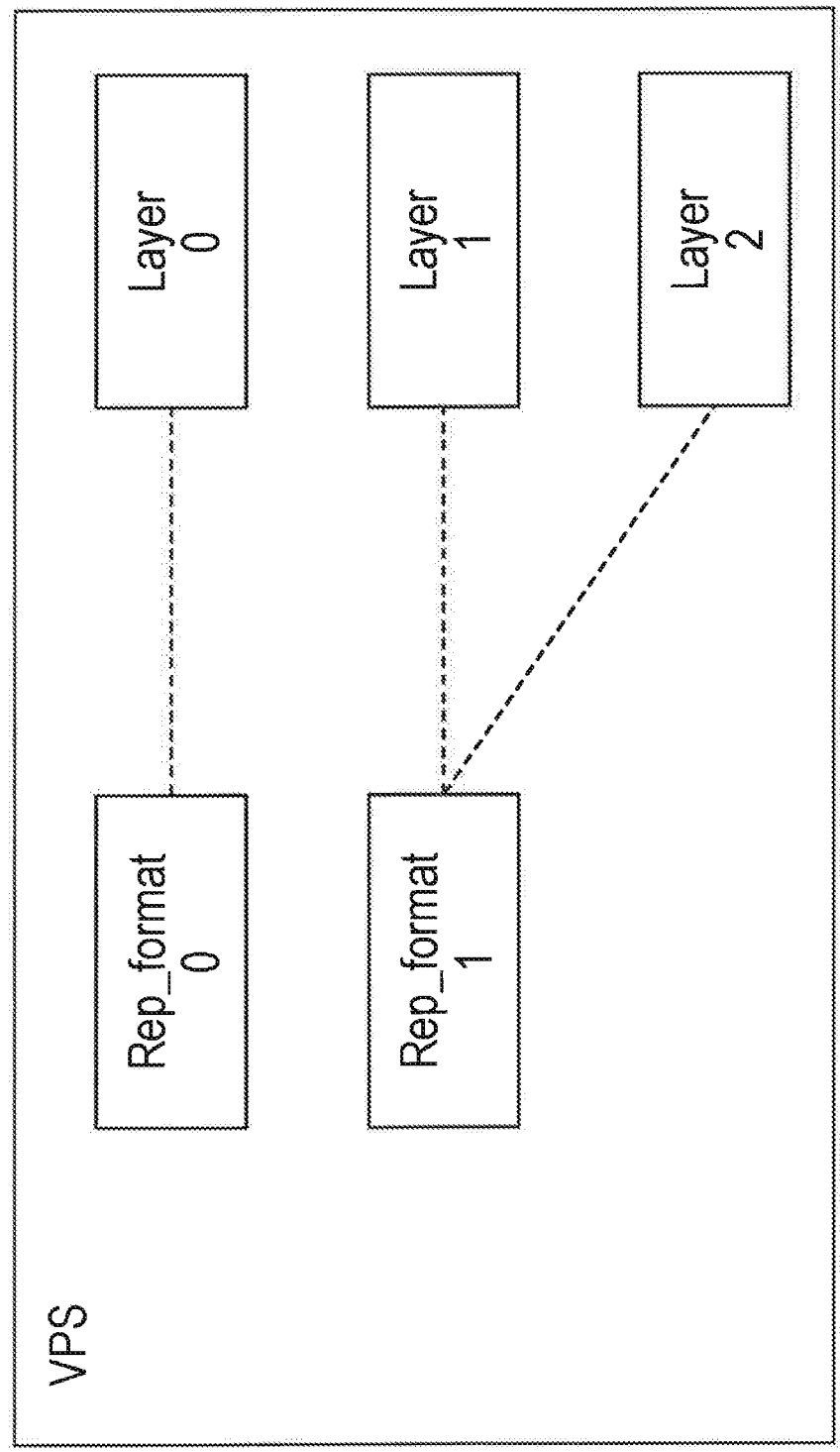
FIG. 9 is a diagram for describing the pointing in the case of the syntax according to the present technology.

Furthermore, as illustrated in FIG. 9, even though the number of Rep_format's is smaller than the number of layers, the defining of the correspondence relationship between Rep_format and the layer begins with the leading Rep_format. Moreover, in a case where multiple candidates are present and the number of layers is equal to or greater than the number of multiple candidates, there is automatic mapping between the candidates and the layers.

For example, an example in which a layer 0 refers to Rep_format 0, and a layer 1 and a layer 2 refer to Rep_format 1 is illustrated. However, the layer 0 and the layer 1 may be set to refer to Rep_format 0 and the layer 2 may be set to refer to Rep_format 1. Moreover, if the layers and Rep_format's correspond to each other in order of ascending layer number, any correspondence may be possible.

As described above, a case where Rep_format_idx_present_flag=0, comes with no restriction that the number of Rep_format's and the number of layers have to be the same. Therefore, a degree of freedom with which the number of Rep_format's and the number of layers are mapped is increased.

Furthermore, a resolution that is not defined in the VPS is difficult to change in the middle of a sequence. The VPS has to be sent once more. Therefore, all resolutions in the VPS have to be placed. In such a case, as described above, when the candidate and the layer are automatically mapped onto each other, this is effective.

Next, in a case where the number of Rep_format's is just 1, because the transfer of Rep_format_idx_present_flag is redundant, a transfer order and a transfer condition are changed. Particularly, as illustrated in FIG. 10, the transfer of vps_num_rep_formats_minus 1 is made compulsory, and the index for mapping is set to be transferred only when more necessary.

Figure 10:
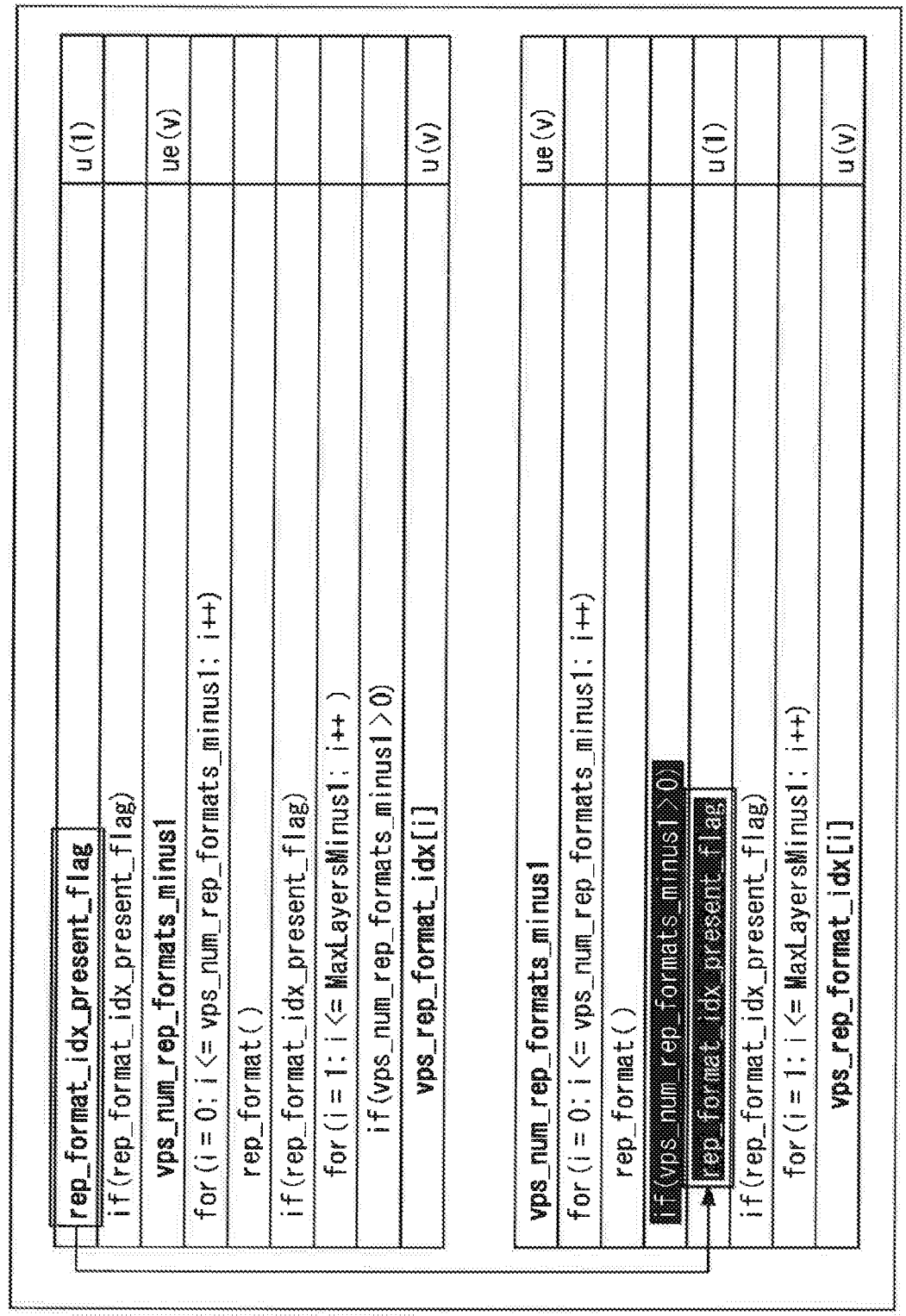
FIG. 10 is a diagram for describing the pointing in the case of the syntax according to the present technology.

That is, as illustrated in the syntax on the lower side of FIG. 10, the transfer of the vps_num_rep_formats_minus 1 is made compulsory, and rep_format_idx_present_flag that is present in front of the VPS in FIG. 2 is placed after an if sentence, vps_num_rep_formats_minus 1>0.

Figure 11:
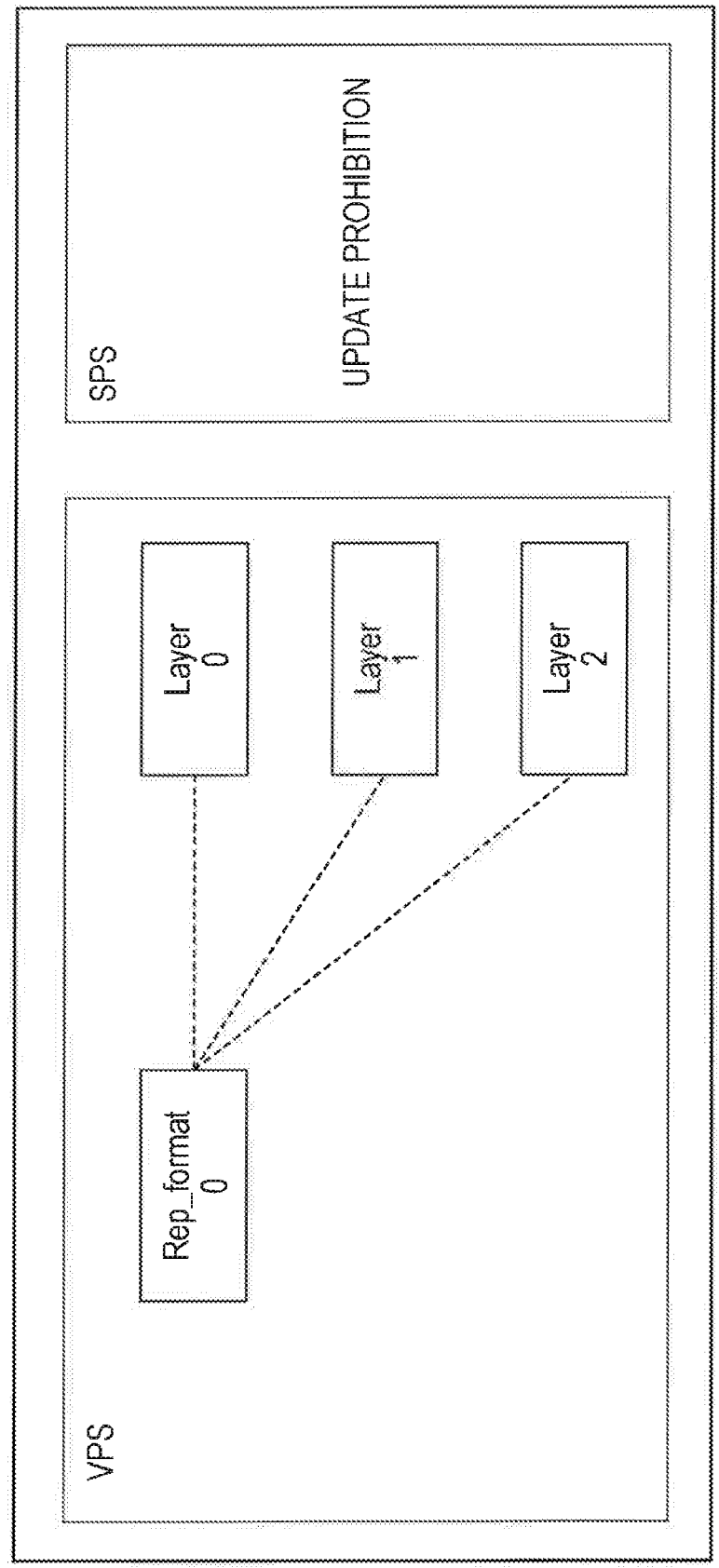
FIG. 11 is a diagram for describing pointing in the case of the syntax according to the present technology.

Moreover, as illustrated in FIG. 11, in a case where the number of Rep_format's is just 1, the update in the SPS is prohibited. Specifically, the restriction that update_rep_format_flag=0 is entered into the SPS.

(Example of VPS Syntax According to the Present Technology)

FIG. 12 is a diagram illustrating an example of VPS syntax according to the present technology. As described referring to FIG. 10, vps_num_rep_formats_minus 1 is arranged at the top of the VPS, the transfer of vps_num_rep_formats_minus 1 is made compulsory, and rep_format_idx_present_flag that is present in the front of the VPS in FIG. 2 is placed after the if sentence, vps_num_rep_formats_minus 1>0.

(Example of SPS Syntax According to the Present Technology)

FIG. 13 is a diagram illustrating SPS syntax according to the present technology. In a case where the number of Rep_format's is just 1, there are no points of difference particularly with respect to the SPS. Moreover, referring to FIG. 11, as illustrated, in a case where the number of Rep_format's is just 1, the restriction that update_rep_format_flag=0 is entered in the SPS.

(Example of Semantics According to the Present Technology)

FIG. 14 is a diagram illustrating an example of semantics of each of the VPS and the SPS according to the present technology. In the example in FIG. 14, semantics are different from the semantics in the example in FIG. 4 in that places where white characters in the colored background are present are points according to the present technology. That is, when mapping information is not sent, how a decoder side makes an estimation is clearly stated from the points.

That is, vps_num_rep_formats_minus 1 of the VPS is the same as in the example in FIG. 4. The example in FIG. 14 is different from the example in FIG. 4 in that when rep_format_idx_present_flag is not present, a value of rep_format_idx_present_flag is equal to 0.

The example in FIG. 14 is different from the example in FIG. 4 in that if vps_rep_format_idx[i] is not present, a value of vps_rep_format_idx[i] is 0 when rep_format_idx_present_flag is 1, and i is smaller than vps_num_rep_formats_minus 1 when rep_format_idx_present_flag is 0.

The example in FIG. 14 is different from the example in FIG. 4 in that for update_rep_format_flag in the SPS, if a value of vps_num_rep_formats_minus 1 in the VPS that is a processing target is 0, a value of update_rep_format_flag is 0.

Next, specific examples are described referring to FIGS. 15 to 17.

In the example in FIG. 15, in a case of SNR scalability and view scalability, all the layers (3 layers) basically have the same resolution. Moreover, in the examples in FIGS. 15 to 17, a method 3 represents a method according to the present technology.

In a case of a method 1, when rep_format_idx_present_flag is 1, the value of vps_num_rep_formats_minus 1 is 0, one piece of information is W*H. At this time, the decoding side estimates that the layers 1 and 2 also use the 0-th piece of information.

In a case of a method 2, when rep_format_idx_present_flag is 0, because information on how many pieces of information to send is the number of layers and thus the information is MaxLayersMinus 1=3−1=2. Then, each value (W*H) is derived in order that it can be ascertained what each layer refers to.

In contrast, in a case of the method 3 (the present technology), because only one piece of the resolution information is present, the value of vps_num_rep_formats_minus 1 is 0. Furthermore, when the value of vps_num_rep_formats_minus 1 is 0, rep_format_idx_present_flag does not have to be transferred. That is, because it is not necessary to send rep_format_idx_present_flag, this one bit does not have to be sent.

In the example in FIG. 16, the layer 1 and the layer 2 are for SNR scalability and have the same resolution of 2W*2H, and, with respect to the layer 1 and the layer 2, the layer 0 is for spatial scalability and has a resolution of w*H.

In the case of the method 1, two pieces of information (W*H and 2W*2H) are sent. Because vps_rep_format_idx [0] is the same as the 0-th rep_format, nothing is sent, and vps_rep_format_idx [1] and vps_rep_format_idx [2] is signaled as 1.

In the case of the method 2, the value of vps_num_rep_formats_minus 1 is 0. Although redundant, the information has to be sent three times, that is, send three pieces of information, w*H and 2W*2H*2. However, the mapping information may not be sent.

In the case of the method 3 (the present technology), because there are 2 pieces of information to be sent, the value of vps_num_rep_formats_minus 1 is set to 1. Because the mapping information can be estimated, the mapping information can be set to 0. Therefore, the number of times of transfer is reduced.

In the example in FIG. 17, the two layers are for spatial scalability. The layer 0 has a resolution of w*H, and the layer 1 has a resolution of 2w*2H. Moreover, in a case of the example in FIG. 17, in addition to the two types of resolution, a resolution of 3w*3H is available that has the likelihood of being changed along the way.

In the method 1, rep_format_idx_present_flag has to be set to 1. Like in the method 2, when rep_format_idx_present_flag=0, because the three pieces of resolution information are available, but thus only the two layers are available, the correspondence is not established.

In the method 3 (the present technology), the transfer, of course, is performed with rep_format_idx_present_flag=1. However, because there may be more pieces of resolution information, the transfer can be performed with rep_format_idx_present_flag being set to 0.

As described above, default mapping between the enhancement layer and the resolution information can be improved. Accordingly, the mapping between the enhancement layer and the resolution information can be set in a flexible manner, and effective adaptability to applications is possible.

That is, because the VPS includes information most necessary for television communication, such as resolution or bit depth information, the VPS is used in session negotiation.

Decoders that have different performance exchange pieces of information on processing capability with each other in order to perform communication in a suitable format when performing communication with each other. This exchange of pieces of information is referred to as session negotiation. Generally, session negotiations, including the one during communication, are performed a multiple number of times between multiple apparatuses. Session negotiation is performed during communication in order to allow for a fluctuation in transfer band and the like as well.

When the number of parameters increases as is the case when VPS+SPS and so forth, the number of bits necessary for negotiation per one time increases and this has great impact on the processing and the band.

A decrease in the number of the pieces of information to be sent in the VPS according to the present technology can be effective for what is described above.

Next, an example is described in which the present technology described above is applied to a specific apparatus.

First Embodiment (Configuration Example of a Coding Apparatus According to a First Embodiment)

FIG. 18 is a block diagram illustrating a configuration example of a coding apparatus according to a first embodiment, to which the present disclosure is applied.

A coding apparatus 10 in FIG. 18 is configured from a setting unit 11, a coding unit 12, and a transfer unit 13, and codes an image using a scheme in accordance with the HEVC scheme.

Specifically, the setting unit 11 of the coding apparatus 10 sets the VPS, the SPS, and the like. The setting unit 11 supplies parameter sets, such as the VPS, the SPS, a PPS, a VUI, an SEI and the like that are set, to the coding unit 12.

Images in units of frames are input to the coding unit 12. The coding unit 12 codes the image that is input, using a scheme in accordance with the HEVC scheme, referring to the parameter sets that are supplied from the setting unit 11. The coding unit 12 generates a code stream from code data that is obtained as a result of the coding and from the parameter sets, and supplies the generated code stream to the transfer unit 13.

The transfer unit 13 transfers the code stream that is supplied from the coding unit 12, to a decoding apparatus that is described below.

(Configuration Example of the Coding Unit)

Figure 19:
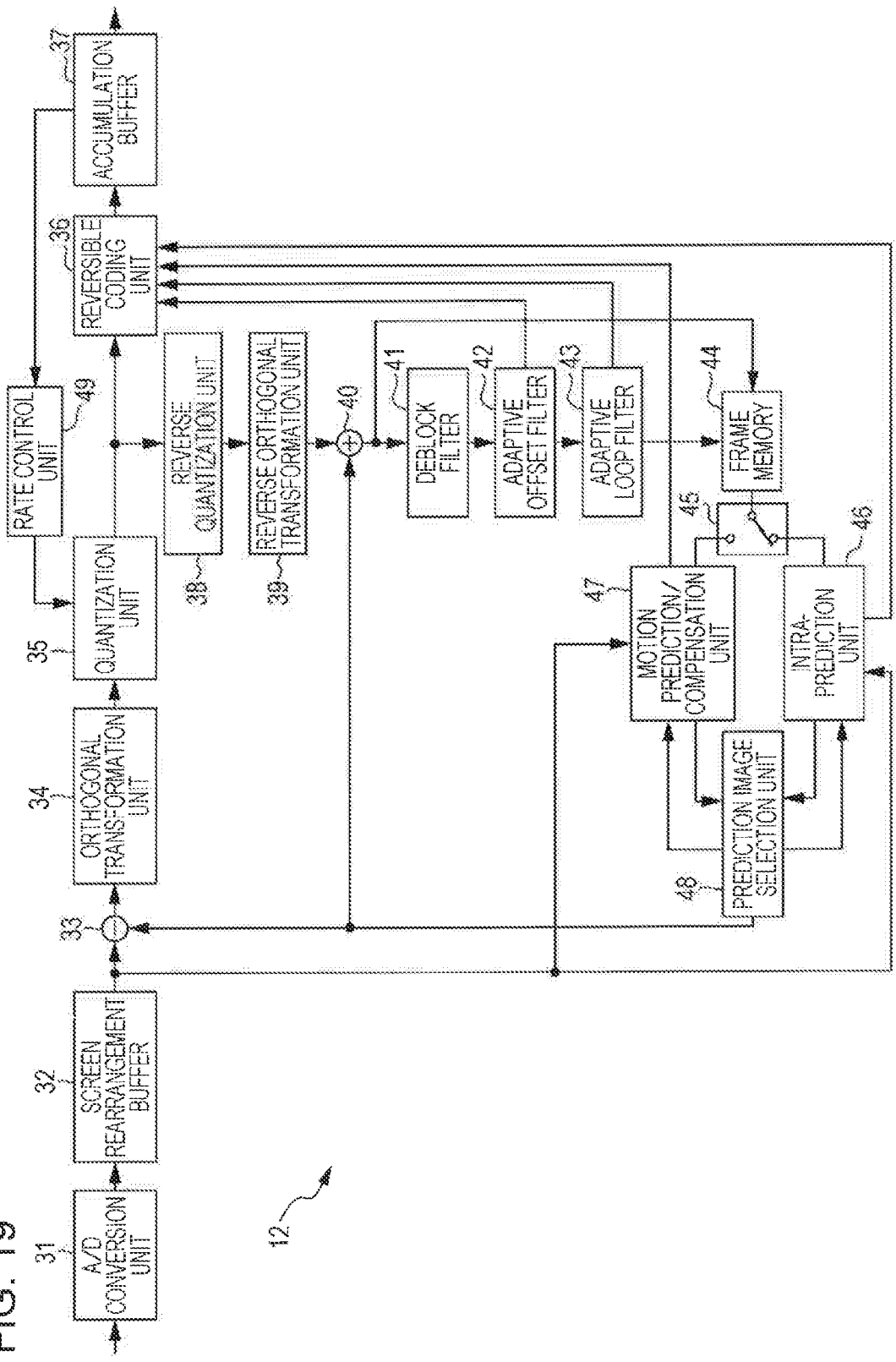
FIG. 19 is a block diagram illustrating a configuration example of a coding unit in FIG. 18.

FIG. 19 is a block diagram illustrating a configuration example of the coding unit 12 in FIG. 18.

The coding unit 12 in FIG. 19 has an A/D conversion unit 31, a screen rearrangement buffer 32, an arithmetic operation unit 33, an orthogonal transformation unit 34, a quantization unit 35, a reversible coding unit 36, an accumulation buffer 37, a reverse quantization unit 38, a reverse orthogonal transformation unit 39, and an addition unit 40. Furthermore, the coding unit 12 has a deblock filter 41, an adaptive offset filter 42, an adaptive loop filter 43, a frame memory 44, a switch 45, an intra-prediction unit 46, a motion prediction/compensation unit 47, a prediction image selection unit 48, and a rate control unit 49.

The A/D conversion unit 31 of the coding unit 12 A/D converts the images in units of frames that are input as targets to code. The A/D conversion unit 31 outputs the image that is a post-conversion digital signal, to the screen rearrangement buffer 32 for storage.

The screen rearrangement buffer 32 rearranges the stored images in units of frames that are in display order, in coding order according to a GOP structure. The screen rearrangement buffer 32 outputs the post-rearrangement images to the arithmetic operation unit 33, the intra-prediction unit 46, and the motion prediction/compensation unit 47.

The arithmetic operation unit 33 performs coding by subtracting the prediction image that is supplied from the prediction image selection unit 48, from the image that is supplied from the screen rearrangement buffer 32. The arithmetic operation unit 33 outputs the image that is obtained as a result of the coding, as information on a residual (a difference) to the orthogonal transformation unit 34. Moreover, in a case where the prediction image is not supplied from the prediction image selection unit 48, the arithmetic operation unit 33 outputs the image that is read from the screen rearrangement buffer 32, as the information on the residual as is, to the orthogonal transformation unit 34.

The orthogonal transformation unit 34 performs, in units of TU's, orthogonal transformation processing on the information on the residual from the arithmetic operation unit 33. After the orthogonal transformation processing, the orthogonal transformation unit 34 supplies a result of the orthogonal transformation processing to the quantization unit 35.

The quantization unit 35 quantizes the result of the orthogonal transformation processing that is supplied from the orthogonal transformation unit 34. The quantization unit 35 supplies a quantization value that is obtained as a result of the quantization to the reversible coding unit 36.

The reversible coding unit 36 obtains information indicating an optimal mode (hereinafter referred to as intra-prediction mode information) from the intra-prediction unit 46. Furthermore, the reversible coding unit 36 obtains information that specifies information indicating an optimal inter-prediction mode (hereinafter referred to as inter-prediction mode information), motion vector, and a reference image, and the like, from the motion prediction/compensation unit 47.

Furthermore, the reversible coding unit 36 obtains offset filter information relating to an offset filter from the adaptive offset filter 42 and obtains a filter coefficient from the adaptive loop filter 43.

The reversible coding unit 36 performs reversible coding on the quantization value that is supplied from the quantization unit 35, such as variable length coding (for example, Context-Adaptive Variable Length Coding (CAVLC)), and binary arithmetic coding (for example, Context-Adaptive Binary Arithmetic Coding (CABAC), and the like).

Furthermore, the reversible coding unit 36 reversibly codes the information that specifies the intra-prediction mode information or the inter-prediction mode information, the motion vector, and the reference image, the offset filter information, and the filter coefficient, as code information relating to the coding. The reversible coding unit 36 supplies the code information and the reversibly-coded quantization value, as the code data, to the accumulation buffer 37 for accumulation.

Moreover, the reversibly-coded code information may be set to be header information (for example, a slice header) of the reversibly-coded quantization value.

The accumulation buffer 37 temporarily stores the code data that is supplied from the reversible coding unit 36. Furthermore, the accumulation buffer 37 supplies the stored code data, as the code stream, to the transfer unit 13, along with the parameter set that is supplied from the setting unit 11 in FIG. 18.

Furthermore, the quantization value that is output from the quantization unit 35 is input also to the reverse quantization unit 38. The reverse quantization unit 38 reversely quantizes the quantization value. The reverse quantization unit 38 supplies the result of the orthogonal transformation processing, which is a result of the reverse quantization, to the reverse orthogonal transformation unit 39.

The reverse orthogonal transformation unit 39 performs, in units of TU's, reverse orthogonal transformation processing on the result of the orthogonal transformation processing that is supplied from the reverse quantization unit 38. As a reverse orthogonal transformation scheme, there are, for example, an inverse discrete cosine transform (IDCT) and an inverse discrete sine transform (IDST). The reverse orthogonal transformation unit 39 supplies the information on the residual that is obtained as a result of the reverse orthogonal transformation processing to the addition unit 40.

The addition unit 40 adds together the information on the residual that is supplied from the reverse orthogonal transformation unit 39 and the prediction image that is supplied from the prediction image selection unit 48 and performs decoding. The addition unit 40 supplies the decoded image to the deblock filter 41 and the frame memory 44.

The deblock filter 41 performs adaptive deblock filter processing that removes block distortion on the decoded image that is supplied from the addition unit 40, and supplies the image that is obtained as a result of the adaptive deblock filter processing to the adaptive offset filter 42.

The adaptive offset filter 42 performs adaptive offset filter (sample adaptive offset (SAO)) processing that mainly removes ringing on the image on which the adaptive deblock filter processing has already been performed by the deblock filter 41.

Specifically, the adaptive offset filter 42 determines a type of adaptive offset filter processing for every largest coding unit (LCU) and obtains an offset that is used in the adaptive offset filter processing. The adaptive offset filter 42 performs the determined type of adaptive offset filter processing on the image on which the adaptive deblock filter processing has already been performed, using the obtained offset.

The adaptive offset filter 42 supplies the image on which the adaptive offset filter processing has already been performed to the adaptive loop filter 43. Furthermore, the adaptive offset filter 42 supplies the type of adaptive offset filter processing that is performed, and information indicating the offset, as the offset filter information, to the reversible coding unit 36.

The adaptive loop filter 43, for example, is configured from a two-dimensional Wiener filter. For every LCU, the adaptive loop filter 43 performs, for example, adaptive loop filter (ALF) processing on the image on which the adaptive offset filter processing has already been performed, and which is supplied from the adaptive offset filter 42.

Specifically, for every LCU, the adaptive loop filter 43 calculates the filter coefficient that is used in adaptive loop filter processing, in such a manner that a residual difference between an original image that is the image that is output from the screen rearrangement buffer 32 and the image on which the adaptive loop filter processing has already been performed is minimized. Then, for every LCU, the adaptive loop filter 43 performs the adaptive loop filter processing on the image on which the adaptive offset filter processing has already been performed, using the calculated filter coefficient.

The adaptive loop filter 43 supplies the image on which the adaptive loop filter processing has already been performed to the frame memory 44. Furthermore, the adaptive loop filter 43 supplies the filter coefficient that is used in the adaptive loop filter processing to the reversible coding unit 36.

Moreover, at this point, the adaptive loop filter processing is set to be performed for every LCU, but a processing unit of the adaptive loop filter processing is not limited to the LCU. However, the processing can be efficiently performed by combining processing units of the adaptive offset filter 42 and the adaptive loop filter 43.

The frame memory 44 accumulates the image that is supplied from the adaptive loop filter 43 and the image that is supplied from the addition unit 40. The image adjacent to a prediction unit (PU), among the images accumulated in the frame memory 44, on which filter processing is not performed, is supplied, as a neighboring image, to the intra-prediction unit 46 through the switch 45. On the other hand, the image accumulated in the frame memory 44, on which the filter processing is performed, is output, as a reference image, to the motion prediction/compensation unit 47 through the switch 45.

The intra-prediction unit 46 performs intra-prediction processing in all intra-prediction modes that are candidates in units of PU's, using the neighboring image that is read from the frame memory 44 through the switch 45.

Furthermore, the intra-prediction unit 46 calculates the cost function value (whose details are described below) with respect to all the intra-prediction modes that are the candidates, based on the image that is read from the screen rearrangement buffer 32 and on the prediction image that is generated as a result of the intra-prediction processing. Then, the intra-prediction unit 46 determines the intra-prediction mode of which the cost function value is minimized, as the optimal intra-prediction mode.

The intra-prediction unit 46 supplies the prediction image generated in the optimal intra-prediction mode, and the corresponding cost function value to the prediction image selection unit 48. In a case where the prediction image selection unit 48 notifies that the prediction image generated in the optimal intra-prediction mode is selected, the intra-prediction unit 46 supplies the intra-prediction mode information to the reversible coding unit 36. Moreover, the intra-prediction mode is a mode in which a size of the PU, a prediction direction, and the like are indicated.

The motion prediction/compensation unit 47 performs motion prediction/compensation processing in all the inter-prediction modes that are the candidates in units of PU's. Specifically, the motion prediction/compensation unit 47 detects, in units of PU's, the motion vector in all the inter-prediction modes that are the candidates, based on the image that is supplied from the screen rearrangement buffer 32 and on the reference image that is read from the frame memory 44 through the switch 45. Then, the motion prediction/compensation unit 47 performs, in units of PU's, compensation processing on the reference image based on the motion vector, and generates the prediction image.

At this time, the motion prediction/compensation unit 47 calculates the cost function value with respect to all the inter-prediction modes that are the candidates, based on the image that is supplied from the screen rearrangement buffer 32 and on the prediction image, and determines the inter-prediction mode of which the cost function value is minimized, as the optimal inter-prediction mode. Then, the motion prediction/compensation unit 47 supplies the cost function value of the optimal inter-prediction mode and the corresponding prediction image to the prediction image selection unit 48. Furthermore, in a case where the prediction image selection unit 48 notifies that the prediction image generated in the optimal inter-prediction mode is selected, the motion prediction/compensation unit 47 outputs the information that specifies the inter-prediction mode information, the corresponding motion vector, and the reference image, and the like to the reversible coding unit 36. Moreover, the inter-prediction mode is a mode in which the size of the PU and the like are indicated.

The prediction image selection unit 48 determines as an optimal prediction mode the mode of which the corresponding cost function value is small, among the optimal intra-prediction mode and the optimal inter-prediction mode, based on the cost function values that are supplied from the intra-prediction unit 46 and the motion prediction/compensation unit 47. Then, the prediction image selection unit 48 supplies the prediction image in the optimal prediction mode to the arithmetic operation unit 33 and the addition unit 40. Furthermore, the prediction image selection unit 48 notifies the intra-prediction unit 46 or the motion prediction/compensation unit 47 of the selection of the prediction image in the optimal prediction mode.

The rate control unit 49 controls a rate at which the quantization unit 35 performs a quantization operation, in such a manner that an overflow or an underflow does not occur, based on the code data accumulated in the accumulation buffer 37.

(Description of Processing by the Coding Apparatus)

Figure 20:
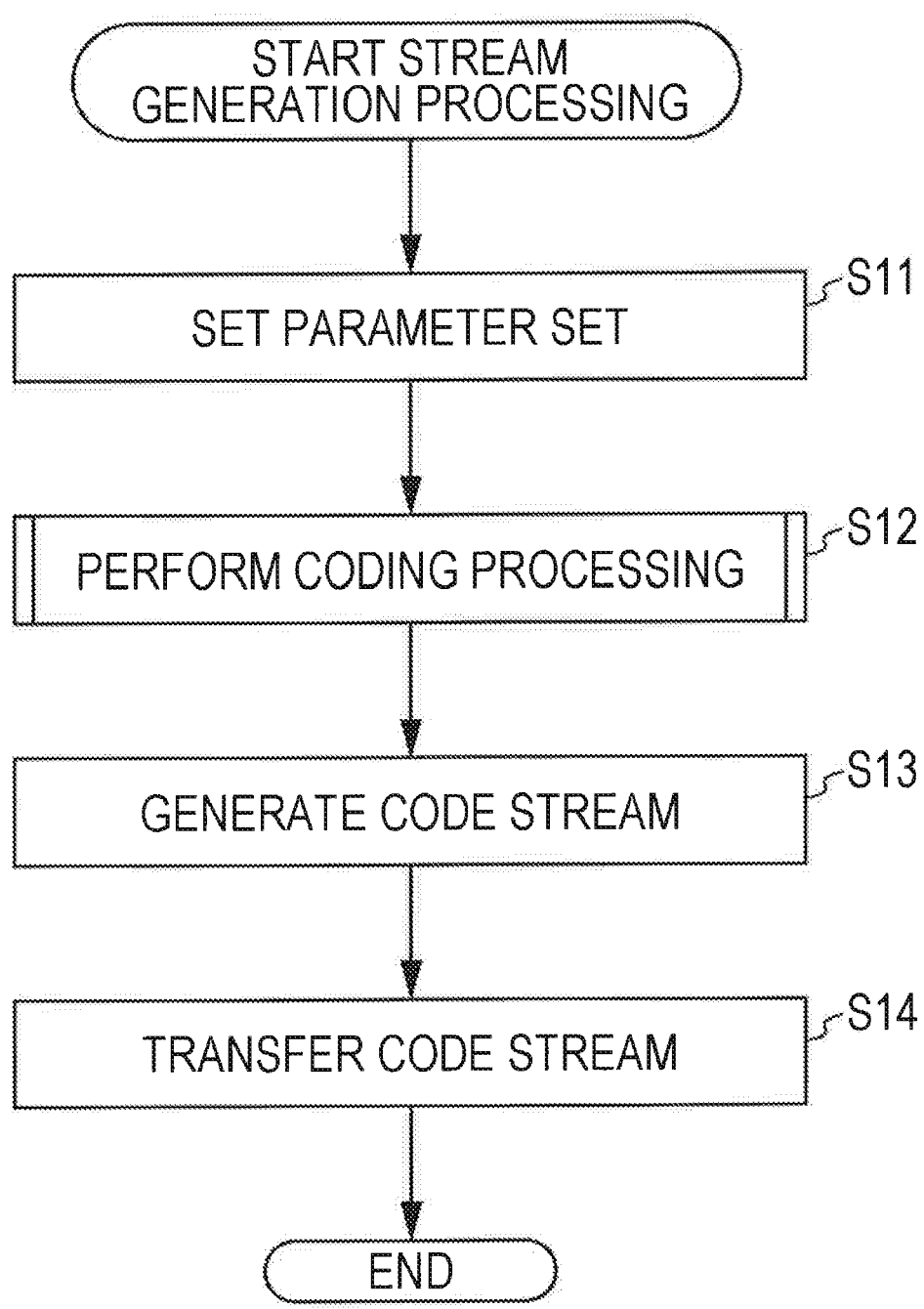
FIG. 20 is a flowchart for describing stream generation processing.

FIG. 20 is a flowchart for describing stream generation processing by the coding apparatus 10 in FIG. 18.

In Step S11 in FIG. 20, the setting unit 11 of the coding apparatus 10 sets the parameter set such as the VPS or the SPS. The setting unit 11 supplies the parameter set that is set to the coding unit 12. The setting processing is described in detail referring to subsequent FIG. 21.

In Step S12, the coding unit 12 performs the coding processing that codes the images in units of frames, which are input from the outside, in accordance with the HEVC scheme. The coding processing is described in detail referring to subsequent FIGS. 22 and 23.

In Step S13, the accumulation buffer 37 (in FIG. 19) of the coding unit 12 generates the code stream from the parameter set that is supplied from the setting unit 11 and the code data being accumulated and supplies the generated code stream to the transfer unit 13.

In Step S14, the transfer unit 13 transfers the code stream that is supplied from the setting unit 11, to the decoding apparatus 110 that is described below and ends the processing.

Figure 21:
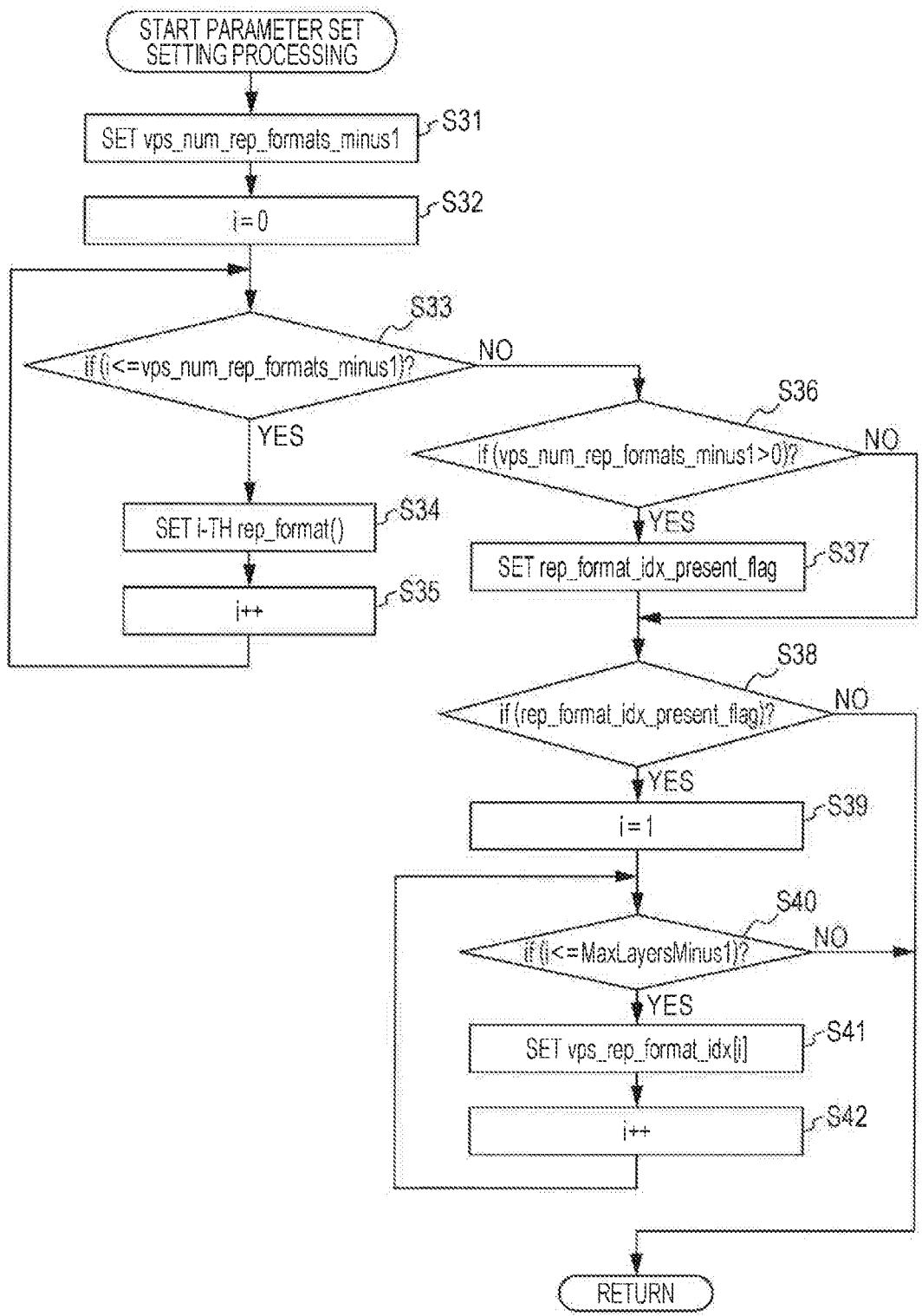
FIG. 21 is a flowchart for describing parameter set setting processing.

Next, processing of setting the parameters in Step S11 in FIG. 20 is described in detail referring to FIG. 21.

In Step S31, the setting unit 11 in FIG. 18 sets vps_num_rep_formats_minus 1. The setting unit 11 performs the setting in Step S32, in such a manner that i=0, and determines whether or not i is equal to or less than vps_num_rep_formats_minus 1, in Step S33. In a case where it is determined in Step S33 that i is equal to or less than vps_num_rep_formats_minus 1, the processing proceeds to Step S34.

The setting unit 11 sets i-th rep_format( ) in Step S34 and performs i++ in Step S35. Thereafter, the processing returns to Step S33 and repeats Step 33 and subsequent steps.

In a case where it is determined in Step S33 that i is greater than vps_num_rep_formats_minus 1, the processing proceeds to Step S36.

In Step S36, the setting unit 11 determines whether or not vps_num_rep_formats_minus 1 is greater than 0. In a case where it is determined in Step S36 that vps_num_rep_formats_minus 1 is greater than 0, in Step S37, the setting unit 11 sets rep_format_idx_present_flag 1.

In a case where it is determined in Step S36 that vps_num_rep_formats_minus 1 is equal to or less than 0, the processing in Step S37 is skipped.

In Step S38, the setting unit 11 determines whether or not vps_num_rep_formats_minus 1 is 1. In a case where it is determined in Step S38 that vps_num_rep_formats_minus 1 is 1, the setting unit 11 performs the setting in such a manner that i=1, in Step S39.

In Step S40, it is determined whether or not i is equal to or less than MaxLayersMinus 1. In a case where it is determined in Step S40 that vps_num_rep_formats_minus 1 is 1, the setting unit 11 sets vps_rep_format_idx[i] in Step S41. In a case where it is determined in Step S40 that vps_num_rep_formats_minus 1 is 1, in Step S42, the setting unit 11 performs the setting in such a manner that i++, and the processing returns to Step S40 and repeats Step S40 and subsequent steps.

On the other hand, in a case where it is determined in Step S38 that vps_num_rep_formats_minus 1 is not 1, and in a case where it is determined in Step S40 that i is smaller than MaxLayersMinus 1, parameter set setting processing ends and the processing returns to Step S11 in FIG. 20.

Figure 22:
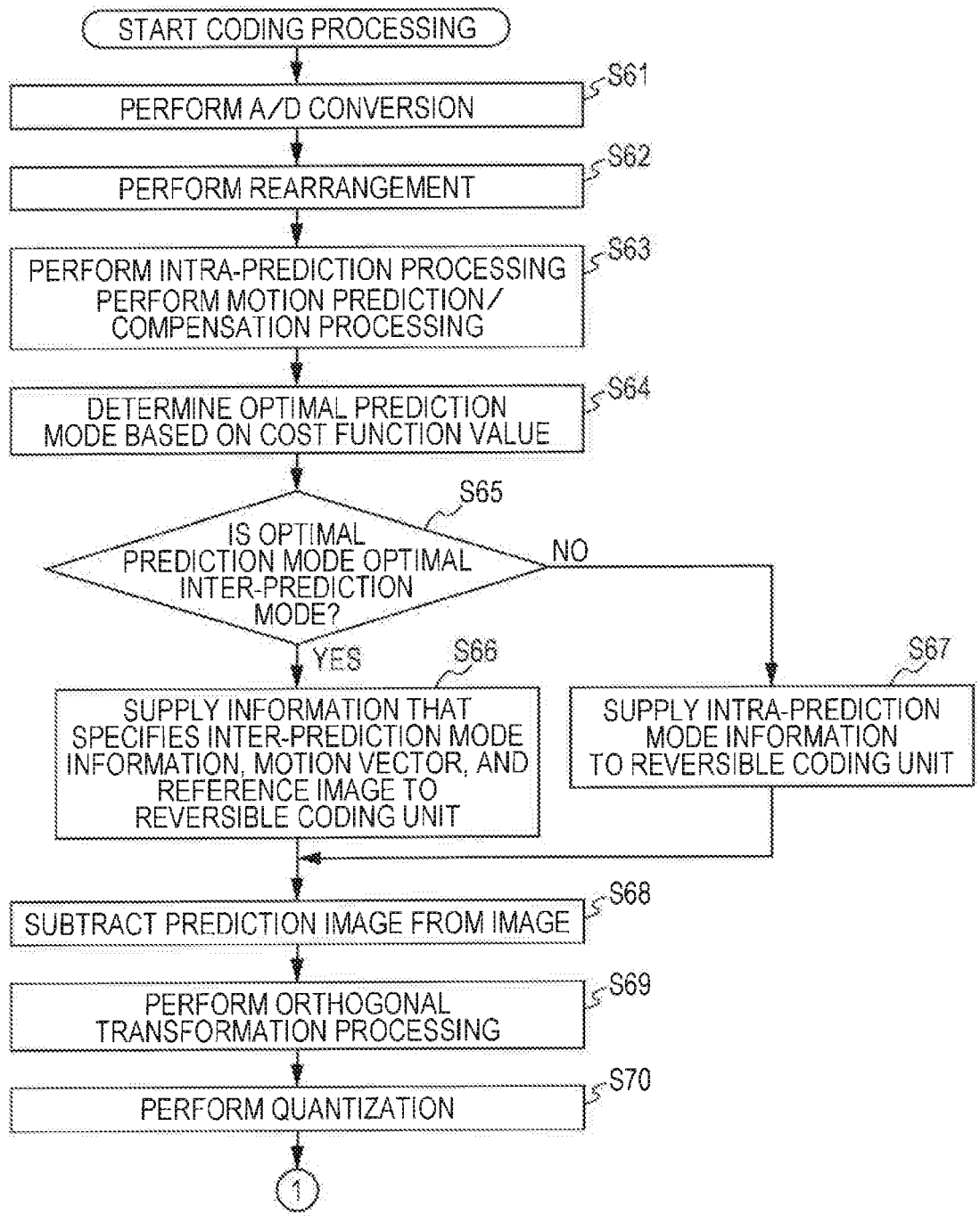
FIG. 22 is a flowchart for describing coding processing in FIG. 20 in detail.
Figure 23:
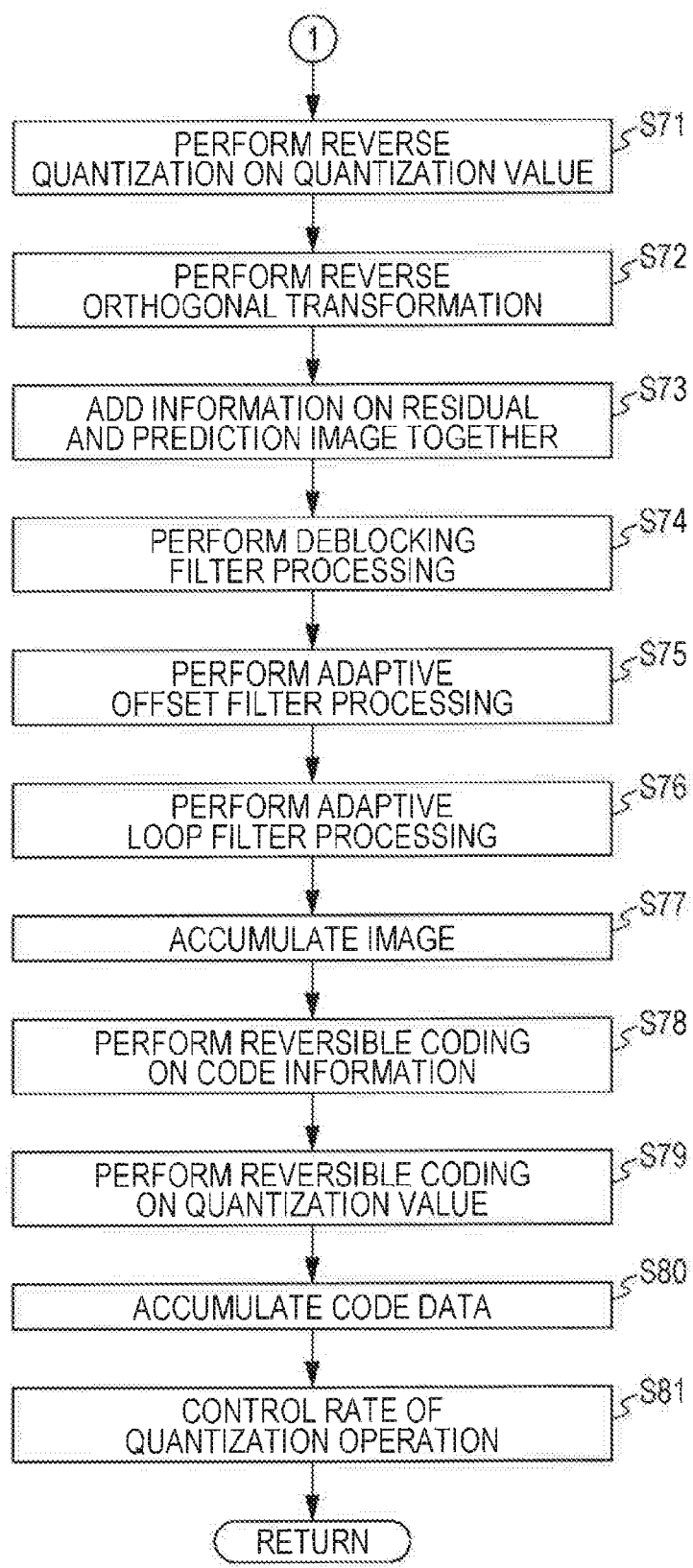
FIG. 23 is a flowchart for describing the coding processing in FIG. 20 in detail.

Next, FIGS. 22 and 23 are flowcharts for describing in detail the coding processing in Step S12 in FIG. 20.

In Step S61 in FIG. 20, the A/D conversion unit 31 (in FIG. 19) of the coding unit 12 A/D converts the images in units of frames that are input as the targets to code. The A/D conversion unit 31 outputs the image that is a post-conversion digital signal, to the screen rearrangement buffer 32 for storage.

In Step S62, the screen rearrangement buffer 32 rearranges the stored images in units of frames that are arranged in display order, in coding order according to a GOP structure. The screen rearrangement buffer 32 supplies the post-rearrangement images in units of frames to the arithmetic operation unit 33, the intra-prediction unit 46, and the motion prediction/compensation unit 47.

In Step S63, the intra-prediction unit 46 performs the intra-prediction processing of all the intra-prediction modes that are the candidates in units of PU's. Furthermore, the intra-prediction unit 46 calculates the cost function value with respect to all the intra-prediction modes that are the candidates, based on the image that is read from the screen rearrangement buffer 32 and on the prediction image that is generated as the result of the intra-prediction processing. Then, the intra-prediction unit 46 determines the intra-prediction mode of which the cost function value is minimized, as the optimal intra-prediction mode. The intra-prediction unit 46 supplies the prediction image generated in the optimal intra-prediction mode, and the corresponding cost function value to the prediction image selection unit 48.

Furthermore, the motion prediction/compensation unit 47 performs the motion prediction/compensation processing in all the inter-prediction modes that are the candidates in units of PU's. Furthermore, the motion prediction/compensation unit 47 calculates the cost function value with respect to all the inter-prediction modes that are the candidates, based on the image that is supplied from the screen rearrangement buffer 32 and on the prediction image, and determines the inter-prediction mode of which the cost function value is minimized, as the optimal inter-prediction mode. Then, the motion prediction/compensation unit 47 supplies the cost function value of the optimal inter-prediction mode and the corresponding prediction image to the prediction image selection unit 48.

In Step S64, the prediction image selection unit 48 determines as the optimal prediction mode the mode of which the cost function value is minimized, among the optimal intra-prediction mode and the optimal inter-prediction mode, based on the cost function values that are supplied from the intra-prediction unit 46 and the motion prediction/compensation unit 47, as a result of the processing in Step S63. Then, the prediction image selection unit 48 supplies the prediction image in the optimal prediction mode to the arithmetic operation unit 33 and the addition unit 40.

In Step S65, the prediction image selection unit 48 determines whether or not the optimal prediction mode is the optimal inter-prediction mode. In a case where it is determined in Step S65 that the optimal prediction mode is the optimal inter-prediction mode, the prediction image selection unit 48 notifies the motion prediction/compensation unit 47 that the prediction image generated in the optimal inter-prediction mode is selected.

Then, in Step S66, the motion prediction/compensation unit 47 supplies the information that specifies the inter-prediction mode information, the motion vector, and the reference image to the reversible coding unit 36, and the processing proceeds to Step S68.

On the other hand, in a case where it is determined in Step S65 that the optimal prediction mode is not the optimal inter-prediction mode, that is, in a case where the optimal prediction mode is the optimal intra-prediction mode, the prediction image selection unit 48 notifies the intra-prediction unit 46 that the prediction image generated in the optimal intra-prediction mode is selected. Then, in Step S67, the intra-prediction unit 46 supplies the intra-prediction mode information to the reversible coding unit 36, and the processing proceeds to Step S68.

In Step S68, the arithmetic operation unit 33 performs coding by subtracting the prediction image that is supplied from the prediction image selection unit 48, from the image that is supplied from the screen rearrangement buffer 32. The arithmetic operation unit 33 outputs the image that is obtained as the result of the coding, as the information on the residual, to the orthogonal transformation unit 34.

In Step S69, the orthogonal transformation unit 34 performs, in units of TU's, the orthogonal transformation processing on the information on the residual. After the orthogonal transformation processing, the orthogonal transformation unit 34 supplies the result of the orthogonal transformation processing to the quantization unit 35.

In Step S70, the quantization unit 35 quantifies the result of the orthogonal transformation processing that is supplied from the orthogonal transformation unit 34. The quantization unit 35 supplies the quantization value that is obtained as the result of the quantization, to the reversible coding unit 36 and the reverse quantization unit 38.

In Step S71, the reverse quantization unit 38 performs the reverse quantization on the quantization value from the quantization unit 35. The reverse quantization unit 38 supplies the result of the orthogonal conversion processing, which is a result of the reverse quantization, to the reverse orthogonal transformation unit 39.

In Step S72, the reverse orthogonal transformation unit 39 performs, in units of TU's, the reverse orthogonal transformation processing on the result of the orthogonal transformation processing that is supplied from the reverse quantization unit 38. The reverse orthogonal transformation unit 39 supplies the information on the residual that is obtained as a result of the reverse orthogonal transformation processing to the addition unit 40.

In Step S73, the addition unit 40 adds together the information on the residual that is supplied from the reverse orthogonal transformation unit 39 and the prediction image that is supplied from the prediction image selection unit 48 and performs decoding. The addition unit 40 supplies the decoded image to the deblock filter 41 and the frame memory 44.

In Step S74, the deblock filter 41 performs deblocking filter processing on the decoded image that is supplied from the addition unit 40. The deblock filter 41 supplies the image that is obtained as the result of the deblocking filter processing to the adaptive offset filter 42.

In Step S75, for every LCU, the adaptive offset filter 42 performs the adaptive offset filter processing on the image that is supplied from the deblock filter 41. The adaptive offset filter 42 supplies the image that is obtained as the result of the adaptive offset filter processing to the adaptive loop filter 43. Furthermore, for every LCU, the adaptive offset filter 42 supplies the offset filter information to the reversible coding unit 36.

In Step S76, for every LCU, the adaptive loop filter 43 performs the adaptive loop filter processing on the image that is supplied from the adaptive offset filter 42. The adaptive loop filter 43 supplies the image that is obtained as the result of the adaptive loop filter processing to the frame memory 44. Furthermore, the adaptive loop filter 43 supplies the filter coefficient that is used in the adaptive loop filter processing to the reversible coding unit 36.

In Step S77, the frame memory 44 accumulates the image that is supplied from the adaptive loop filter 43 and the image that is supplied from the addition unit 40. The image adjacent to the PU, among the images accumulated in the frame memory 44, on which the filter processing is not performed, is supplied, as the neighboring image, to the intra-prediction unit 46 through the switch 45. On the other hand, the image accumulated in the frame memory 44, on which the filter processing is performed, is output, as a reference image, to the motion prediction/compensation unit 47 through the switch 45.

In Step S78, the reversible coding unit 36 reversibly codes information that specifies the intra-prediction mode information or the inter-prediction mode information, the motion vector, and the reference image, the offset filter information, and the filter coefficient, as code information.

In Step S79, the reversible coding unit 36 reversibly codes the quantization value that is supplied from the quantization unit 35. Then, the reversible coding unit 36 generates the code data from the code information and the quantization value that are reversibly coded in Step S78, and supplies the generated code data to the accumulation buffer 37.

In Step S80, the accumulation buffer 37 temporarily stores the code data that is supplied from the reversible coding unit 36.

In Step S81, the rate control unit 49 controls the rate at which the quantization unit 35 performs the quantization operation, in such a manner that an overflow or an underflow does not occur, based on the code data accumulated in the accumulation buffer 37. Furthermore, the rate control unit 49 supplies the luminance signal quantization parameter and the color difference signal quantization parameter, and ChromaQPOffset to the color difference signal quantization unit 50. Then, the processing returns to Step S12 in FIG. 20 and proceeds to Step S13.

Moreover, for the sake of simplicity, the intra-prediction processing and the motion prediction/compensation processing are described as being typically performed in the coding processing in FIGS. 22 and 23, but in some cases, only one of either the intra-prediction processing or the motion prediction/compensation processing, is actually performed depending on a picture type and the like.

(Configuration Example of the Decoding Apparatus According to One Embodiment)

Figure 24:
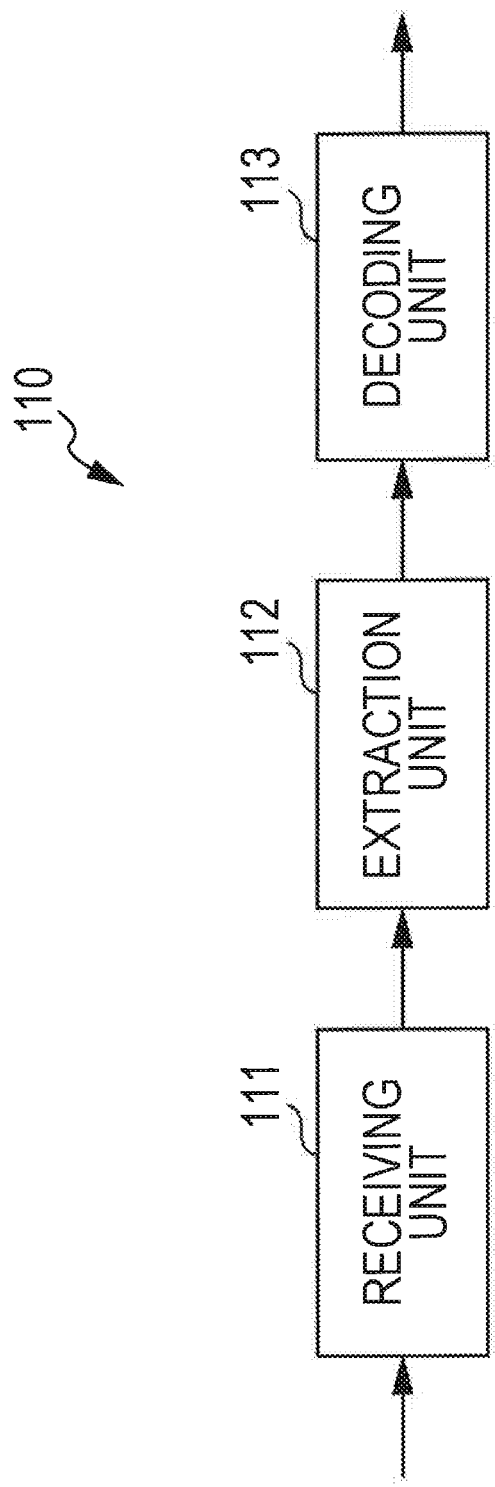
FIG. 24 is a block diagram illustrating a configuration example of a decoding apparatus according to the first embodiment, to which the present disclosure is applied.

FIG. 24 is a block diagram illustrating a configuration example of the decoding apparatus according to one embodiment, which decodes the code stream that is transferred from the coding apparatus 10 in FIG. 20, and to which the present disclosure is applied.

A decoding apparatus 110 in FIG. 24 is configured from a receiving unit 111, an extraction unit 112, and a decoding unit 113.

The receiving unit 111 of the decoding apparatus 110 receives the code stream that is transferred from the coding apparatus 10 in FIG. 20, and supplies the received code stream to the extraction unit 112.

The extraction unit 112 extracts the parameter set, such as the VPS or SPS, and the code data, from the code stream that is supplied from the receiving unit 111, and supplies a result of the extraction to the decoding unit 113.

The decoding unit 113 decodes the code data that is supplied from the extraction unit 112, using a scheme in accordance with the HEVC scheme. At this time, the decoding unit 113 refers also to the parameter set that is supplied from the extraction unit 112, whenever necessary. The decoding unit 113 outputs the image that is obtained as a result of the decoding.

(Configuration Example of the Decoding Unit)

Figure 25:
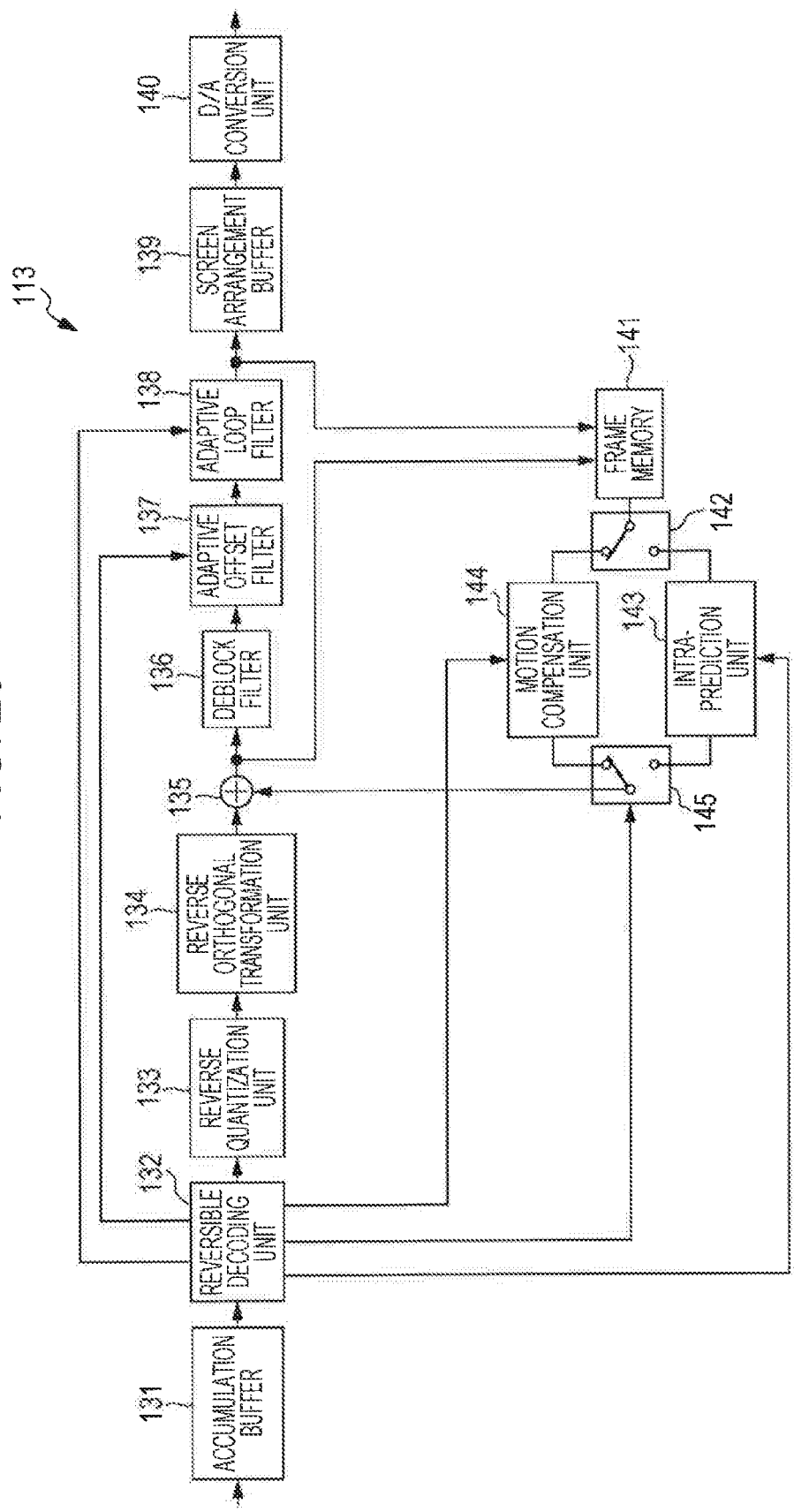
FIG. 25 is a block diagram illustrating a configuration example of a decoding unit in FIG. 24.

FIG. 25 is a block diagram illustrating a configuration example of the decoding unit 113 in FIG. 24.

The decoding unit 113 in FIG. 25 has an accumulation buffer 131, a reversible decoding unit 132, a reverse quantization unit 133, a reverse orthogonal transformation unit 134, an addition unit 135, a deblock filter 136, an adaptive offset filter 137, an adaptive loop filter 138, and a screen rearrangement buffer 139. Furthermore, the decoding unit 113 has a D/A conversion unit 140, a frame memory 141, a switch 142, an intra-prediction unit 143, a motion compensation unit 144, and a switch 145.

The accumulation buffer 131 of the decoding unit 113 receives the code data from the extraction unit 112 in FIG. 24 for accumulation. The accumulation buffer 131 supplies the accumulated code data to the reversible decoding unit 132.

The reversible decoding unit 132 obtains the quantization value and the code information by performing variable-length decoding or reversible decoding such as arithmetic decoding on the code data from the accumulation buffer 131. The reversible decoding unit 132 supplies the quantization value to the reverse quantization unit 133. Furthermore, the reversible decoding unit 132 supplies the intra-prediction mode information and the like, as the code information, to the intra-prediction unit 143. The reversible decoding unit 132 supplies the information that specifies the motion vector, the inter-prediction mode information, and the reference image, and the like to the motion compensation unit 144.

Moreover, the reversible decoding unit 132 supplies the intra-prediction mode information or the inter-prediction mode information, as the code information, to the switch 145. The reversible decoding unit 132 supplies the offset filter information, as the code information, to the adaptive offset filter 137. The reversible decoding unit 132 supplies the filter coefficient, as the code information, to the adaptive loop filter 138.

The reverse quantization unit 133, the reverse orthogonal transformation unit 134, the addition unit 135, the deblock filter 136, the adaptive offset filter 137, the adaptive loop filter 138, the frame memory 141, the switch 142, the intra-prediction unit 143, and the motion compensation unit 144 perform the same processing tasks as the reverse quantization unit 38, the reverse orthogonal transformation unit 39, the addition unit 40, the deblock filter 41, the adaptive offset filter 42, the adaptive loop filter 43, the frame memory 44, the switch 45, the intra-prediction unit 46, and the motion prediction/compensation unit 47, which are illustrated in FIG. 19, respectively, and thus the image is decoded.

Specifically, the reverse quantization unit 133 has the same configuration as the reverse quantization unit 38 in FIG. 19. The reverse quantization unit 133 performs, in units of TU's, the reverse quantization on the quantization value from the reversible decoding unit 132. The reverse quantization unit 133 supplies the result of the orthogonal transformation processing, which is the result of the reverse quantization, to the reverse orthogonal transformation unit 134.

The reverse orthogonal transformation unit 134 is configured in the same manner as the reverse orthogonal transformation unit 39 in FIG. 19. The reverse orthogonal transformation unit 134 performs the reverse orthogonal transformation processing on the result of the orthogonal transformation processing that is supplied from the reverse quantization unit 133, using the parameters for the luminance signal quantization and the parameters for the color difference signal quantization that are supplied from the color difference signal reverse quantization unit 51. The reverse orthogonal transformation unit 134 supplies the information on the residual that is obtained as the result of the reverse orthogonal transformation processing to the addition unit 135.

The addition unit 135 performs the decoding by adding together the information on the residual that is supplied from the reverse orthogonal transformation unit 134 and the prediction image that is supplied from the switch 145. The addition unit 135 supplies the decoded image to the deblock filter 136 and the frame memory 141.

The deblock filter 136 performs the adaptive deblock filter processing on the image that is supplied from the addition unit 135 and supplies the image that is obtained as the result of the adaptive deblock filter processing to the adaptive offset filter 137.

For every LCU, the adaptive offset filter 137 performs the adaptive offset filter processing of a type that is indicated by the offset filter information, on the image on which the adaptive deblock filter processing has already been performed, using the offset that is indicated by the offset filter information from the reversible decoding unit 132. The adaptive offset filter 137 supplies the image on which the adaptive offset filter processing has already been performed to the adaptive loop filter 138.

For every LCU, the adaptive loop filter 138 performs the adaptive loop filter processing on the image that is supplied from the adaptive offset filter 137, using the filter coefficient that is supplied from the reversible decoding unit 132. The adaptive loop filter 138 supplies the image that is obtained as the result of the adaptive loop filter processing, to the frame memory 141 and the screen rearrangement buffer 139.

The screen rearrangement buffer 139 stores, in units of frames, the images that are supplied from the adaptive loop filter 138. The screen rearrangement buffer 139 rearranges the stored images in unites of frames that are arranged in coding order, in the original display order and supplies the rearranged images to the D/A conversion unit 140.

The D/A conversion unit 140 D/A converts and outputs the images in units of frames that are supplied from the screen rearrangement buffer 139.

The frame memory 141 accumulates the image that is supplied from the adaptive loop filter 138 and the image that is supplied from the addition unit 135. The image adjacent to the PU, among the images accumulated in the frame memory 141, on which the filter processing is not performed, is supplied, as the neighboring image, to the intra-prediction unit 143 through the switch 142. On the other hand, the image accumulated in the frame memory 141, on which the filter processing is performed, is supplied, as the reference image, to the motion compensation unit 144 through the switch 142.

The intra-prediction unit 143 performs the intra-prediction processing in the optimal intra-prediction mode that is indicated by the intra-prediction mode information that is supplied from the reversible decoding unit 132, using the neighboring image that is read from the frame memory 141 through the switch 142. The intra-prediction unit 143 supplies the prediction image that is generated as a result of the intra-prediction processing to the switch 145.

The motion compensation unit 144 reads the reference image that is specified by the information that specifies the reference image that is supplied from the reversible decoding unit 132, from the frame memory 141 through the switch 142. The motion compensation unit 144 performs motion compensation processing in the optimal inter-prediction mode that is indicated by the inter-prediction mode information that is supplied from the reversible decoding unit 132, using the motion vector and the reference image that are supplied from the reversible decoding unit 132. The motion compensation unit 144 supplies the prediction image that is generated as a result of the motion compensation processing to the switch 145.

In a case where the intra-prediction mode information is supplied from the reversible decoding unit 132, the switch 145 supplies the prediction image that is supplied from the intra-prediction unit 143 to the addition unit 135. On the other hand, in a case where the inter-prediction mode information is supplied from the reversible decoding unit 132, the switch 145 supplies the prediction image that is supplied from the motion compensation unit 144 to the addition unit 135.

(Description of the Processing by the Decoding Apparatus)

Figure 26:
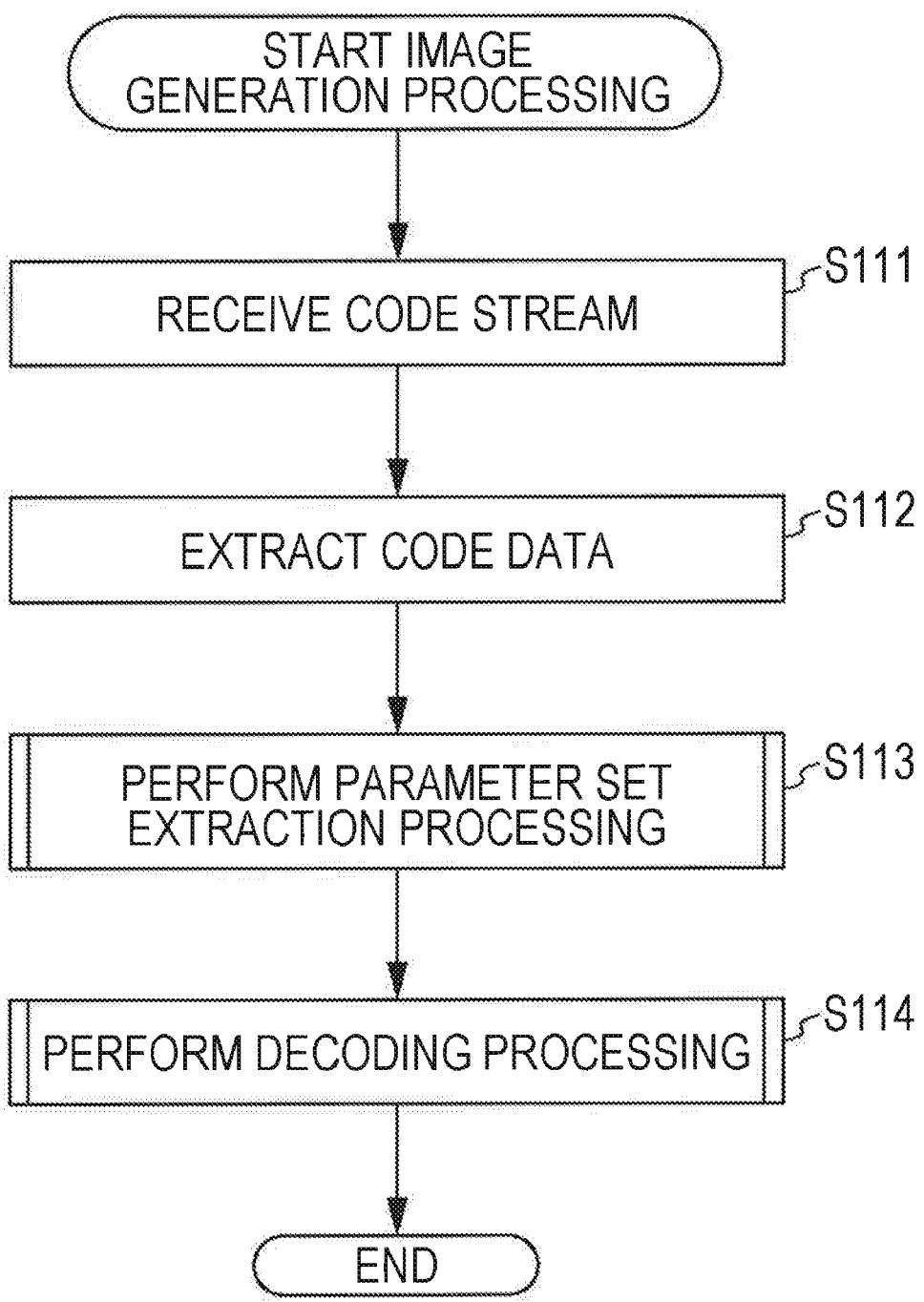
FIG. 26 is a flowchart for describing image generation processing by the decoding apparatus in FIG. 24.

FIG. 26 is a flowchart for describing image generation processing by the decoding apparatus 110 in FIG. 24.

In Step S111 in FIG. 26, the receiving unit 111 of the decoding apparatus 110 receives the code stream that is transferred from the coding apparatus 10 in FIG. 18, and supplies the received code stream to the extraction unit 112.

In Step S112, the extraction unit 112 extracts the code data from the code stream that is supplied from the receiving unit 111, and supplies the extracted code data to the decoding unit 113.

In Step S113, the extraction unit 112 extracts the parameter set such as the VPD, the SPS, or the like, from the code stream that is supplied from the receiving unit 111, and supplies the extracted parameter set to the decoding unit 113. This extraction processing is described in detail referring to FIG. 27.

In Step S114, the decoding unit 113 performs decoding processing that decodes the code data that is supplied from the extraction unit 112, using a scheme in accordance with the HEVC scheme, using the parameter set that is supplied from the extraction unit 112, whenever necessary. This decoding processing is described in detail referring to FIG. 28. Then, the processing ends.

Figure 27:
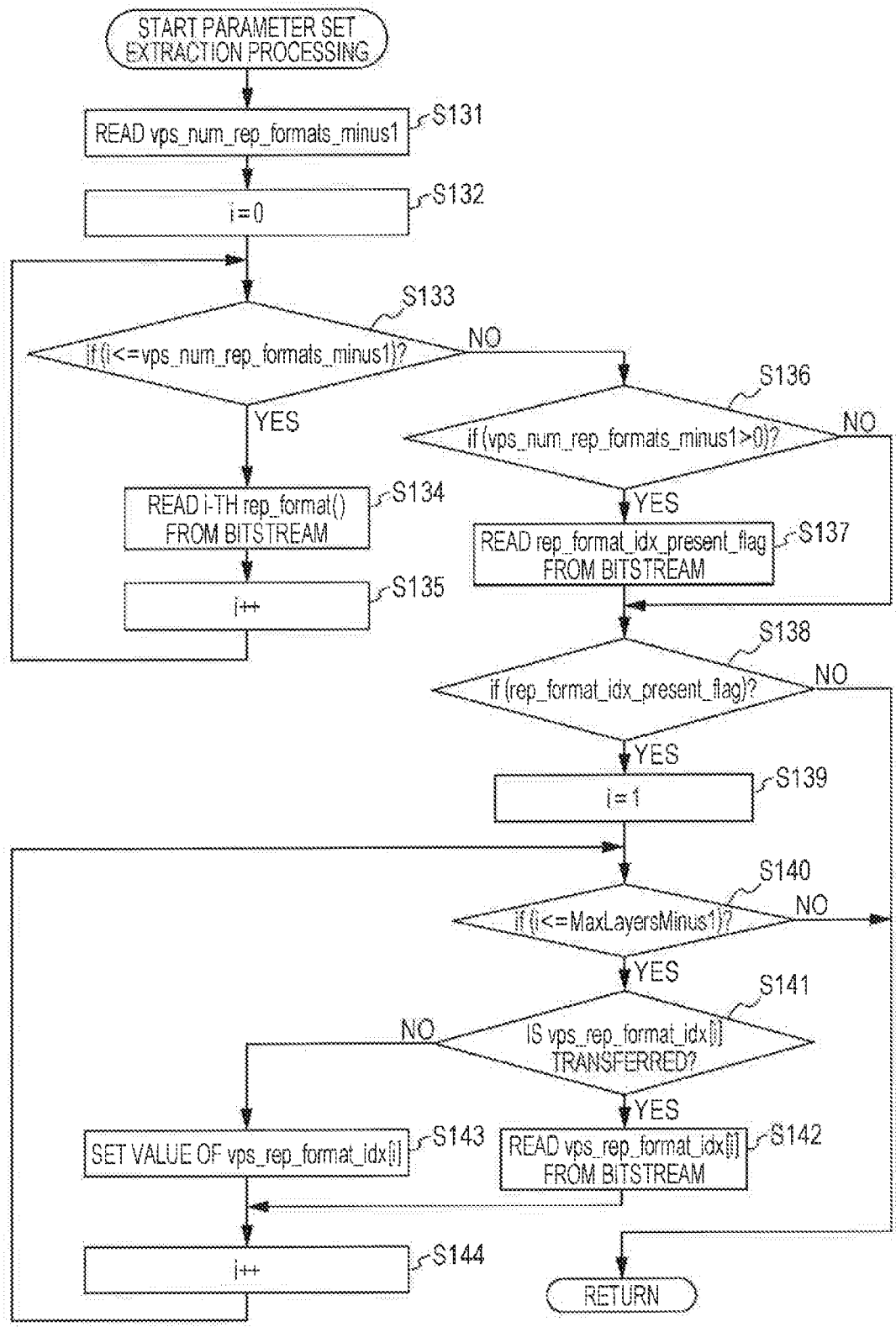
FIG. 27 is a flowchart for describing parameter set extraction processing by the decoding apparatus in FIG. 26.

Next, the parameter extraction processing in Step S113 in FIG. 26 is described in detail referring to FIG. 27.

In Steps S131, the extraction unit 112 reads vps_num_rep_formats_minus 1 from the code stream. In Step S132, the extraction unit 112 performs the setting in such a manner that i=0.

In Step S133, it is determined whether or not vps_num_rep_formats_minus 1 is equal to or less than 1. In a case where it is determined in Step S133 that vps_num_rep_formats_minus 1 is equal to or less than 1, the processing proceeds to Step S134.

The extraction unit 112 extracts i-th rep_format( ) from the bitstream in Step S134, and performs i++ in Step S135. Thereafter, the processing returns to Step S133 and repeats Step S133 and subsequent steps.

In a case where it is determined in Step S133 that i is greater than vps_num_rep_formats_minus 1, the processing proceeds to Step S136.

In Step S136, the extraction unit 112 determines whether or not vps_num_rep_formats_minus 1 is greater than 0. In a case where it is determined in Step S136 that vps_num_rep_formats_minus 1 is greater than 0, in Step S137, the extraction unit 112 reads rep_format_idx_present_flag 1 from the bitstream.

In a case where it is determined in Step S136 that vps_num_rep_formats_minus 1 is equal to or less than 0, the processing in Step S137 is skipped.

In Step S138, the extraction unit 112 determines whether or not vps_num_rep_formats_minus 1 is 1. In a case where it is determined in Step S138 that vps_num_rep_formats_minus 1 is 1, the extraction unit 112 performs the setting in such a manner that i=1, in Step S139.

In Step S140, it is determined whether or not i is equal to or less than MaxLayersMinus 1. In a case where it is determined in Step S140 that i is equal to or less than MaxLayersMinus 1, in Step S141, the extraction unit 112 determines whether or not vps_rep_format_idx[i] is transferred.

In a case where it is determined in Step S141 that vps_rep_format_idx[i] is transferred, in Step S142, the extraction unit 112 reads vps_rep_format_idx[i] from the bitstream.

In a case where it is determined in Step S141 that vps_rep_format_idx[i] is not transferred, in Step S143, the extraction unit 112 sets a value of vps_rep_format_idx[i]. Specifically, the value of vps_rep_format_idx[i] is set as rep_format_idx_present_flag?0:Min(i, vps_num_rep_formats_minus 1), that is, in such a manner that when rep_format_idx_present_flag is 0, i is smaller than vps_num_rep_formats_minus 1.

Thereafter, in Step S144, the extraction unit 112 performs the setting in such a manner that i++, and the processing returns to Step S140 and repeats S140 and subsequent steps.

On the other hand, in a case where it is determined in Step S138 that vps_num_rep_formats_minus 1 is not 1, or in a case where it is determined in Step S140 that i is equal to less than MaxLayersMinus 1 is smaller than 1, parameter set extraction processing ends and the processing returns to Step S113 in FIG. 26.

Figure 28:
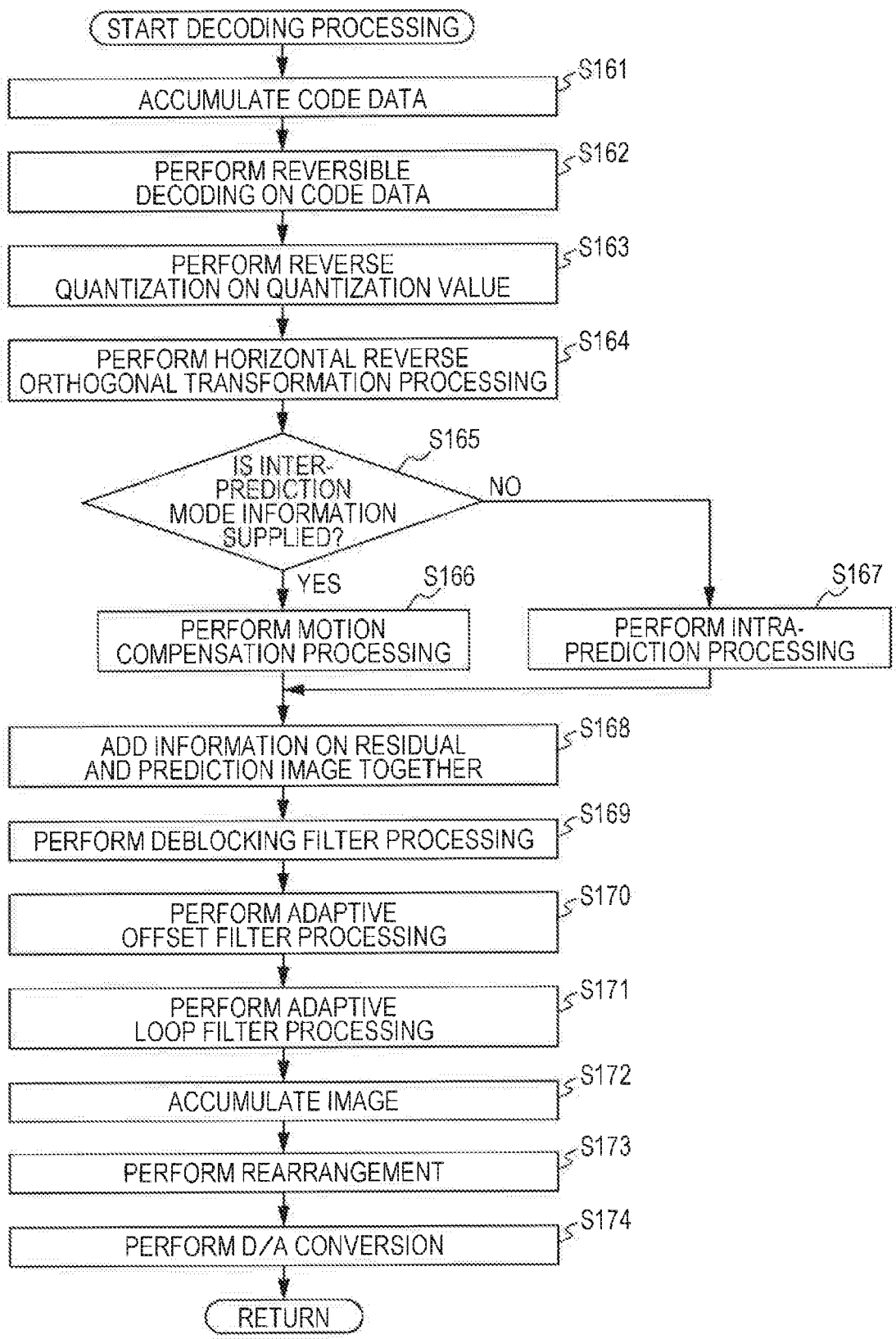
FIG. 28 is a flowchart for describing decoding processing in FIG. 26 in detail.

Next, the decoding processing in Step S113 in FIG. 26 is described in detail referring to FIG. 28.

In Step S161 in FIG. 28, the accumulation buffer 131 (in FIG. 25) of the decoding unit 113 receives the code data in units of frames from the extraction unit 112 in FIG. 24 for accumulation. The accumulation buffer 131 supplies the accumulated code data to the reversible decoding unit 132.

In Step S162, the reversible decoding unit 132 reversibly decodes the code data from the accumulation buffer 131 and obtains the quantization value and the code information. The reversible decoding unit 132 supplies the quantization value to the reverse quantization unit 133.

Furthermore, the reversible decoding unit 132 supplies the intra-prediction mode information and the like, as the code information, to the intra-prediction unit 143. The reversible decoding unit 132 supplies the information that specifies the motion vector, the inter-prediction mode information, and the reference image, and the like to the motion compensation unit 144.

Moreover, the reversible decoding unit 132 supplies the intra-prediction mode information or the inter-prediction mode information, as the code information, to the switch 145. The reversible decoding unit 132 supplies the offset filter information, as the code information, to the adaptive offset filter 137, and supplies the filter coefficient to the adaptive loop filter 138.

In Step S163, the reverse quantization unit 133 reversibly quantizes the quantization value that is supplied from the reversible decoding unit 132. The reverse quantization unit 133 supplies the result of the orthogonal transformation processing, which is a result of the reverse quantization, to the reverse orthogonal transformation unit 134.

In Step S164, the reverse orthogonal transformation unit 134 performs the reverse orthogonal transformation processing on the result of the orthogonal transformation processing from the reverse quantization unit 133.

In Step S165, the motion compensation unit 144 determines whether or not the inter-prediction mode information is supplied from the reversible decoding unit 132. In a case where it is determined in Step S165 that the inter-prediction mode information is supplied, the processing proceeds to Step S166.

In Step S166, the motion compensation unit 144 reads the reference image, based on the information that specifies the reference image, which is supplied from the reversible decoding unit 132, and performs the motion compensation processing in the optimal inter-prediction mode that is indicated by the inter-prediction mode information, using the motion vector and the reference image. The motion compensation unit 144 supplies the prediction image that is generated as a result of the motion compensation processing, to the addition unit 135 through the switch 145, and the processing proceeds to Step S168.

On the other hand, in a case where it is determined in Step S165 that the inter-prediction mode information is not supplied, that is, in a case where the intra-prediction mode information is supplied to the intra-prediction unit 143, the processing proceeds to Step S167.

In Step S167, the intra-prediction unit 143 performs the intra-prediction processing in the intra-prediction mode that is indicated by the intra-prediction mode information, using the neighboring image that is read from the frame memory 141 through the switch 142. The intra-prediction unit 143 supplies the prediction image that is generated as the result of the intra-prediction processing, to the addition unit 135 through the switch 145, and the processing proceeds to Step S168.

In Step S168, the addition unit 135 performs the decoding by adding together the information on the residual that is supplied from the reverse orthogonal transformation unit 134 and the prediction image that is supplied from the switch 145. The addition unit 135 supplies the decoded image to the deblock filter 136 and the frame memory 141.

In Step S169, the deblock filter 136 performs deblocking filter processing on the image that is supplied from the addition unit 135, and removes the block distortion. The deblock filter 136 supplies the image that is obtained as the result of the deblocking filter processing to the adaptive offset filter 137.

In Step S170, for every LCU, the adaptive offset filter 137 performs the adaptive offset filter processing on the image on which the deblocking filter processing has already been performed by the deblock filter 136, based on the offset filter information that is supplied from the reversible decoding unit 132. The adaptive offset filter 137 supplies the image on which the adaptive offset filter processing has already been performed to the adaptive loop filter 138.

In Step S171, for every LCU, the adaptive loop filter 138 performs the adaptive loop filter processing on the image that is supplied from the adaptive offset filter 137, using the filter coefficient that is supplied from the reversible decoding unit 132. The adaptive loop filter 138 supplies the image that is obtained as the result of the adaptive loop filter processing, to the frame memory 141 and the screen rearrangement buffer 139.

In Step S172, the frame memory 141 accumulates the image that is supplied from the addition unit 135 and the image that is supplied from the adaptive loop filter 138. The image adjacent to the PU, among the images accumulated in the frame memory 141, on which the filter processing is not performed, is supplied, as the neighboring image, to the intra-prediction unit 143 through the switch 142. On the other hand, the image accumulated in the frame memory 141, on which the filter processing is performed, is supplied, as the reference image, to the motion compensation unit 144 through the switch 142.

In Step S173, the screen rearrangement buffer 139 stores, in units of frames, the images that are supplied from the adaptive loop filter 138, rearranges the stored images in units of frames, which are arranged in coding order, in the original display order, and supplies the rearranged images to the D/A conversion unit 140.

In Step S174, the D/A conversion unit 140 D/A converts and outputs the images in units of frames that are supplied from the screen rearrangement buffer 139. Then, the processing returns to Step S113 in FIG. 26, and ends.

As described above, the default mapping between the enhancement layer and the resolution information can be improved.

A coding scheme in accordance with the HEVC is described above as being used. However, the present technology is not limited to this, and other coding schemes/decoding schemes can be used.

Moreover, the present disclosure, for example, can be applied to an image coding apparatus and an image decoding apparatus that are used in a case where image information (a bitstream), which is compressed by orthogonal transformation such as discrete cosine transformation and by motion compensation in the same manner as with the HEVC scheme and the like, is received through satellite broadcasting, cable television, the Internet, or a network medium such as a portable telephone. Furthermore, the present disclosure can be applied to an image coding apparatus and an image decoding apparatus that are used in a case where processing is performed on a storage medium such as an optical disc, a magnetic disk, or a flash memory.

Second Embodiment (Description of a Computer to which the Present Disclosure is Applied)

A sequence of processing described above can be executed in hardware and can be executed in software. In a case where the sequence of processing is executed in software, a program making up the software is installed on a computer. The computers here include a computer that is built into dedicated hardware, a general-purpose personal computer such as one that is capable of executing various functions by installing various programs, and the like.

Figure 29:
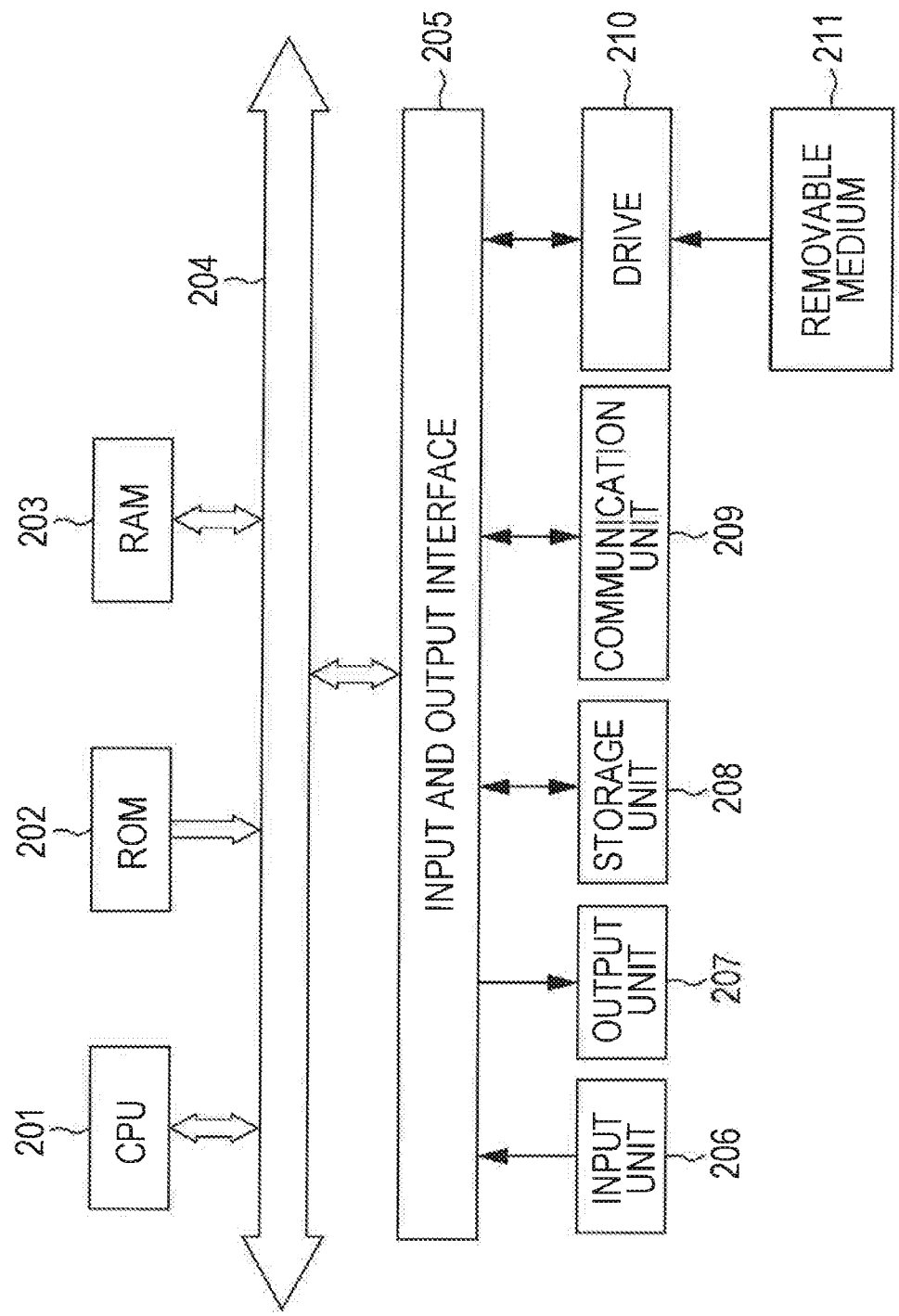
FIG. 29 is a block diagram illustrating an example of a hardware configuration of a computer.

FIG. 29 is a block diagram illustrating an example of a hardware configuration of a computer that executes the sequence of processing described above using a program.

In the computer, a central processing unit (CPU) 201, a read only memory (ROM) 202, and a random access memory (RAM) 203 are connected to one another through a bus 204.

Moreover, an input and output interface 205 is connected to the bus 204. An input unit 206, an output unit 207, a storage unit 208, a communication unit 209, and a drive 210 are connected to the input and output interface 205.

The input unit 206 includes a keyboard, a mouse, a microphone and the like. The output unit 207 includes a display, a speaker, and the like. The storage unit 208 includes a hard disk, a non-volatile memory, and the like. The communication unit 209 includes a network interface and the like. The drive 210 drives a removable medium 211, such as a magnetic disk, an optical disc, a magneto-optical disk, or a semiconductor memory.

In the computer with the configuration described above, the CPU 201 performs the sequence of processing described above, for example, by loading the program stored in the storage unit 208 onto the RAM 203 through the input and output interface 205 and the bus 204 and thus executing the program.

The program that is executed by the computer (the CPU 201) can be recorded, for example, on the removable medium 211 such as a package medium and thus may be provided. Furthermore, the program can be provided over a wire or wireless transmission medium such as a local area network, the Internet, or digital satellite broadcasting.

In the computer, the program can be installed in the storage unit 208 through the input and output interface 205 by mounting the removable medium 211 onto the drive 210. Furthermore, the program can be received with the communication unit 209 through the cable or wireless transmission medium and be installed in the storage unit 208. In addition, the program can be installed in advance on the ROM 202 or in the storage unit 208.

Moreover, the program that is executed by the computer may be a program by which the processing is performed in time series in the order described in the present specification, or may be a program by which the processing is performed in parallel or at a necessary timing, such as when a request to execute the processing is made.

Third Embodiment (Application to Multiview Image Coding/Multiview Decoding)

Figure 30:
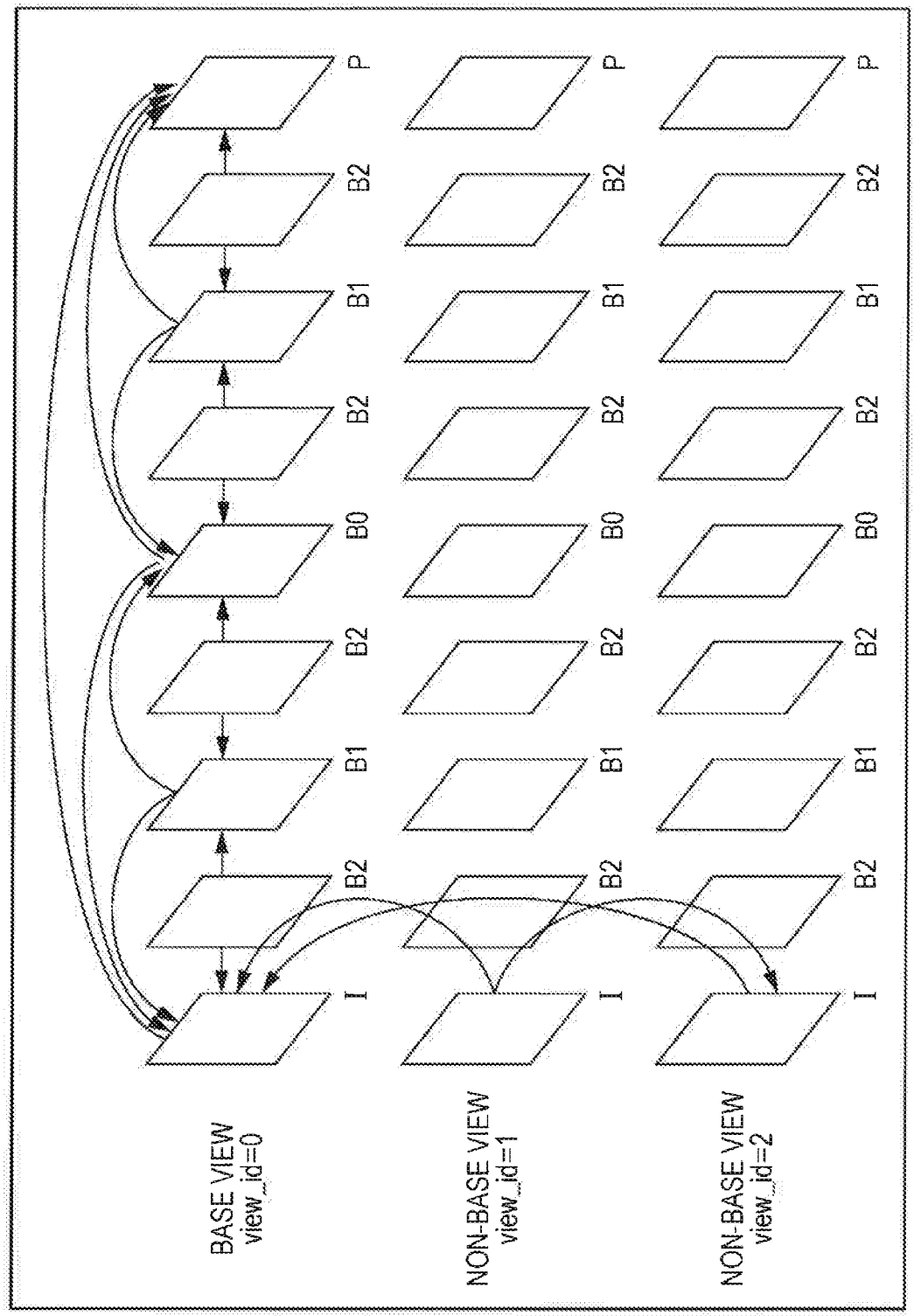
FIG. 30 is a diagram illustrating an example of a multi-view image coding scheme.

The sequence of processing described above can be applied to multiview image coding/multiview image decoding. FIG. 30 illustrates one example of a multiview image coding scheme.

As illustrated in FIG. 30, a multiview image includes images in multiple views. Multiple views of the multiview image are made from a base view, only an image in the base view being coded/decoded without using an image in any other view, and a non-base view, an image in the non-base view being coded/decoded using the image in any other view. For the non-base view, the image in the base view may be used, and the image in any other non-base view may be used.

In a case where the multiview image illustrated in FIG. 22 is coded/decoded, the image in each view may be coded/decoded, but the method according to the first embodiment, which is described above, may be applied to the coding/decoding for each view. When this is done, the default mapping between the enhancement layer and the resolution information can be improved. Accordingly, coding efficiency is improved.

Moreover, in the coding/decoding for each view, the parameters that are used in the method according to the first embodiment, which is described, may be shared. More specifically, for example, the VPS, the SPS and the like, as the code information, may be shared in the coding/decoding for each view. Of course, information other than this also may be shared in the coding/decoding for each view.

When this is done, the number of times that redundant information is transferred can be reduced, and an amount of information (an amount of coding) to transfer can be decreased (in other words, a decrease in the coding efficiency can be suppressed).

(Multiview Image Coding Apparatus)

Figure 31:
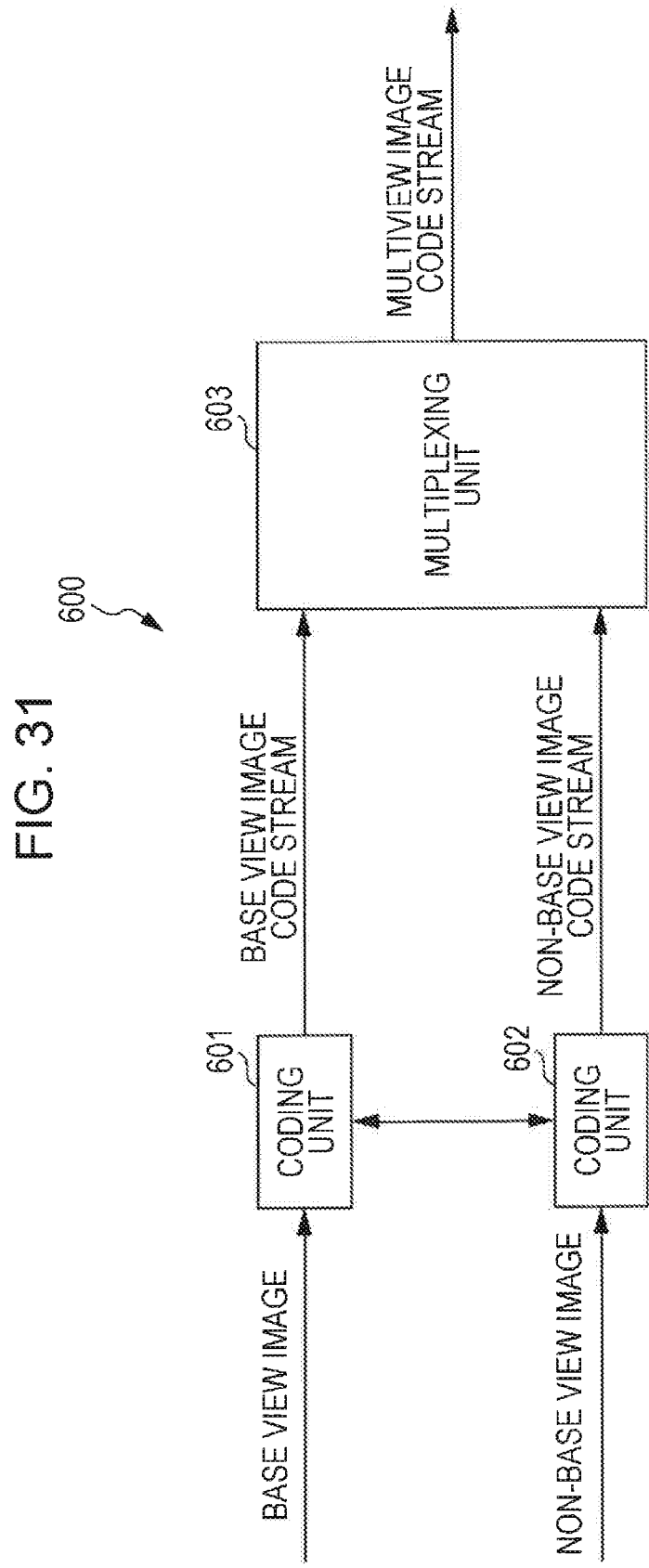
FIG. 31 is a diagram illustrating a configuration example of a multiview image coding apparatus to which the present disclosure is applied.

FIG. 31 is a diagram illustrating a multiview image coding apparatus that performs multiview image coding described above. As illustrated in FIG. 31, the multiview image coding apparatus 600 has a coding unit 601, a coding unit 602, and a multiplexing unit 603.

The coding unit 601 codes a base view image and generates the coding and generates a base view image code stream. The coding unit 602 codes the non-base view image and generates a non-base view image code stream. The multiplexing unit 603 multiplexes the base view image code stream generated in the coding unit 601 and the non-base view image code stream generated in the coding unit 602, and generates a multiview image code stream.

The coding apparatus 10 (in FIG. 18) can be used instead of the coding unit 601 and the coding unit 602 of the multiview image coding apparatus 600. In other words, in the coding for each view, the default mapping between the enhancement layer and the resolution information can be improved. Furthermore, because both of the coding unit 601 and the coding unit 602 can perform the coding (that is, can share flags or parameters), using the same flags or parameters (for example, syntax elements associated with the processing of the images), decrease in the coding efficiency can be suppressed.

(Multiview Image Decoding Apparatus)

Figure 32:
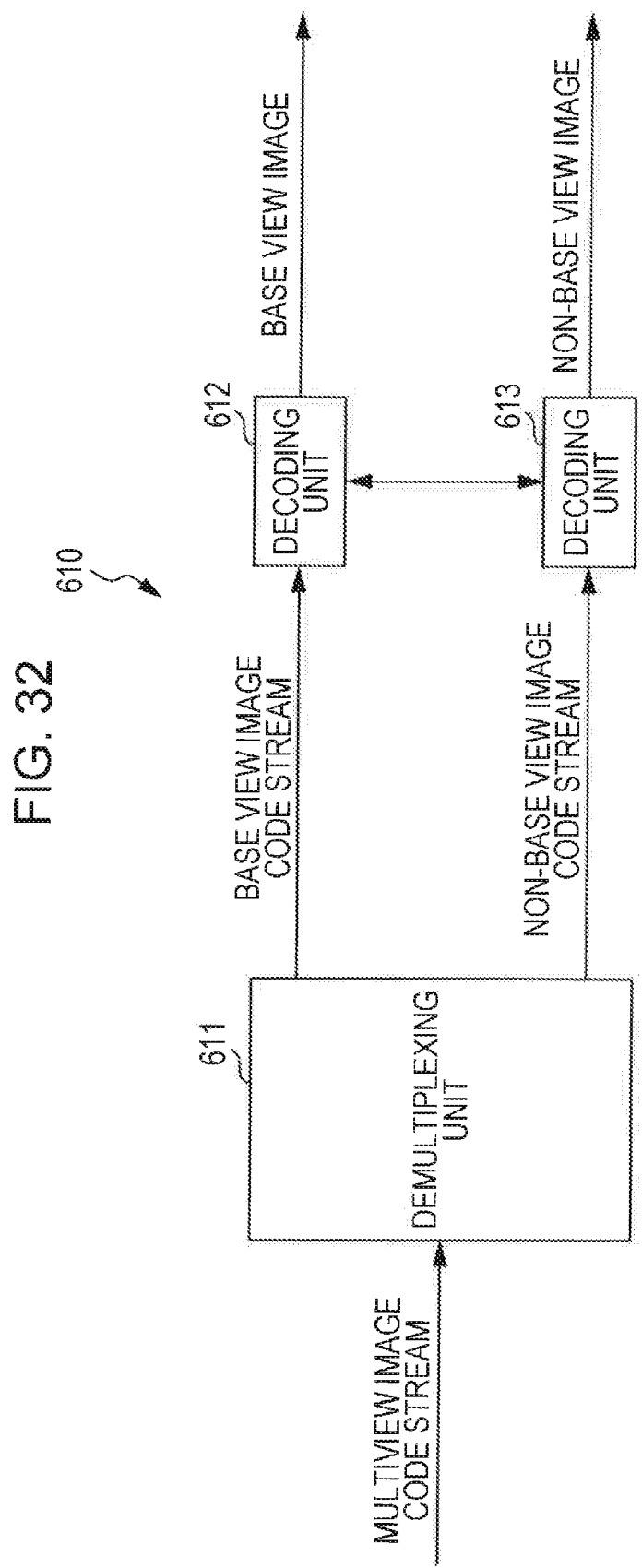
FIG. 32 is a diagram illustrating a configuration example of a multiview image decoding apparatus to which the present disclosure is applied.

FIG. 32 is a diagram illustrating a multiview image decoding apparatus that performs multiview image decoding described above. As illustrated in FIG. 32, the multiview image decoding apparatus 610 has a demultiplexing unit 611, a decoding unit 612, and a decoding unit 613.

The demultiplexing unit 611 demultiplexes the multiview image code stream in which the base view image code stream and the non-base view image code stream are multiplexed and extracts the base view image code stream and the non-base view image code stream. The decoding unit 612 decodes the base view image code stream that is extracted by the demultiplexing unit 611 and obtains the base view image. The decoding unit 613 decodes the non-base view image code stream that is extracted by the demultiplexing unit 611 and obtains the non-base view image.

The decoding apparatus 110 (in FIG. 24) can be used instead of the decoding unit 612 and the decoding unit 613 of the multiview image decoding apparatus 610. In other words, the default mapping between the enhancement layer and the resolution information can be improved. Furthermore, because both of the decoding unit 612 and the decoding unit 613 can perform the decoding (that is, can share flags or parameters), using the same flags or parameters (for example, syntax elements associated with the processing of the images, and the like), decrease in the coding efficiency can be suppressed.

Fourth Embodiment (Application to the Layered Image Coding/Layered Image Decoding)

Figure 33:
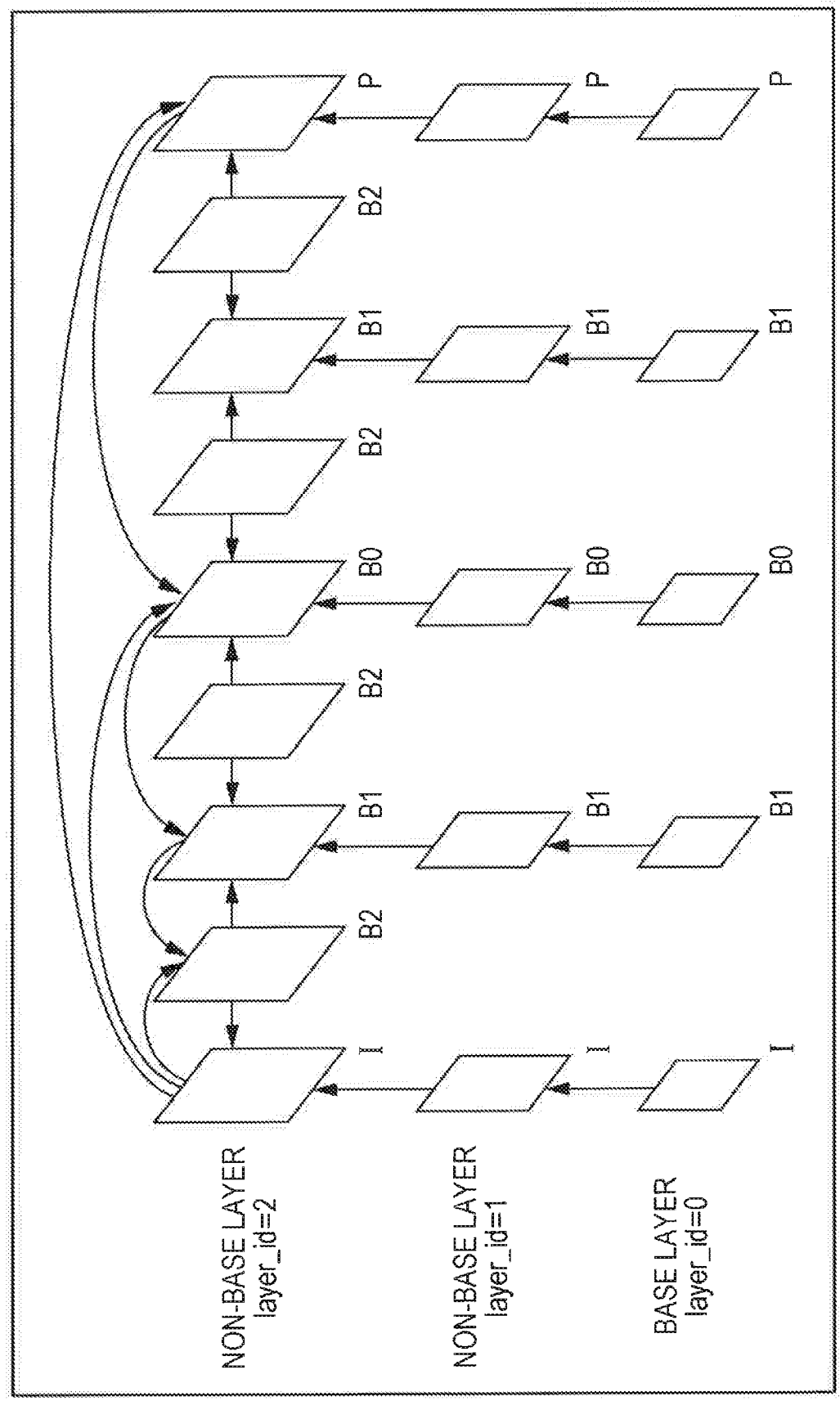
FIG. 33 is a diagram illustrating an example of a layered image coding scheme.

The processing described above can be applied to layered image coding/layered image decoding (scalable coding/scalable decoding). FIG. 33 illustrates one example of a layered image coding scheme.

The layered image coding (scalable coding) hierarchically divides (layers) the image into multi layers and codes each layer, in such a manner that a predetermined parameter has a scalable function with respect to image data. Layered image decoding (scalable decoding) is decoding corresponding to the layered image coding.

As illustrated in FIG. 33, in the layering of the image, a first image is divided into multiple images (layers), with the predetermined parameter with the scalable function serving as a reference. In other words, an image (layered image) that is hierarchically divided includes multiple images (layers) that are different from one another in values of the predetermined parameters. The multiple layers of the layered image are made from a base layer, only an image in the base layer being coded/decoded without using an image in any other layer, and a non-base layer (also referred to as the enhancement layer), an image in the non-base being coded/decoded using the image in any other layer. For the non-base layer, the image in the base layer may be used, and the image in any other non-base layer may be used.

Generally, the non-base layer is configured from an image in the non-base layer itself and difference image data (difference data) between the image in the non-base image itself and the image in any other layer, in such a manner that redundancy is decreased. For example, in a case where the first image is hierarchically divided into two layers: the base layer and the non-base layer (also referred to as the enhancement layer), an image that has poorer quality than an original image is obtained with only data on the base layer, and the original image (that is, the high-quality image) is obtained by combining the data on the base layer and data on the non-base layer.

By layering the image in this manner, images with various levels of quality can be easily obtained depending on a situation. That is, for example, it is possible to transfer image compression information only in the base layer to a terminal that has a limited processing capability, such as a portable telephone. Alternatively, it is possible to transfer image compression information in the enhancement layer in addition to that in the base layer to a terminal that has a high processing capability, such as a television set or a personal computer that reproduces a moving image that has low spatial and temporal resolution or has low quality. Alternatively, it is possible to transmit from a server the image compression information that depends on an a capability of the terminal of a network, as is the case when a moving image that has high spatial and temporal resolution or has high-quality is reproduced without performing transcode processing.

In a case where the layered image is coded/decoded as in the example in FIG. 33, the image in each layer is coded/decoded, but the method according to the first embodiment, which is described above, may be applied to the coding/decoding for each layer. When this is done, the default mapping between the enhancement layer and the resolution information can be improved. Accordingly, coding efficiency is improved.

Moreover, in the coding/decoding for each layer, the flags or the parameters that are used in the method according to the first embodiment, which is described may be shared. More specifically, for example, the VPS, the SPS and the like, as the code information may be shared in the coding/decoding for each layer. Of course, information other than this also may be shared in the coding/decoding for each layer.

When this is done, the number of times that the redundant information is transferred can be reduced, and an amount of information (an amount of coding) to transfer can be decreased (in other words, a decrease in the coding efficiency can be suppressed).

(Scalable Parameter)

Figure 34:
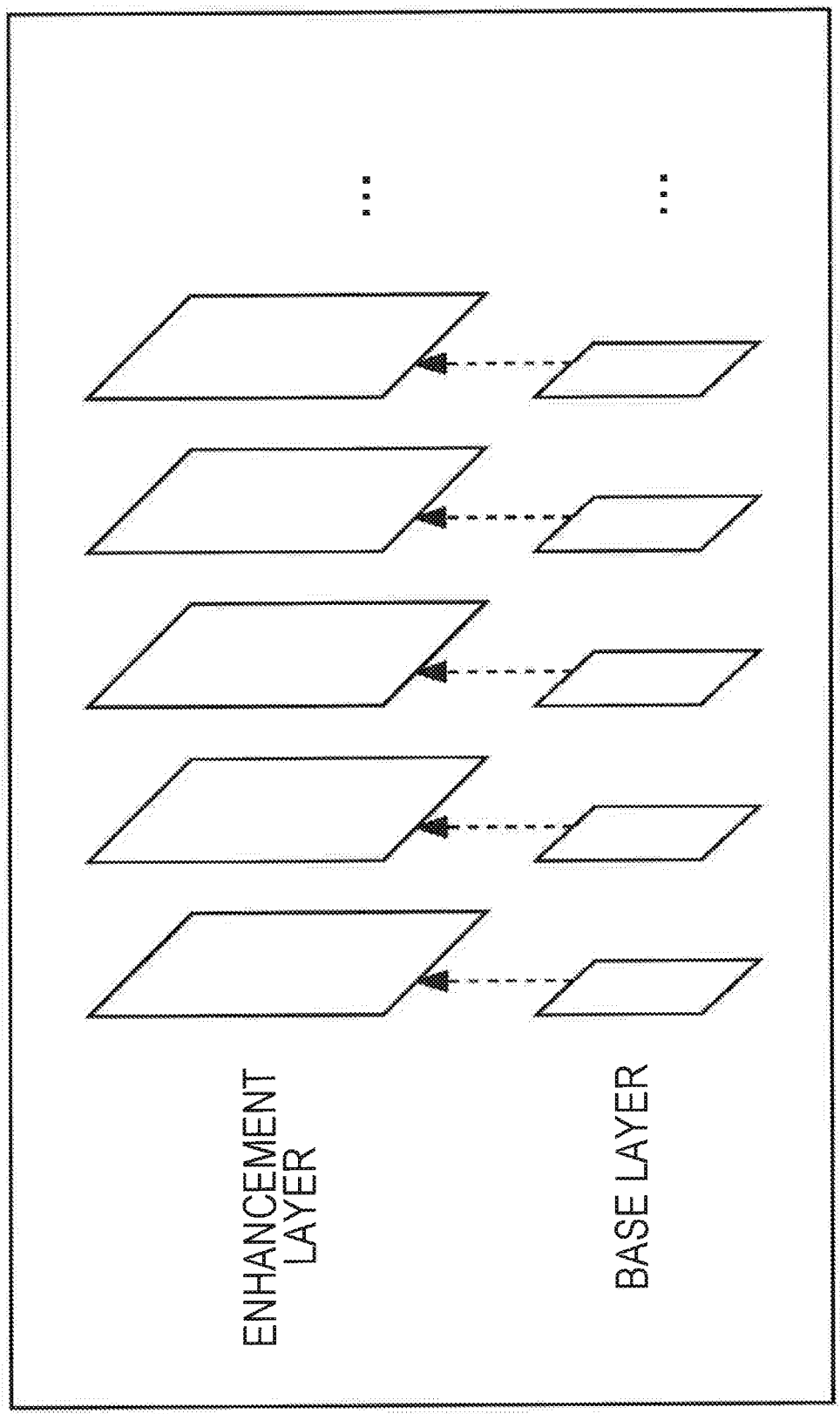
FIG. 34 is a diagram for describing an example of special scalable coding.

In the layered image coding/layered image decoding (the scalable coding/scalable decoding), a parameter having the scalable function is arbitrary. For example, a spatial resolution illustrated in FIG. 34 may be set to be such a parameter (spatial scalability). In a case of the spatial scalability, a resolution of the image varies from one layer to another. In other words, in this case, as illustrated in FIG. 34, each picture is hierarchically divided into two layers: the base layer that has a lower spatial resolution than the original image and the enhancement layer of which the original spatial resolution is obtained by being combined with the base layer. Of course, the number of layers in this case is one example, and the image can be hierarchically divided into an arbitrary number of layers.

Figure 35:
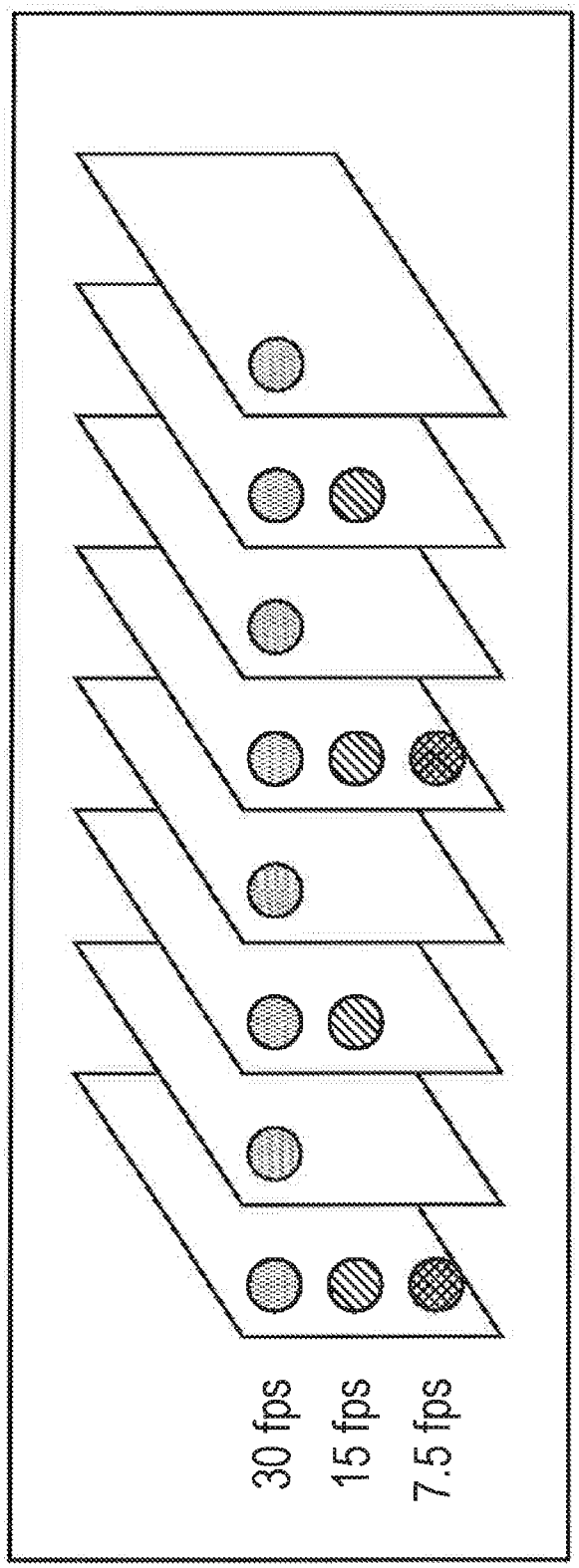
FIG. 35 is a diagram for describing an example of temporal scalable coding.

Furthermore, in addition, a temporal resolution, for example, may be applied as the parameter that has such scalability, as illustrated in FIG. 35 (temporal scalability). In a case of the temporal scalability, a frame rate varies from one layer to another. In other words, in this case, as illustrated in FIG. 35, each picture is hierarchically divided into two layers: the base layer that has a lower frame rate than the original moving image and the enhancement layer of which the original frame rate is obtained by being combined with the base layer. Of course, the number of layers in this case is one example, and the image can be hierarchically divided into an arbitrary number of layers.

Figure 36:
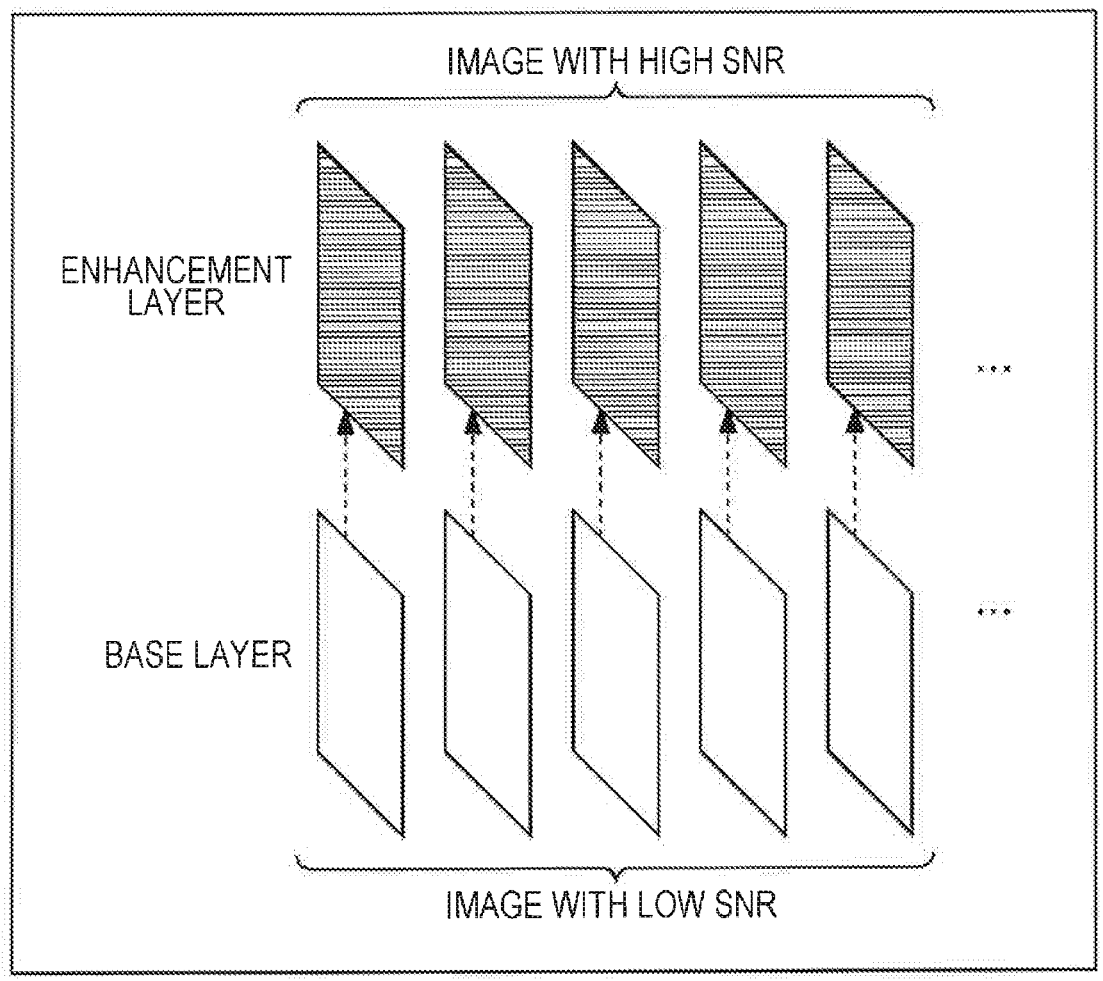
FIG. 36 is a diagram for describing an example of scalable coding with a signal-to-noise ratio.

Furthermore, a signal to noise ratio (SNR), for example, may be applied as the parameter that has such scalability (SNR scalability). In a case of the SNR scalability, the SNR varies from one layer to another. In other words, in this case, as illustrated in FIG. 36, each picture is hierarchically divided into two layers: the base layer that has a lower SNR than the original image and the enhancement layer of which the original SNR is obtained by being combined with the base layer. Of course, the number of layers in this case is one example, and the image can be hierarchically divided into an arbitrary number of layers.

The parameter that has the scalability, of course, may be a parameter other than the example described above. For example, bit depth can be used as the parameter that has the scalability (bit-depth scalability). In a case of the bit depth scalability, the bit depth varies from one layer to another. In this case, for example, the base layer is made from an 8-bit image, and by adding the enhancement layer to the 8-bit image, a 10-bit image can be obtained.

Furthermore, a chroma format also may be used as the parameter that has the scalability (chroma scalability). In a case of the chroma scalability, the chroma format varies from one layer to another. In this case, for example, the base layer is made from a component image in a 4:2:0 format, and by adding the enhancement layer to the component image in the 4:2:0 format, a component image in a 4:2:2 format can be obtained.

(Layered Image Coding Apparatus)

Figure 37:
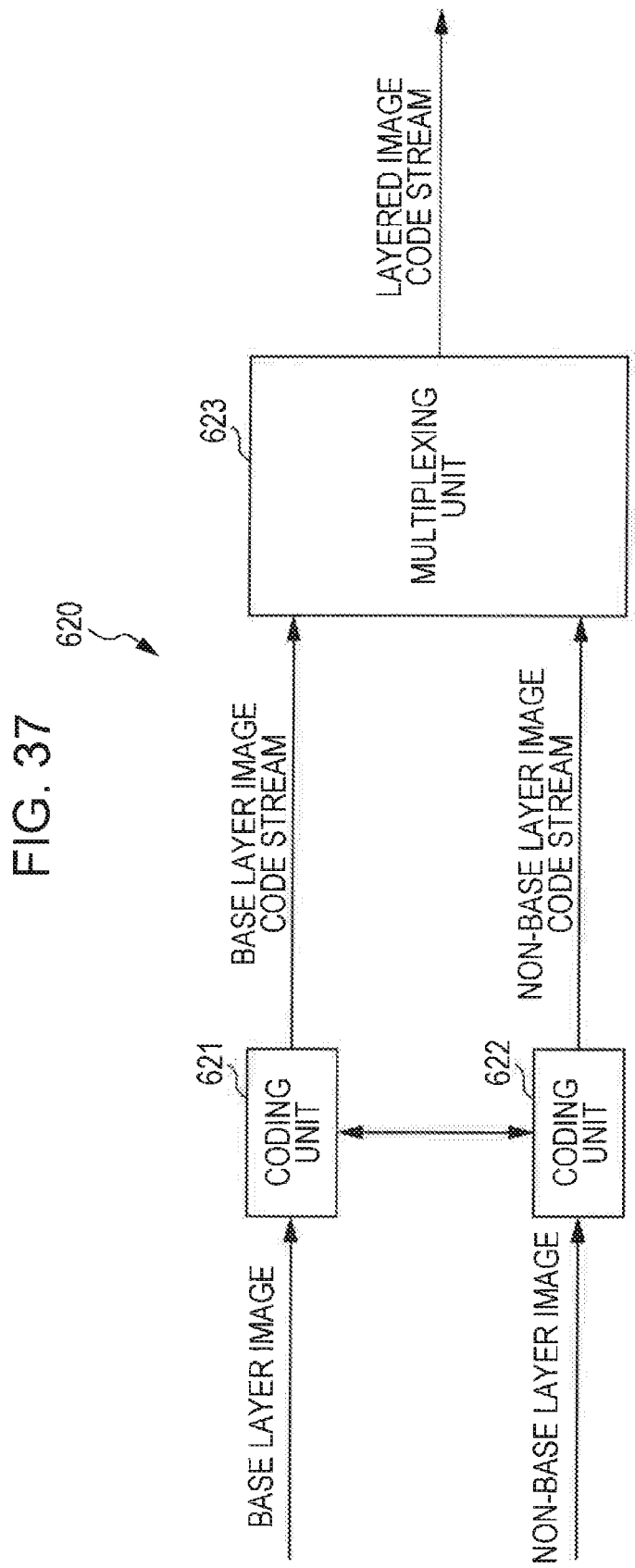
FIG. 37 is a diagram illustrating a configuration example of a layered image coding apparatus to which the present disclosure is applied.

FIG. 37 is a diagram illustrating the layered image coding apparatus that performs the layered image coding scheme described above. As illustrated in FIG. 37, a layered image coding apparatus 620 has a coding unit 621, a coding unit 622, and a multiplexing unit 623.

The coding unit 621 codes a base layer image and generates a base layer image code stream. The coding unit 622 codes a non-base layer image and generates a non-base layer image code stream. The multiplexing unit 623 multiplexes the base layer image code stream generated in the coding unit 621 and the non-base layer image code stream generated in the coding unit 622, and generates a layered image code stream.

The coding apparatus 10 (in FIG. 18) can be used instead of the coding unit 621 and the coding unit 622 of the layered image coding apparatus 620. In other words, the default mapping between the enhancement layer and the resolution information can be improved. Furthermore, because both of the coding unit 621 and the coding unit 622 can perform control such as the filter processing for the intra-prediction (that is, can share flags or parameters), using the same flags or parameters (for example, the syntax elements associated with the processing of the images, and the like), decrease in the coding efficiency can be suppressed.

(Layered Image Decoding Apparatus)

Figure 38:
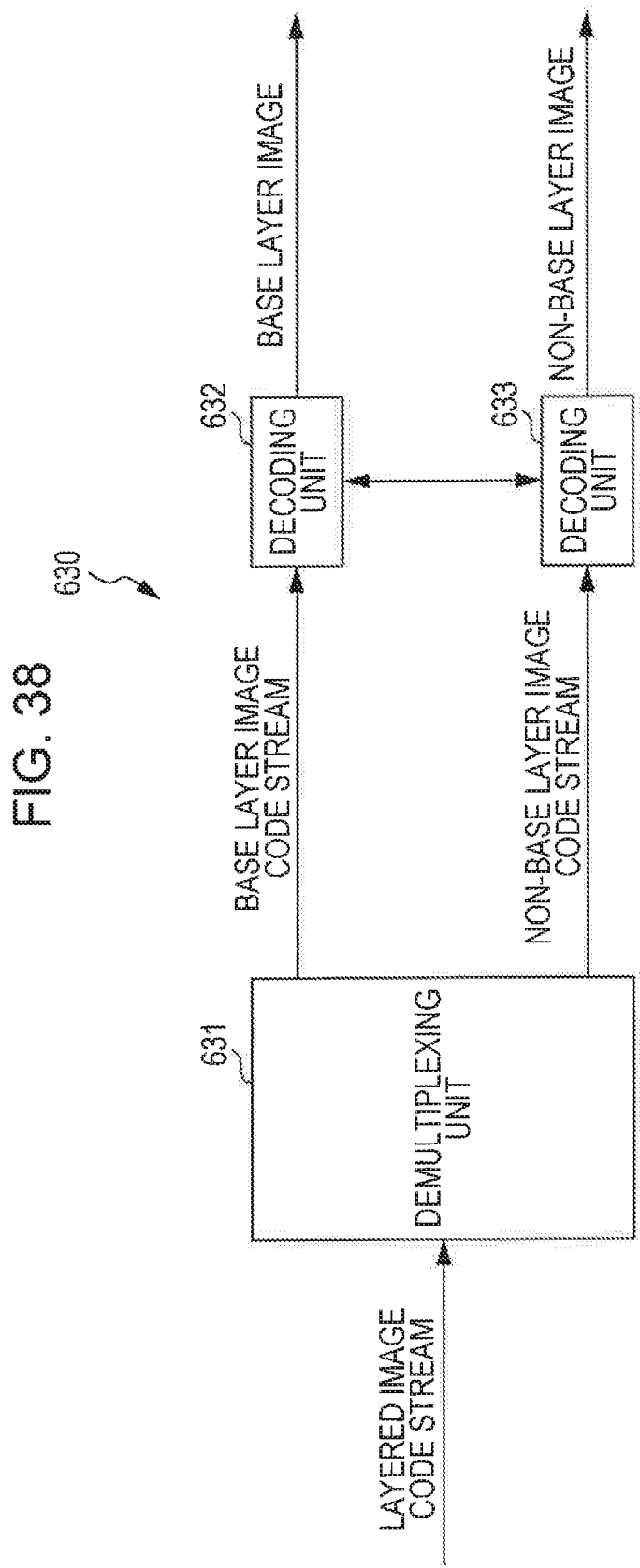
FIG. 38 is a diagram illustrating a configuration example of the layered image decoding apparatus to which the present disclosure is applied.

FIG. 38 is a diagram illustrating a layered image decoding apparatus that performs the layered image decoding described above. As illustrated in FIG. 38, the layered image decoding apparatus 630 has a demultiplexing unit 631, a decoding unit 632, and a decoding unit 633.

The demultiplexing unit 631 demultiplexes the layered image code stream in which the base layer image code stream and the non-base layer image code stream are multiplexed, and extracts the base layer image code stream and the non-base layer image code stream. The decoding unit 632 decodes the base layer image code stream extracted by the demultiplexing unit 631 and obtains the base layer image. The decoding unit 633 decodes the non-base layer image code stream extracted by the demultiplexing unit 631 and obtains the non-base layer image.

The decoding apparatus 110 (in FIG. 24) can be used instead of the decoding unit 632 and the decoding unit 633 of the layered image decoding apparatus 630. In other words, the default mapping between the enhancement layer and the resolution information can be improved. Furthermore, because both of the decoding unit 612 and the decoding unit 613 can perform the decoding (that is, can share flags or parameters), using the same flags or parameters (for example, the syntax elements associated with the processing of the images, and the like), decrease in the coding efficiency can be suppressed.

Fifth Embodiment (Configuration Example of a Television Apparatus)

Figure 39:
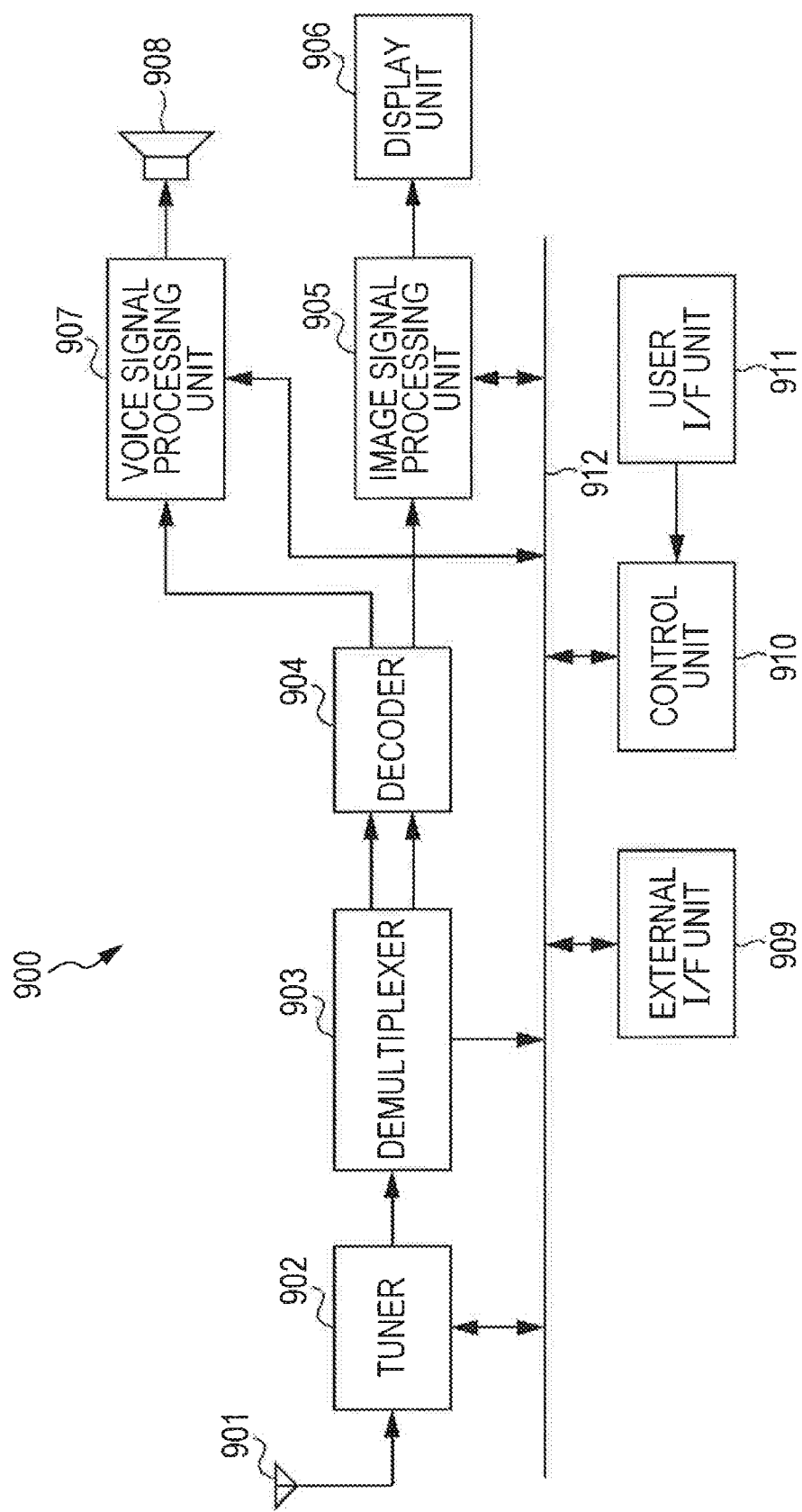
FIG. 39 is a diagram illustrating a schematic configuration example of a television apparatus to which the present disclosure is applied.

FIG. 39 illustrates a schematic configuration of a television apparatus to which the present disclosure is applied. A television apparatus 900 has an antenna 901, a tuner 902, a demultiplexer 903, a decoder 904, an image signal processing unit 905, a display unit 906, a voice signal processing unit 907, a speaker 908, and an external interface unit 909. Moreover, the television apparatus 900 has a control unit 910, a user interface unit 911, and the like.

The tuner 902 tunes to a desired channel while scanning a broadcast wave signal received in the antenna 901, performs the decoding, and outputs the obtained code bitstream to the demultiplexer 903.

The demultiplexer 903 extracts image or voice packets of a program that is a viewing target, from the code bitstream, and outputs data in the extracted packets to the decoder 904. Furthermore, the demultiplexer 903 supplies packets of data such as an electronic program guide (EPG) to the control unit 910. Moreover, in a case where scrambling is performed, cancelling of the scrambling is performed in the demultiplexer and the like.

The decoder 904 performs the decoding processing of the packets, and outputs image data and voice data that are generated by the decoding processing, to the image signal processing unit 905 and the voice signal processing unit 907, respectively.

The image signal processing unit 905 performs noise removal or image processing and the like according to user settings on the image data. The image signal processing unit 905 generates the image data on the program that is displayed on the display unit 906, the image data that is to be processed based on an application that is supplied over a network, and the like. Furthermore, the image signal processing unit 905 generates the image data for displaying a menu screen from which to select items and so forth, and the like and superimposes the generated image data onto the image data on the program. The image signal processing unit 905 generates a drive signal based on the image data that is generated in this manner, and thus drives the display unit 906.

The display unit 906 drives a display device (for example, a liquid crystal display and the like) based on the drive signal from the image signal processing unit 905, and thus displays images and the like in the program.

The voice signal processing unit 907 performs predetermined processing such as noise removal on the voice data, performs D/A conversion or amplification processing of the post-processing voice data, and by supplying the result to the speaker 908, performs voice output.

The external interface unit 909 is an interface for establishing a connection to an external apparatus or a network, and performs data transmission and reception of the image data, the voice data, or the like.

The user interface unit 911 is connected to the control unit 910. The user interface unit 911 is configured from an operation switch, a remote control signal receiving unit, or the like, and supplies an operation signal according to a user operation to the control unit 910.

The control unit 910 is configured from a central processing unit (CPU), a memory, and the like. The memory stores a program that is executed by the CPU or various pieces of data necessary for performing processing by the CPU, EPG data, data obtained over a network, and the like. The program stored in the memory is read by the CPU at a predetermined timing such as when the television apparatus 900 starts to operate, and thus is executed. By executing the program, the CPU controls each unit in such a manner that the television apparatus 900 operates according to the user operation.

Moreover, a bus 912 for connecting the tuner 902, the demultiplexer 903, the image signal processing unit 905, the voice signal processing unit 907, the external interface unit 909, and the like to the control unit 910 is provided in the television apparatus 900.

In the television apparatus that is configured in this manner, the decoder 904 is equipped with the function of the decoding apparatus (decoding method) according to the present application. For this reason, in the decoding processing of the code stream, the default mapping between the enhancement layer and the resolution information can be improved.

Sixth Embodiment (Configuration Example of Portable Telephone)

Figure 40:
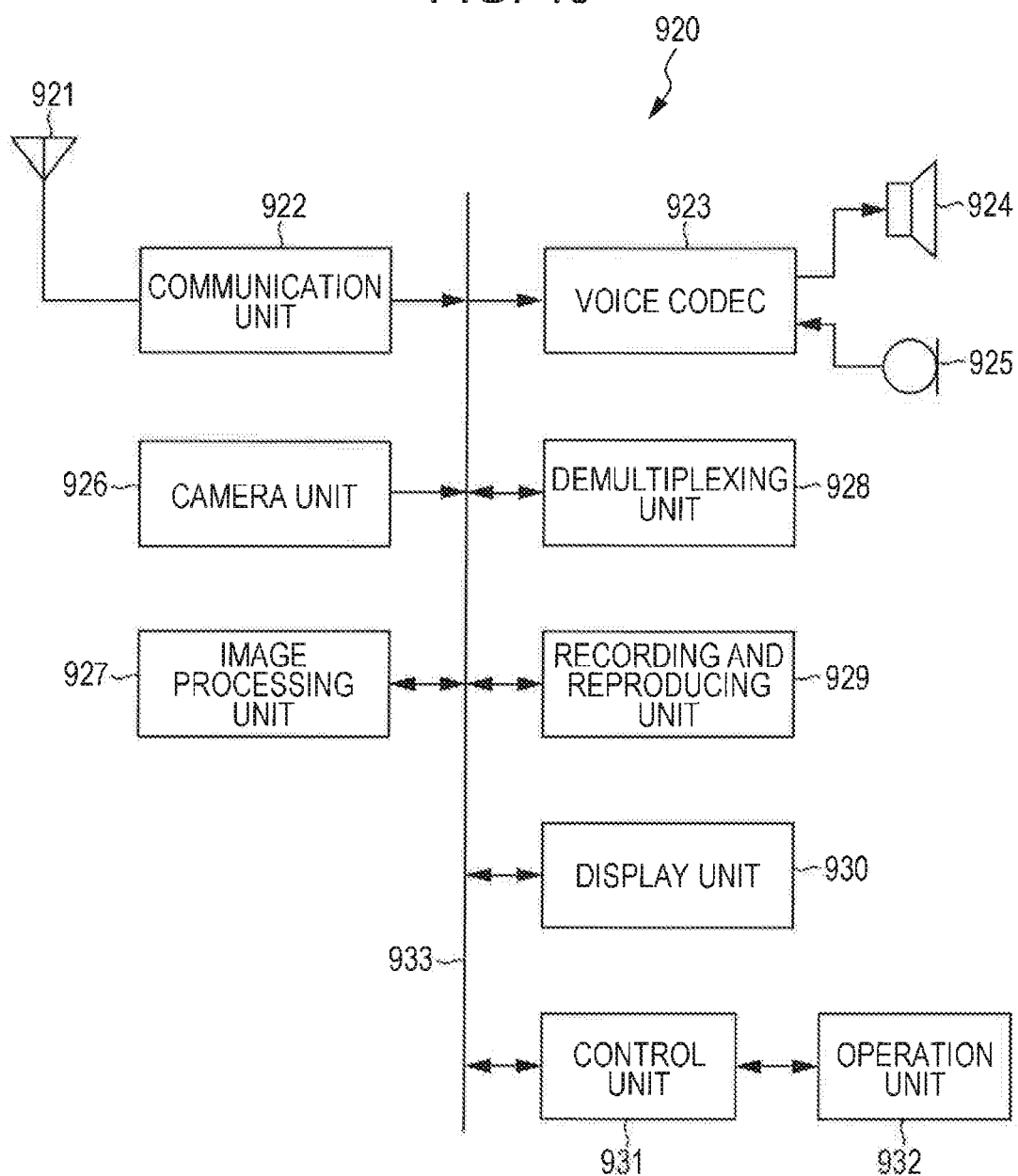
FIG. 40 is a diagram illustrating a schematic configuration example of a portable telephone to which the present disclosure is applied.

FIG. 40 illustrates a schematic configuration of a portable telephone to which the present disclosure is applied. A portable telephone 920 has a communication unit 922, a voice codec 923, a camera unit 926, an image processing unit 927, a demultiplexing unit 928, a recording and reproducing unit 929, a display unit 930, and a control unit 931. These are connected to one another through a bus 933.

Furthermore, an antenna 921 is connected to the communication unit 922, and a speaker 924 and a microphone 925 are connected to the voice codec 923. Moreover, an operation unit 932 is connected to the control unit 931.

The portable telephone 920 performs various operations, such as transmission and reception of a voice signal, transmission and reception of electronic mail or image data, image capture, and data recording, in various modes, such as a voice communication mode and a data communication mode.

In the voice communication mode, conversion to the voice data or data compression is performed, in the voice codec 923, on the voice signal generated in the microphone 925, and thus the resulting voice signal is supplied to the communication unit 922. The communication unit 922 performs modulation processing, frequency conversion processing of the voice data, or the like, and generates a transmit signal. Furthermore, the communication unit 922 supplies the transmit signal to the antenna 921 for transmission to a base station which is not illustrated. Furthermore, the communication unit 922 performs amplification processing or frequency conversion processing on a receive signal received in the antenna 921, demodulation processing of the received signal, and the like, and supplies the obtained voice data to the voice codec 923. The voice codec 923 performs data decompression of the voice data or conversion of the voice data to an analog voice signal, and outputs a result of the conversion to the speaker 924.

Furthermore, in a case where in the data communication mode, mail transmission is performed, the control unit 931 receives text data that is input by operating the operation unit 932, and thus displays the text being input on the display unit 930. Furthermore, the control unit 931 generates mail data in the operation unit 932, based on a user instruction and the like, and supplies the generated mail data to the communication unit 922. The communication unit 922 performs the modulation processing, the frequency conversion processing, or the like of the mail data, transmits the obtained transmit signal from the antenna 921. Furthermore, the communication unit 922 performs the amplification processing or the frequency conversion processing on the receive signal received in the antenna 921, the demodulation processing of the received signal, and the like, and restores the mail data. The mail data is supplied to the display unit 930, and displaying of contents of the mail is performed.

Moreover, in the portable telephone 920, it is possible to store the received mail data on a storage medium in the recording and reproducing unit 929. The storage medium is an arbitrary rewritable storage medium. For example, the storage medium is a semiconductor memory such as a RAM, an embedded flash memory, or the like, or a removable medium such as a hard disk, a magnetic disk, an optical magnetic disk, an optical disc, a universal serial bus (USB) memory, or a memory card.

In a case where in the data communication mode, the image data is transmitted, the image data generated in the camera unit 926 is supplied to the image processing unit 927. The image processing unit 927 performs the coding processing of the image data and generates the code data.

The demultiplexing unit 928 multiplexes the code data generated in the image processing unit 927 and the voice data supplied from the voice codec 923 in a predetermined scheme, and thus supplies a result of the multiplexing to the communication unit 922. The communication unit 922 performs the modulation processing or the frequency conversion processing of the multiplexed data, or the like, and transmits the obtained transmit signal from the antenna 921. Furthermore, the communication unit 922 performs amplification processing or frequency conversion processing on the receive signal received in the antenna 921, the demodulation processing of the received signal, and the like, and restores the multiplexed data. The multiplexed data is supplied to the demultiplexing unit 928. The demultiplexing unit 928 performs demultiplexing of the multiplexed data, and supplies the code data and the voice data to the image processing unit 927 and the voice codec 923, respectively. The image processing unit 927 performs the decoding processing of the code data and generates the image data. The image data is supplied to the display unit 930 and the displaying of the received image is performed. The voice codec 923 converts the voice data into an analog voice signal, supplies the converted voice data to the speaker 924, and outputs the received voice.

In the portable telephone apparatus that is configured in this manner, the image processing unit 927 is equipped with the functions of the coding apparatus and the decoding apparatus (the coding method and the decoding method) according to the present application. For this reason, the default mapping between the enhancement layer and the resolution information can be improved.

Seventh Embodiment (Configuration Example of a Recording and Reproducing Apparatus)

Figure 41:
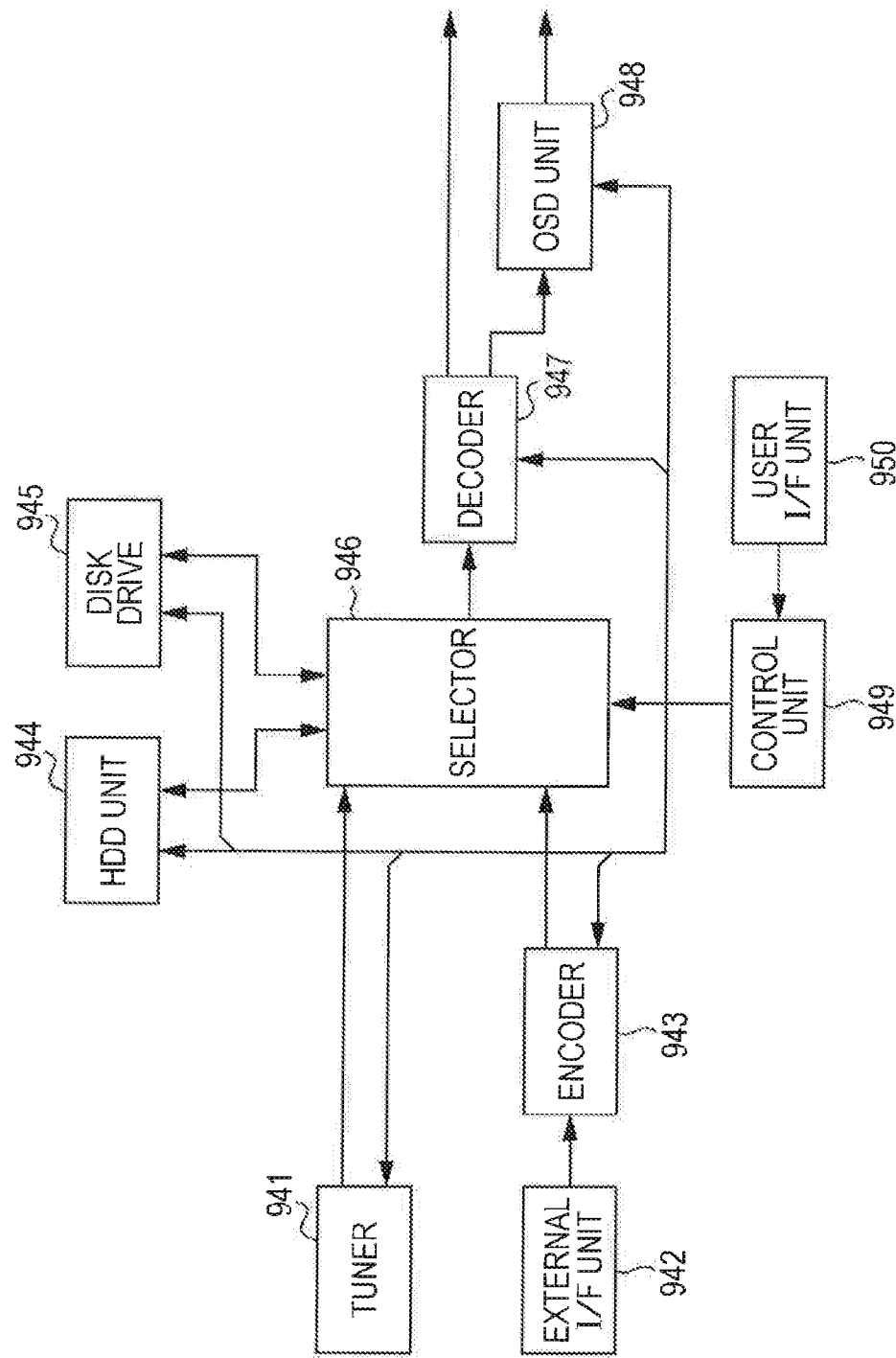
FIG. 41 is a diagram illustrating a schematic configuration example of a recording and reproducing apparatus to which the present disclosure is applied.

FIG. 41 illustrates a schematic configuration of a recording and reproducing apparatus to which the present disclosure is applied. The recording and reproducing apparatus 940 records, for example, audio data and video data of the received broadcast program on a recording medium, and provides the recorded data to the user at a timing according to a user instruction. Furthermore, the recording and reproducing apparatus 940 can obtain, for example, the audio data or the video data from a different apparatus, and can record the obtained audio data or video data on the recording medium. Moreover, the recording and reproducing apparatus 940 can perform image display or voice output in a monitor apparatus or the like, by decoding and outputting the audio data or the video data recorded on the recording medium.

The recording and reproducing apparatus 940 has a tuner 941, an external interface unit 942, an encoder 943, a hard disk drive (HDD) unit 944, a disk drive 945, a selector 946, a decoder 947, an on-screen display (OSD) unit 948, a control unit 949, and a user interface unit 950.

The tuner 941 tunes to a desired channel while scanning the broadcast wave signal that is received in the antenna which is not illustrated. The tuner 941 outputs to the selector 946 the code bitstream that is obtained by demodulating the received signal on the desired channel.

The external interface unit 942 is configured from at least one, among an IEEE 1394 interface, a network interface unit, a USB interface, a flash memory, an interface and the like. The external interface unit 942 is an interface for establishing a connection to an external apparatus or a network, a memory card, or the like, and performs receiving of data to be recorded, such as image data or voice data.

When the image data or the voice data supplied from the external interface unit 942 is not coded, the encoder 943 performs the coding using a predetermined scheme, and outputs the code bitstream to the selector 946.

The HDD unit 944 records content data such as an image or a voice, various programs, or other pieces of data, in a built-in hard disk, and reads these from the hard disk such as when reproducing these.

The disk drive 945 performs recording and reproducing of the signal on a mounted optical disc. An optical disc, for example, include a DVD disc (a DVD-Video, a DVD-RAM, a DVD-R, a DVD-RW, a DVD+R, a DVD+RW, and the like), a Blu-ray (a registered trademark) disc, and the like.

When recording the image or the voice, the selector 946 selects the code stream from either of the tuner 941 and the encoder 943, and supplies the selected code bitstream to either of the HDD unit 944 and the disk drive 945. Furthermore, when reproducing the image or the voice, the selector 946 supplies the code bitstream that is output from the HDD unit 944 or the disk drive 945 to the decoder 947.

The decoder 947 performs the decoding processing of the code bitstream. The decoder 947 supplies the image data generated by performing the decoding processing to an OSD unit 948. Furthermore, the decoder 947 outputs the voice data generated by performing the decoding processing.

The OSD unit 948 generates the image data for displaying the menu screen from which to select items and so forth, and the like, and superimposes the generated image data onto the image data that is output from the decoder 947 for outputting.

The user interface unit 950 is connected to the control unit 949. The user interface unit 950 is configured from an operation switch, a remote control signal receiving unit, and the like, and supplies an operation signal according to a user operation to the control unit 949.

The control unit 949 is configured from a CPU, a memory, or the like. The memory stores a program that is executed by the CPU or various pieces of data that are necessary for the CPU to perform processing. The program stored in the memory is read by the CPU at a predetermined timing such as when the recording and reproducing apparatus 940 starts to operate, and thus is executed. By executing the program, the CPU controls each unit in such a manner that the recording and reproducing apparatus 940 operates according to the user operation.

In the recording and reproducing apparatus that is configured in this manner, the encoder 943 is equipped with the function of the coding apparatus (coding method) according to the present application. For this reason, in the coding of the code stream, the default mapping between the enhancement layer and the resolution information can be improved. Furthermore, the decoder 947 is equipped with the function of the decoding apparatus (decoding method) according to the present application. For this reason, in the decoding of the code stream, the default mapping between the enhancement layer and the resolution information can be improved.

Eighth Embodiment (Configuration Example of an Imaging Apparatus)

Figure 42:
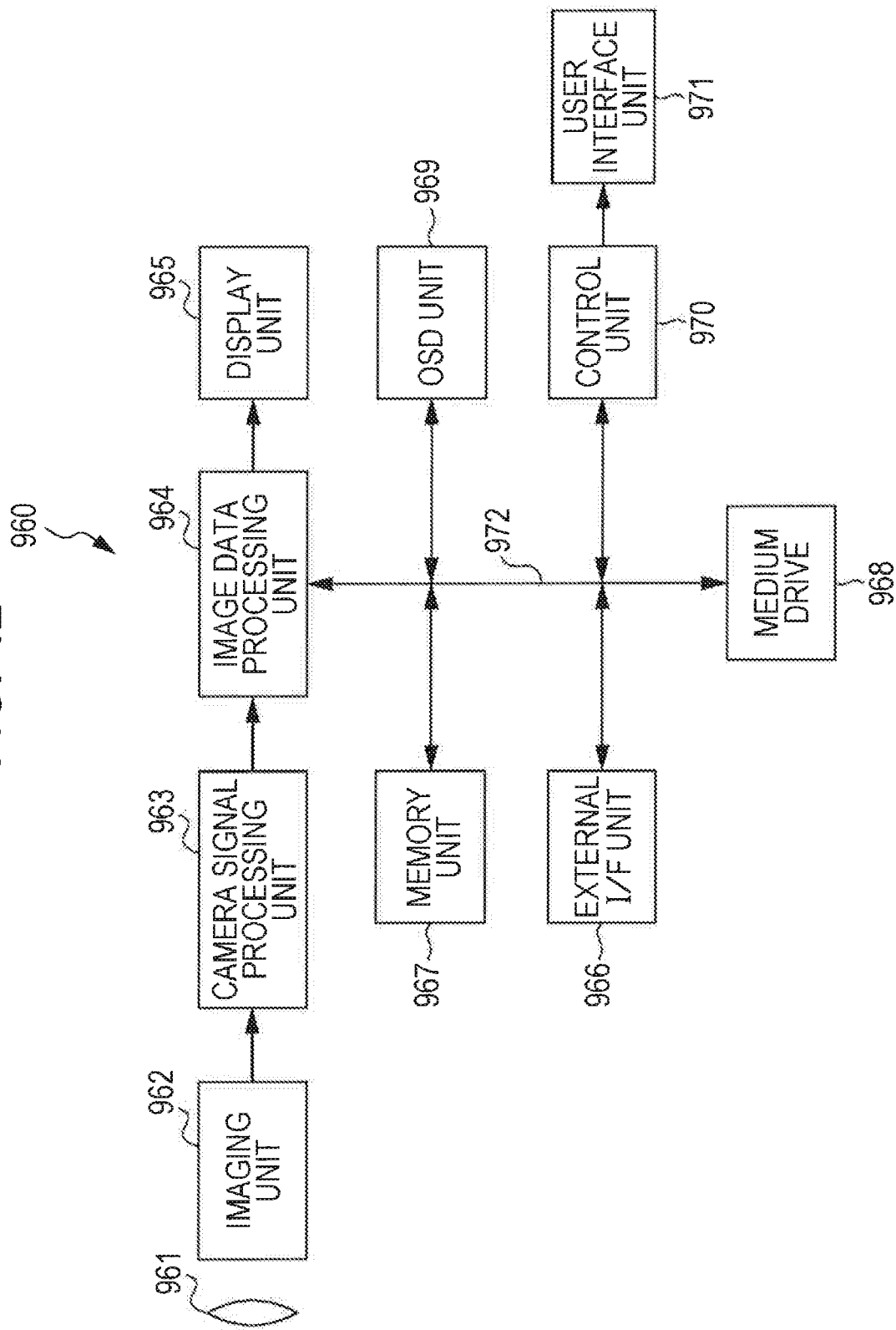
FIG. 42 is a diagram illustrating a schematic configuration example of an imaging apparatus to which the present disclosure is applied.

FIG. 42 illustrates a schematic configuration of an imaging apparatus to which the present disclosure is applied. An imaging apparatus 960 images a photographic subject, displays an image of the photographic subject on a display unit, and records the image, as the image data, on a recording medium.

The imaging apparatus 960 has an optical block 961, an imaging unit 962, a camera signal processing unit 963, an image data processing unit 964, a display unit 965, an external interface unit 966, a memory unit 967, a medium drive 968, an OSD unit 969, and the control unit 970. Furthermore, a user interface unit 971 is connected to the control unit 970. Moreover, the image data processing unit 964 or the external interface unit 966, the memory unit 967, the medium drive 968, the OSD unit 969, the control unit 970, and the like are connected to one another through a bus 972.

The optical block 961 is configured from a focusing lens, an aperture mechanism, or the like. The optical block 961 causes an optical image of the photographic subject to be formed on an imaging surface of the imaging unit 962. The imaging unit 962 is configured from a CCD or a CMOS image sensor, generates an electrical signal according to the optical image by performing photoelectric conversion, and supplies the generated electrical signal to the camera signal processing unit 963.

The camera signal processing unit 963 performs various camera signal processing tasks, such as knee correction or gamma correction, and color correction, on the electrical signal supplied from the imaging unit 962. The camera signal processing unit 963 supplies the image data on which camera signal processing has already been performed to the image data processing unit 964.

The image data processing unit 964 performs the coding processing of the image data supplied from the camera signal processing unit 963. The image data processing unit 964 supplies the code data that is generated by performing the coding processing, to the external interface unit 966 or the medium drive 968. Furthermore, the image data processing unit 964 performs the decoding processing of the code data supplied from the external interface unit 966 or the medium drive 968. The image data processing unit 964 supplies the image data generated by performing the decoding processing to the display unit 965. Furthermore, the image data processing unit 964 performs processing that supplies the image data supplied from the camera signal processing unit 963 to the display unit 965, or superimposes display data obtained from the OSD unit 969 onto the image data and supplies a result of the superimposing to the display unit 965.

The OSD unit 969 generates display data, such as a menu screen or an icon, which is made from symbols, characters, or a figure, and outputs the generated display data to the image data processing unit 964.

The external interface unit 966, for example, is configured from a USB input and output terminal or the like, and in a case where the image is printed, the external interface unit 966 is connected to a printer. Furthermore, the drive is connected to the external interface unit 966, whenever necessary. A removable medium, such as a magnetic disk or an optical disc is suitably mounted in the external interface unit 966, and a computer program that is read from the removable medium is installed whenever necessary. Moreover, the external interface unit 966 has a network interface that is connected to a predetermined network such as a LAN or the Internet. The control unit 970, for example, can read the code data from the medium drive 968 according to an instruction from the user interface unit 971, and can supply the code data that is read from the external interface unit 966 to a different apparatus that is connected to the interface unit 966 through the network. Furthermore, the control unit 970 can obtain through the external interface unit 966 the code data or the image data that is supplied from the different apparatus through the network, and can supply the obtained code data or the obtained image data to the image data processing unit 964.

As a recording medium that is driven by the medium drive 968, for example, an arbitrary readable and writable removable medium is used such as a magnetic disk, an optical magnetic disk, an optical disc, or a semiconductor memory. Furthermore, the recording medium as the removable medium is also arbitrary in type and may be a tape device, be a disc, and be a memory card. Of course, the recording medium may be a non-contact integrated circuit (IC) card and the like.

Furthermore, the medium drive 968 and the recording medium may be combined into one piece, and the recording may be configured from a non-portable storage medium, such as a built-in hard disk drive or a solid state drive (SSD).

The control unit 970 may be configured from a CPU. The memory unit 967 stores a program that is executed by the control unit 970, various pieces of data and the like that are necessary for the control unit 970 to perform processing, or the like. The program stored in the memory unit 967 is read by the control unit 970 at a predetermined timing such as when the imaging apparatus 960 starts to operate, and thus is executed. By executing the program, the control unit 970 controls each unit in such a manner that the imaging apparatus 960 operates according to a user operation.

In the imaging apparatus that is configured in this manner, the image data processing unit 964 is equipped with the functions of the coding apparatus and the decoding apparatus (the coding method and the decoding method) according to the present application. For this reason, in the coding or the decoding of the code stream, the default mapping between the enhancement layer and the resolution information can be improved.

<Application Example of the Scalable Coding>
(First System)

Next, an example of a specific use of the scalably-coded (layer-coded) code data is described. The scalable coding, for example, is used for selecting data to transfer, in the same way as in the example in FIG. 43.

Figure 43:
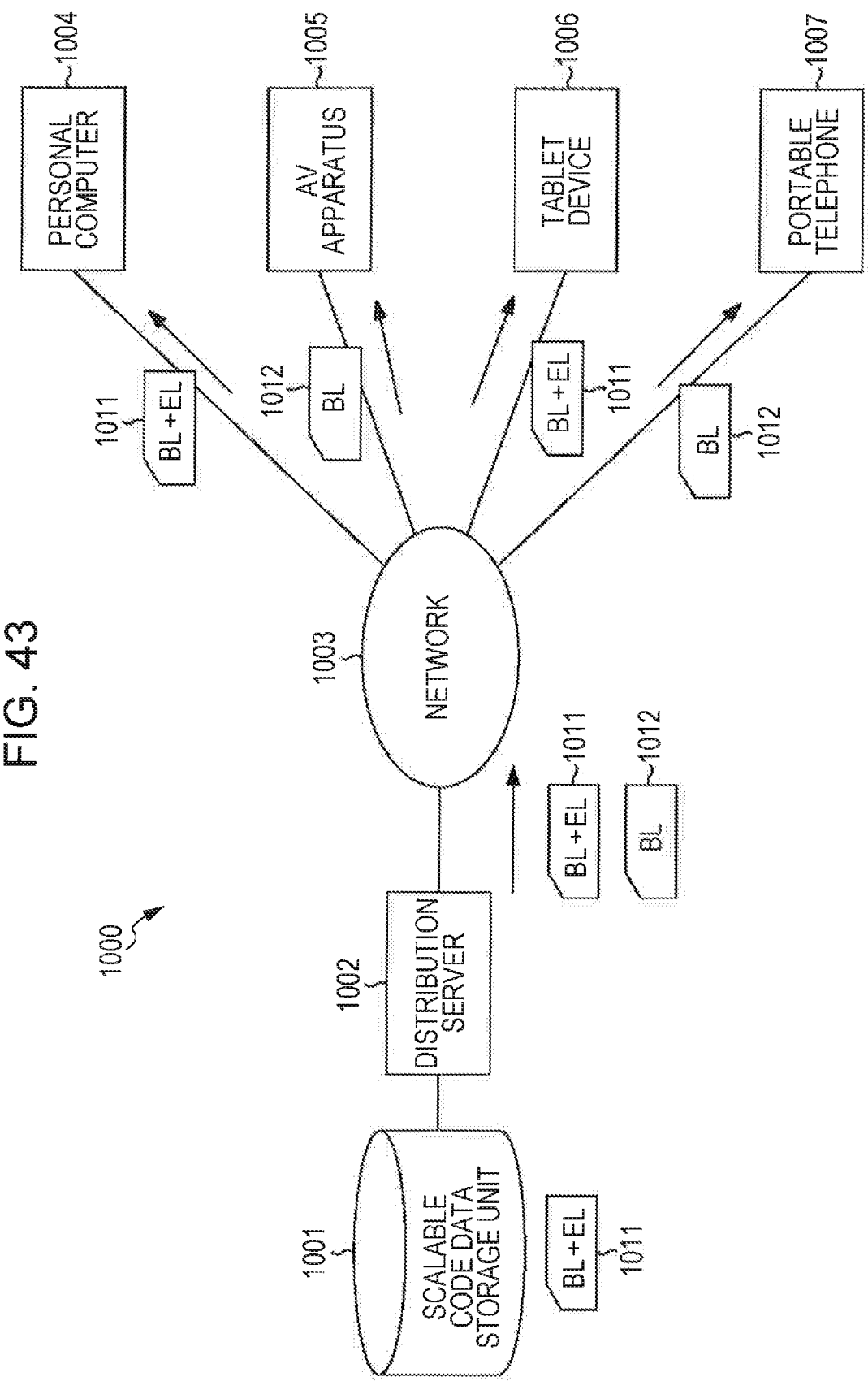
FIG. 43 is a block diagram illustrating one example of application of the scalable coding.

In a data transfer system 1000 illustrated in FIG. 43, a distribution server 1002 reads scalable code data that is stored in a scalable code data storage unit 1001, and distributes the scalable code data to a terminal apparatus such as a personal computer 1004, an AV apparatus 1005, a tablet device 1006, and a portable telephone 1007, over a network 1003.

In such a case, the distribution server 1002 selects suitable-quality code data for transfer according to the capability of the terminal apparatus and a communication environment. Even when the distribution server 1002 unnecessarily transfers high-quality data, the likelihood of obtaining a high-quality image in the terminal apparatus is low and there is a concern that this will be a cause of an occurrence of delay or overflow. Furthermore, there is also a concern that a communication band will be unnecessarily occupied or a load on the terminal equipment will be unnecessarily increased. Conversely, even when the distribution server 1002 unnecessarily transfers low-quality data, there is a concern that with the terminal apparatus, sufficient image quality will not be obtained. For this reason, in a suitable manner, the distribution server 1002 reads the scalable code data stored in the scalable code data storage unit 1001, as code data with a quality suitable for the capability of the terminal apparatus or the communication environment, and transmits such code data.

For example, the scalable code data storage unit 1001 is set to store scalable code data (BL+EL) 1011 that is scalably coded. The scalable code data (BL+EL) 1011 is code data including both the base layer and the enhancement layer, and is data that can be decoded into both an image in the base layer and an image in the enhancement layer.

The distribution server 1002 selects a suitable layer according to the capability of the terminal equipment to transfer data, the communication environment and the like and reads data in such a layer. For example, for the personal computer 1004 or the tablet device 1006 that has an enhanced processing capability, the distribution server 1002 reads high-quality scalable code data (BL+EL) 1011 from the scalable code data storage unit 1001, and transmits the high-quality scalable code data (BL+EL) 1011 as it is read. In contrast, for example, for the AV apparatus 1005 or the portable telephone 1007 that has a limited processing capability, the distribution server 1002 extracts data on the base layer from the scalable code data (BL+EL) 1011, and transfers the data on the base layer as scalable code data (BL) 1012 that is the same content data as the scalable code data (BL+EL) 1011 but has lower quality than the scalable code data (BL+EL) 1011.

Because an amount of data can be easily adjusted by using the scalable code data in this manner, the number of times that the delay or the overflow occurs can be reduced, or an unnecessary increase in the load on the terminal apparatus or a communication medium can be suppressed. Furthermore, because in the case of the scalable code data (BL+EL) 1011, the redundancy between the layers is decreased, an amount of the scalable code data (BL+EL) 1011 can be decreased more than in a case where the code data in each layer is set to be individual data. Therefore, a storage area of the scalable code data storage unit 1001 can be used more efficiently.

Moreover, because various apparatuses such as the personal computer 1004 to the portable telephone 1007 can be used as the terminal apparatus, hardware performance of the terminal apparatus varies from apparatus to apparatus. Furthermore, because the terminal apparatus also executes various applications, a software capability of the terminal apparatus varies accordingly. Moreover, as the network 1003 that operates as the communication medium, for example, a wired or wireless network, such as the Internet or a local area network (LAN), or a so-called communication line network including both wired and wireless networks can be used, and a data transfer capability of the network 1003 varies accordingly. Moreover, there is a concern that the data transfer capability will change due to other communication as well.

Then, the distribution server 1002 may perform communication with the terminal apparatus for which data is destined, before starting to transfer the data, in such a manner as to obtain information relating to the capability of the terminal apparatus such as the hardware performance of the terminal apparatus, the application (software) that is executed by the terminal apparatus, or the like, and information relating to the communication environment such as a bandwidth in which the network 1003 is available, and the like. Then, the distribution server 1002 may select a suitable layer, based on the information that is obtained in this manner.

Moreover, layer extraction may be performed in the terminal apparatus. For example, the personal computer 1004 may decode the transferred scalable code data (BL+EL) 1011 and may display the image in the base layer and display the image in the enhancement layer. Furthermore, for example, the personal computer 1004 may extract scalable code data (BL) 1012 in the base layer from the transferred scalable code data (BL+EL) 1011, and may store the extracted scalable code data (BL) 1012, transfer the extracted scalable code data (BL) 1012 to a different apparatus, or decode the extracted scalable code data (BL) 1012 in order to display the image in the base layer.

Of course, all of the scalable code data storage unit 1001, the distribution server 1002, the network 1003, and the terminal apparatus are arbitrary in number. Furthermore, the example is described above in which the distribution server 1002 transfers the data to the terminal apparatus, but examples of use are not limited to this. Any arbitrary system that selects and transfers a suitable layer according to the capability of the terminal apparatus, the communication environment, or the like in a case where the scalably-coded code data is transferred to the terminal apparatus, can be used as the data transfer system 1000.

(Second System)

Figure 44:
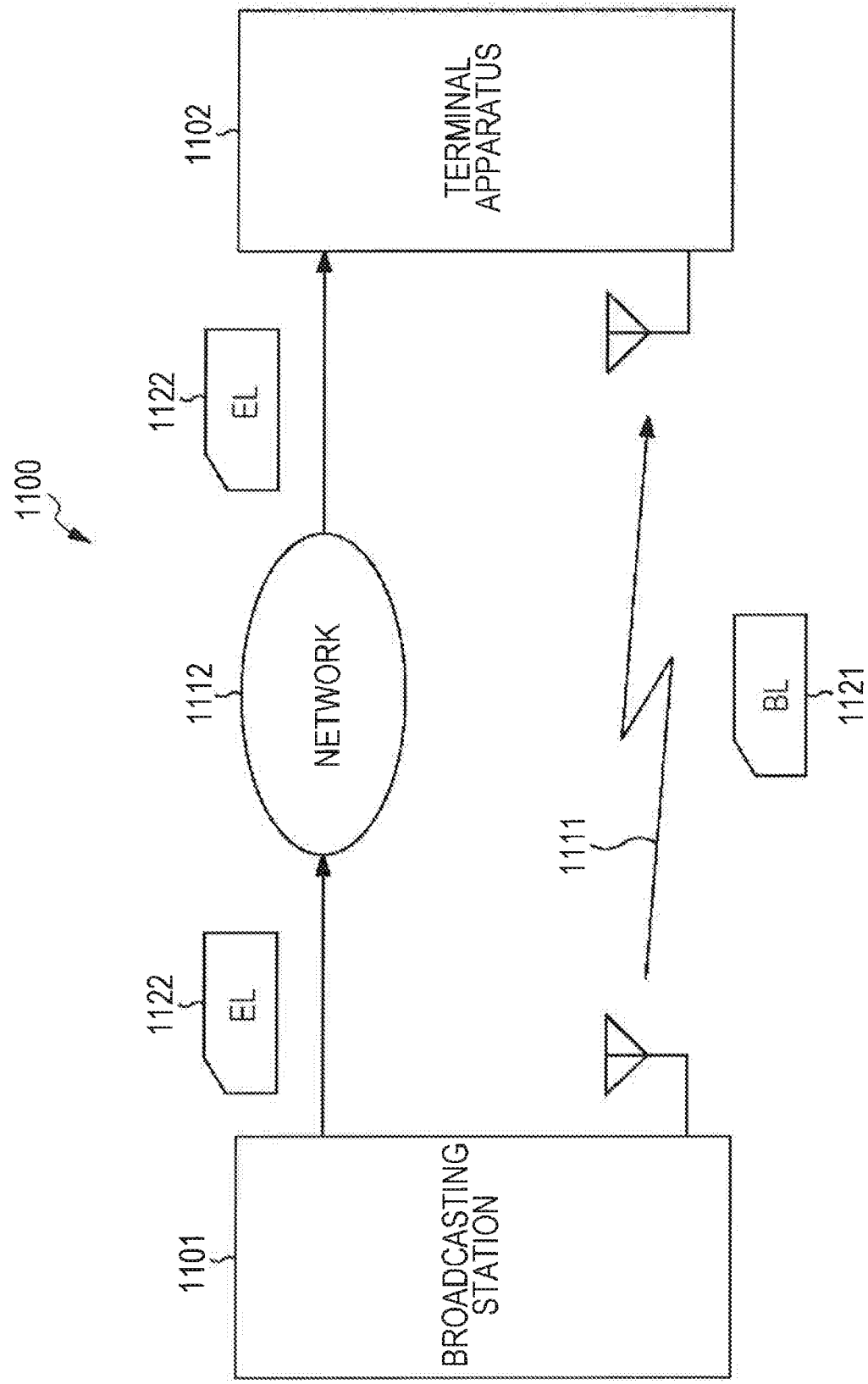
FIG. 44 is a block diagram illustrating another example of the application of the scalable coding.

Furthermore, the scalable coding, for example, can be used for transfer through multiple communication media in the same manner as in the example in FIG. 44.

In a data transfer system 1100 that is illustrated in FIG. 44, a broadcasting station 1101 transfers scalable code data (BL) 1121 in the base layer through a terrestrial broadcast 1111. Furthermore, the broadcasting station 1101 transfers scalable code data (EL) 1122 in the enhancement layer over an arbitrary network 1112 that is configured from a communication network that is wired or wireless or is both wired and wireless (for example, the scalable code data (EL) 12 is packetized and is transferred).

A terminal apparatus 1102 has a function of receiving the terrestrial broadcast 1111 that is broadcast by the broadcasting station 1101 and receives the scalable code data (BL) 1121 in the base layer that is transferred through the terrestrial broadcast 1111. Furthermore, the terminal apparatus 1102 further has a function of performing communication over the network 1112, and receives the scalable code data (EL) 1122 in the enhancement layer that is transferred over the network 1112.

The terminal apparatus 1102 decodes the scalable code data (BL) 1121 in the base layer that is obtained through the terrestrial broadcast 1111, for example, according to a user instruction or the like, and thus obtains an image in the base layer, stores an image in the base layer, or transfers an image in the base layer to a different apparatus.

Furthermore, the terminal apparatus 1102 combines the scalable code data (BL) 1121 in the base layer that is obtained through the terrestrial broadcast 1111 and the scalable code data (EL) 1122 in the enhancement layer that is obtained over the network 1112, for example, according to a user instruction or the like, and thus obtains scalable code data (BL+EL), obtains an image in the enhancement layer by decoding the scalable code data (BL+EL), stores the scalable code data (BL+EL), or transmits the scalable code data (BL+EL) to a different apparatus.

As described above, the scalable code data, for example, can be transferred through a communication medium that differs from one layer to another. Therefore, the load can be distributed, and the number of times that delay or overflow occurs can be reduced.

Furthermore, the communication medium that is used in the transfer may be selected for every layer according to a situation. For example, the scalable code data (BL) 1121 in the base layer that has a comparatively large amount of data may be transferred through a communication medium with a broad bandwidth, and the scalable code data (EL) 1122 in the enhancement layer that has a comparatively small amount of data may be transferred through a communication medium with a narrow bandwidth. Furthermore, for example, it may be determined whether the communication medium through which the scalable code data (EL) 1122 in the enhancement layer is transferred is set to be the network 1112 or is set to be the terrestrial broadcast 1111, in a switching manner, depending on the bandwidth which is available for the network 1112. Of course, this is true for the data in an arbitrary layer.

By performing the control in this manner, an increase in the load for data transfer can be suppressed further.

Of course, the number of the layers is arbitrary, and the number of the communication media used in the transfer is also arbitrary. Furthermore, the number of the terminal apparatuses 1102 that are distribution destinations of the data is also arbitrary. Moreover, the example is described above in which the broadcasting is performed by the broadcasting station 1101, but usage examples are not limited to this. Any arbitrary system that divides the scalably-coded code data into multiple pieces of data in units of layers and transfers the multiple pieces of data through multiple lines can be used as the data transfer system 1100.

(Third System)

Figure 45:
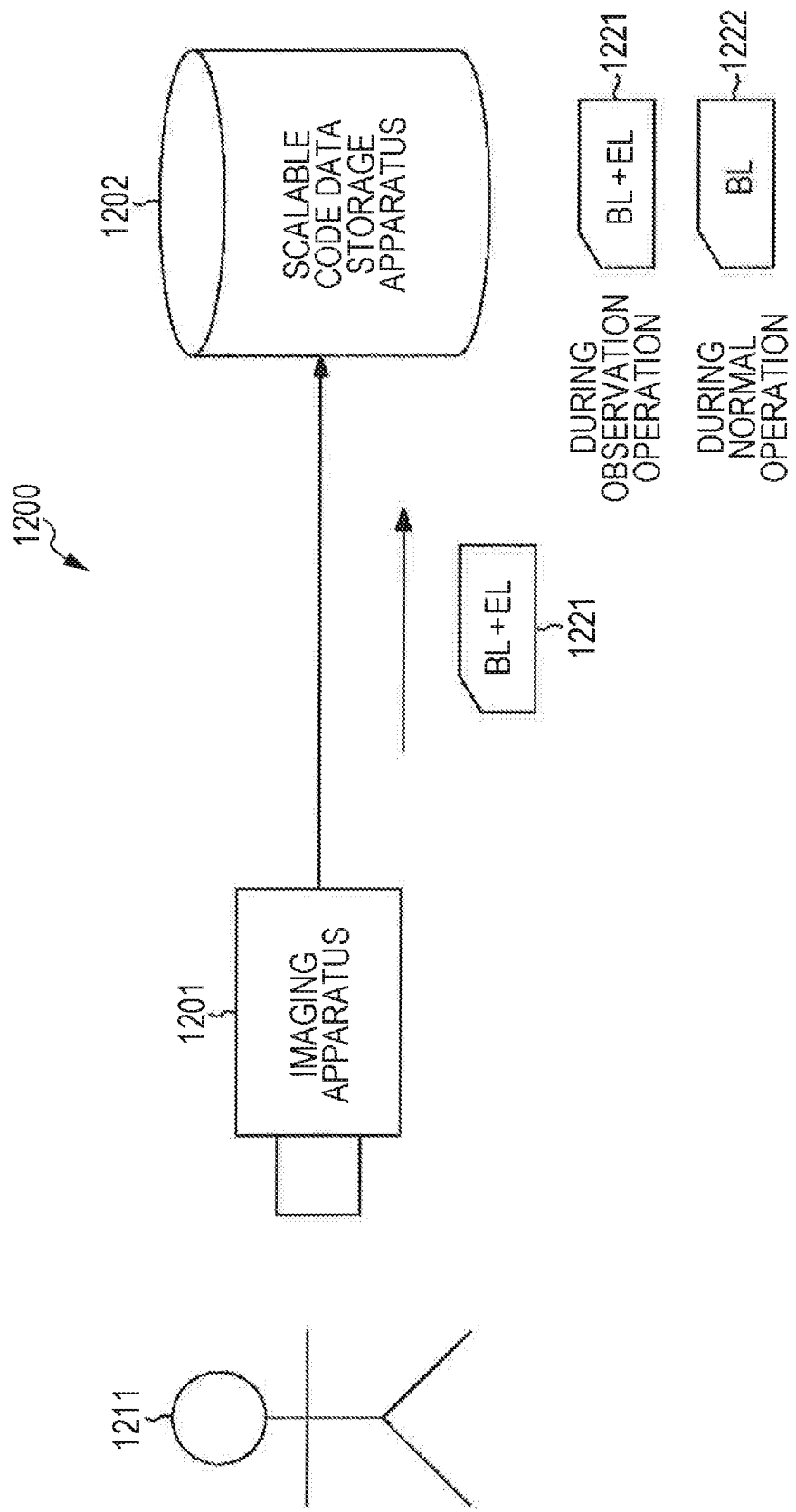
FIG. 45 is a block diagram illustrating still another example of the application of the scalable coding.

Furthermore, the scalable coding is used in storing the code data in the same manner as in the example in FIG. 45.

In an imaging system 1200 that is illustrated in FIG. 45, an imaging apparatus 1201 scalably codes image data that is obtained by imaging a photographic subject 1211, and supplies the scalably-coded image data, as scalable code data (BL+EL) 1221, to a scalable code data storage apparatus 1202.

The scalable code data storage apparatus 1202 stores the scalable code data (BL+EL) 1221 that is supplied from the imaging apparatus 1201, as data that has a quality that differs according to a situation. For example, during a normal operation, the scalable code data storage apparatus 1202 extracts the data in the base layer from the scalable code data (BL+EL) 1221, and stores the extracted data as scalable code data (BL) 1222 in a layer that has a small amount of data, in a manner that maintains low quality. In contrast, for example, in observation operation, the scalable code data storage apparatus 1202 stores the scalable code data (BL+EL) 1221 as is, which is a large amount of data, in a manner that maintains high quality.

When this is done, because the scalable code data storage apparatus 1202 can retain the image in a manner that maintains high quality only when necessary, an increase in the amount of data can be suppressed while suppressing a decrease in a value of the image due to image degradation, and efficiency of the use of the storage area can be improved.

For example, the imaging apparatus 1201 is set to be a monitoring camera. In a case where a photographed monitoring target (for example, an intruder) is not present in a captured image (during the normal operation), the likelihood of contents of the captured image being not important is high, a decrease in the amount of data takes priority, and the image data (scalable code data) is stored in a manner that maintains low quality. In contrast, in a case where the photographed monitoring target is present, as the photographic subject 1211, in the captured image (during an observation operation), because the likelihood of the contents of the captured image being important is high, the quality takes priority, and the image data (scalable code data) is stored in a manner that maintains high quality.

Moreover, for example, by analyzing the image, the scalable code data storage apparatus 1202 may determine whether the imaging apparatus 1201 is in the normal operation or in the observation operation. Furthermore, the imaging apparatus 1201 may perform the determination, and may transfer a result of the determination to the scalable code data storage apparatus 1202.

Moreover, a reference against which it is determined whether the imaging apparatus 1201 is in the normal operation or in the observation operation is arbitrary, and the contents of the image that are set to be the determination reference are arbitrary. Of course, a condition other than the contents of the image can be set to be the determination reference. For example, the imaging apparatus 1201 may switch between the normal operation and the observation operation according to a volume of recorded voice or a waveform, at predetermined time intervals, or according to an external instruction such as a user instruction.

Furthermore, the example is described above in which the imaging apparatus 1201 switches between the normal operation and the observation operation, but the number of operations is arbitrary. For example, the imaging apparatus 1201 may switch between three or more operations, such as between a normal operation, a low-level observation operation, an observation operation, and a high-level observation operation. However, the upper-limit number of the operations between which the imaging apparatus 1201 switches depends on the number of layers of scalable code data.

Furthermore, the imaging apparatus 1201 may determine the number of scalable code layers according to a situation. For example, during the normal operation, the imaging apparatus 1201 may generate scalable code data (BL) 1222 in the base layer that has a small amount of data, in a manner that maintains low quality, and may supply the generated scalable code data (BL) 1222 to the scalable code data storage apparatus 1202. Furthermore, for example, during the observation operation, the imaging apparatus 1201 generates scalable code data (BL+EL) 1221 in the base layer that has a large amount of data, in a manner that maintains high quality, and may supply the generated scalable code data (BL+EL) 1221 to the scalable code data storage apparatus 1202.

As an example of the imaging system 1200, the monitoring camera is described above, but the use of the imaging system 1200 is arbitrary, and the imaging system 1200 is not limited to the monitoring camera.

Ninth Embodiment

Other Examples

The examples of the apparatus, the system, or the like, to which the present disclosure is applied are described above, but the present disclose is not limited to these. The present disclosure can be implemented as all configurations for mounting in the apparatus described above or an apparatus that makes up the system, for example, a processor as a large scale integration (LSI) or the like, a module that uses the multiple processors or the like, a unit that uses the multiple modules or the like, a set that is obtained by adding other functions to the unit, and the like (that is, a configuration that includes one portion of the apparatus).

(Configuration Example of a Video Set)

Figure 46:
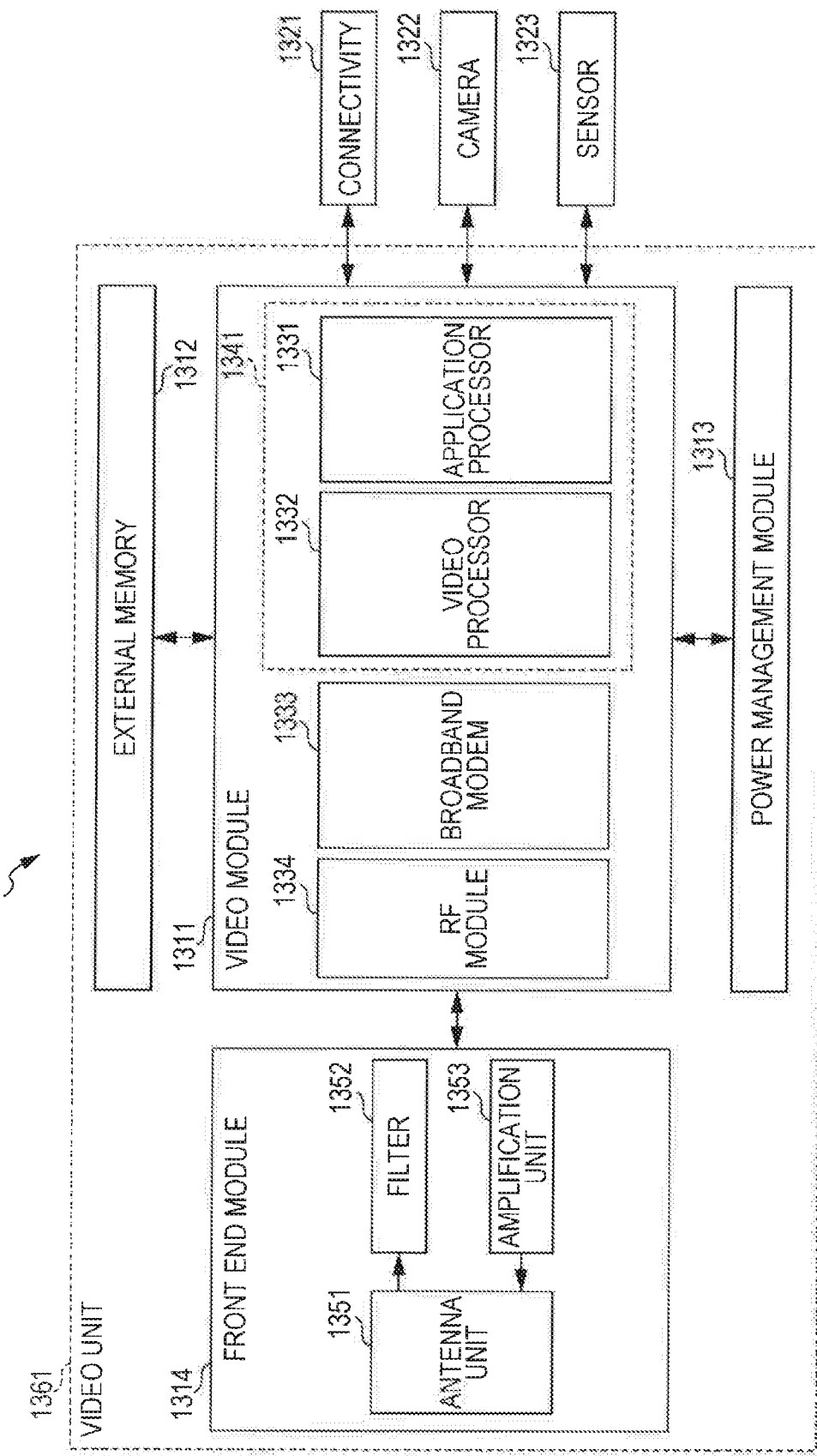
FIG. 46 is a diagram illustrating one example of a schematic configuration of a video set to which the present disclosure is applied.

An example of a case where the present disclosure is implemented as the set is described referring to FIG. 46. FIG. 46 illustrates one example of a schematic configuration of a video set to which the present disclosure is applied.

In recent years, there has been progress in multi-functionalization in electronic apparatuses. In a case where, in development or manufacture of such an apparatus, a configuration of one portion of the apparatus is implemented, such as when the configuration is sold or provided, in most cases, the configuration is implemented not only in such a manner that one function is performed, but also as the set that is equipped with multiple functions that are possible as a result of combining multiple configurations in each of which a relevant function is performed.

A video set 1300 that is illustrated in FIG. 46 is configured in such a manner that the video set 1300 is multi-functionalized in this manner. The video set 1300 is a combination of a device that has a function associated with the coding or the decoding of the image (the function may be associated with either of or both of the coding and the decoding) and a device that has a different function associated with the function associated with the coding or the decoding.

As illustrated in FIG. 46, the video set 1300 has a module group including a video module 1311, an external memory 1312, a power management module 1313, and a front end module 1314, and the like, and devices, each of which has a relevant function, such as connectivity 1321, a camera 1322, and the sensor 1323.

The module is set to be a component that has a consistent function that results from grouping several component-based functions associated with one another. A specific physical configuration is arbitrary, but as an example of a specific physical configuration, it is considered that multiple processors, each having a function, electric circuit elements such as a resistor and a capacitor, and other devices may be arranged on a wiring substrate for combination into one piece. Furthermore, it is also considered that a module may be set to be combined with a different module, a processor, or the like to form a new module.

In a case of an example in FIG. 46, the video module 1311 is configured in such a manner as to combine functions associated with image processing, and has an application processor, a video processor, a broadband modem 1333, and an RF module 1334.

The processor is one that results from integrating a configuration having a predetermined function into a semiconductor chip by constructing a system-on-chip, and, for example, is referred to as a large scale integration (LSI) or the like. The configuration that has the predetermined function may be a logical circuit (hardware configuration), may be a program (software configuration) that is executed using a CPU, a ROM, a RAM, and the like, and may be a combination of the logical circuit and the program. For example, the processor may have the logical circuit and the CPU, the ROM, the RAM and the like, and some functions of the processor may be realized by the logical circuit (hardware configuration) and the other functions may be realized by the program (software configuration).

An application processor 1331 in FIG. 46 is a processor that executes an application associated with the image processing. Because the application that is executed by the application processor 1331 realizes a predetermined function, the application can not only perform arithmetic processing, but can control also a configuration inside and outside the video module 1311, for example, such as a video processor 1332.

The video processor 1332 is a processor that has a function associated with the coding/decoding (either of or both of the coding and decoding) of the image.

The broadband modem 1333 is a processor (or a module) that performs processing associated with wired or wireless (or wired and wireless) broadband communication that is performed through a broadband line such as the Internet or a public telephone line network. For example, the broadband modem 1333 converts data (a digital signal) to be transmitted into an analog signal by performing digital conversion and so forth, or converts a received analog signal into data (digital signal) by performing demodulating. For example, the broadband modem 1333 can digitally modulate/demodulate arbitrary information, such as image data that is processed by the video processor 1332 or a stream that results from coding the image data, an application program, and setting data.

The RF module 1334 is a module that performs frequency conversion, modulation and demodulation, amplification, filter processing, or the like on a radio frequency (RF) signal that is received and transmitted through an antenna. For example, the RF module 1334 generates the RF signal by performing the frequency conversion and the like on a baseband signal that is generated by the broadband modem 1333. Furthermore, for example, the RF module 1334 generates the baseband signal by performing the frequency conversion and the like on the RF signal that is received through the front end module 1314.

Moreover, as illustrated by a dotted line 1341 in FIG. 46, the application processor 1331 and the video processor 1332 may be configured to be combined into one processor.

The external memory 1312 is a module that has a storage device that is provided outside the video module 1311 and that is used by the video module 1311. A storage device of the external memory 1312 may be realized by any physical configuration. However, because generally, in most cases, the storage device is used in storing a large amount of data such as image data in units of frames, it is desirable that the storage device be realized by a large-capacity semiconductor memory that is comparatively low-priced, such as for example a dynamic random access memory (DRAM).

The power management module 1313 manages and controls supply of electric power to the video module 1311 (each configuration inside video module 1311).

The front end module 1314 is a module that provides a front end function (a circuit of a transmitting and receiving end at the antenna side) to the RF module 1334. As illustrated in FIG. 38, the front end module 1314, for example, has an antenna unit 1351, a filter 1352, and an amplification unit 1353.

The antenna unit 1351 has an antenna that transmits and receives a wireless signal, and a peripheral configuration. The antenna unit 1351 transmits a signal that is supplied from the amplification unit 1353, as the wireless signal, and supplies the received wireless signal to the filter 1352, as the electric signal (RF signal). The filter 1352 performs the filter processing and the like on the RF signal that is received through the antenna unit 1351, and supplies the post-processing RF signal to the RF module 1334. The amplification unit 1353 amplifies the RF signal that is supplied from the RF module 1334, and supplies the amplified RF signal to the antenna unit 1351.

The connectivity 1321 is a module that has a function associated with a connection to the outside. A physical configuration of the connectivity 1321 is arbitrary. For example, the connectivity 1321 has a configuration that has a communication function other than communication standards that are supported by the broadband modem 1333, an external input and output terminal, or the like.

For example, the connectivity 1321 may have a module that has a communication function in accordance with wireless communication standards such as Bluetooth (a registered trademark), IEEE 802.11 (for example, Wireless Fidelity (Wi-Fi, a registered trademark), Near Field Communication (NFC), and InfraRed Data Association (IrDA)), an antenna and the like that transmits and receives a signal in accordance with such wireless communication standards, or the like. Furthermore, for example, the connectivity 1321 may have a module that has the communication function in accordance with wired communication standards such as a universal serial bus (USB), and a high-definition multimedia interface (HDMI, a registered trademark), or a terminal in accordance with such wired communication standards. Moreover, for example, the connectivity 1321 may have other data (signal) transfer functions, such as an analog input and output terminal.

Moreover, the connectivity 1321 may include a device that is a transfer destination of the data (signal). For example, the connectivity 1321 may have a drive (including not only a drive that drives a removable medium but including also a hard disk, a solid state drive (SSD), a network attached storage (NAS), and the like) that performs reading or writing of data on a recording medium such as a magnetic disk, an optical disc, an optical magnetic disk, or a semiconductor memory. Furthermore, the connectivity 1321 may have a device (a monitor, a speaker, or the like) for outputting an image or a voice.

The camera 1322 is a module that images the photographic subject and has a function of obtaining the image data on the photographic subject. The image data that is obtained with the imaging by the camera 1322, for example, is supplied to the video processor 1332 for coding.

The sensor 1323 is a module that has a function of an arbitrary sensor, such as a voice sensor, an ultrasonic sensor, an optical sensor, an illuminance sensor, an infrared sensor, an image sensor, a rotation sensor, an angle sensor, an angular velocity sensor, a speed sensor, an acceleration sensor, an inclination sensor, a magnetism identification sensor, an impact sensor, or a temperature sensor. Data detected by the sensor 1323, for example, is supplied to the application processor 1331 and is used by the application and the like.

The configuration described above as the module may be realized as a processor, and conversely, the configuration described above as the processor may be realized as a module.

In the video set 1300 with the configuration described above, the present disclosure can be applied to the video processor 1332 described below. Therefore, the video set 1300 can be implemented as a set to which the present disclosure is applied.

(Configuration Example of a Video Processor)

Figure 47:
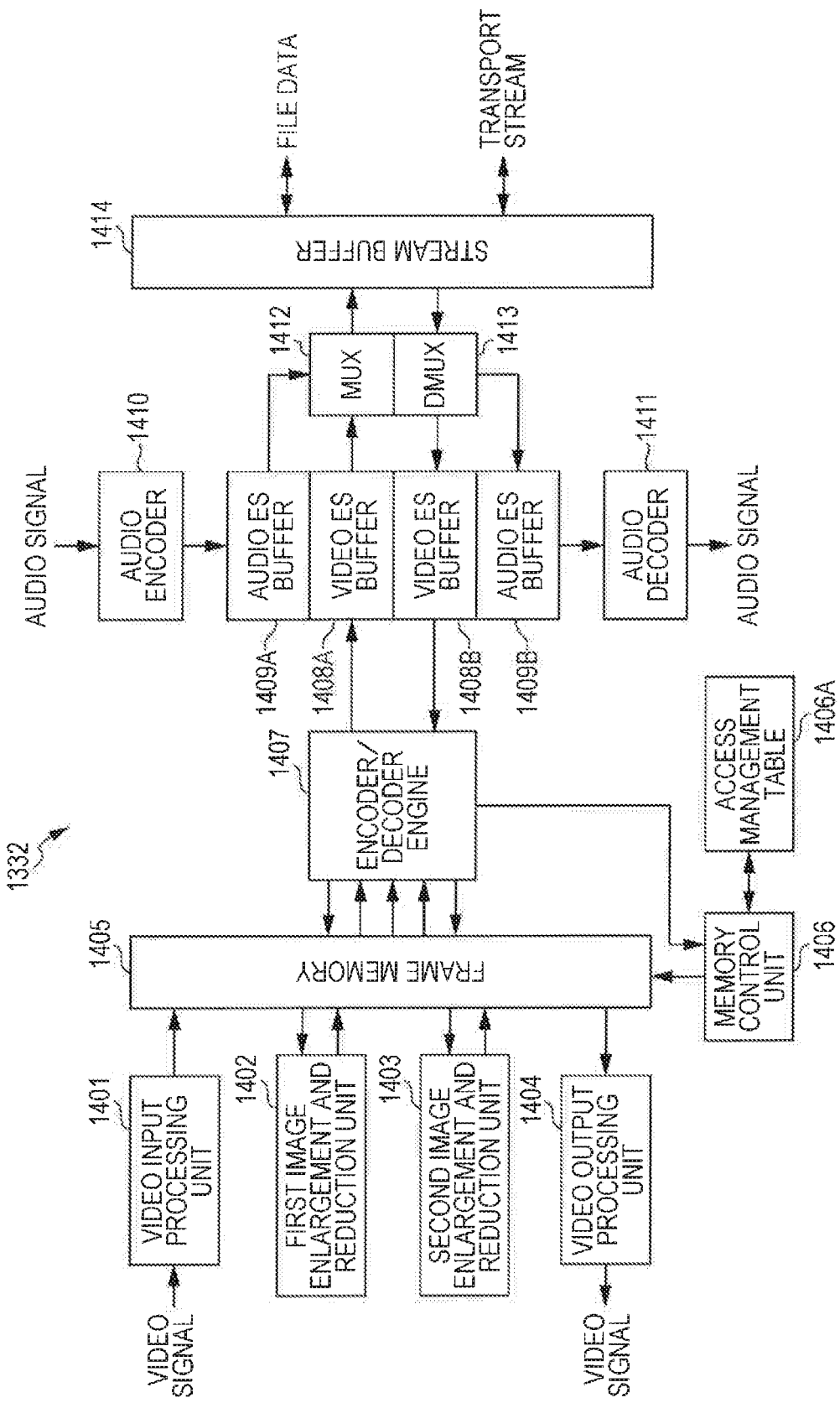
FIG. 47 is a diagram illustrating one example of a schematic configuration of a video processor to which the present disclosure is applied.

FIG. 47 illustrates one example of a schematic configuration of the video processor 1332 (in FIG. 46) to which the present disclosure is applied.

In a case of an example in FIG. 47, the video processor 1332 has a function of inputting a video signal and an audio signal and coding the video signal and the audio signal using a predetermined scheme, and a function of decoding the coded video data and the coded audio data, and outputting the video signal and the audio signal for reproducing.

As illustrated in FIG. 47, the video processor 1332 has a video input processing unit 1401, a first image enlargement and reduction unit 1402, a second image enlargement and reduction unit 1403, a video output processing unit 1404, a frame memory 1405, and a memory control unit 1406. Furthermore, the video processor 1332 has an encoding/decoding engine 1407, video elementary stream (ES) buffers 1408A and 1408B, and audio ES buffers 1409A and 1409B. Moreover, the video processor 1332 has an audio encoder 1410, an audio decoder 1411, a multiplexer (MUX) 1412, a demultiplexer (DMUX) 1413, and a stream buffer 1414.

The video input processing unit 1401, for example, obtains the video signal that is input from the connectivity 1321 (in FIG. 46), and converts the obtained video signal into digital image data. The first image enlargement and reduction unit 1402 performs format conversion or image enlargement and reduction processing on the image data. The second image enlargement and reduction unit 1403 performs image enlargement and reduction processing on the image data according to a preceding format that is output through the video output processing unit 1404, or performs format conversion, image enlargement reduction processing, or the like in the same manner as the first image enlargement and reduction unit 1402. The video output processing unit 1404 performs format conversion, conversion to an analog signal, or the like on the image data and outputs the resulting image data, as a reproduced video signal, for example, to the connectivity 1321 (in FIG. 46).

The frame memory 1405 is a memory for the image data, which is shared by the video input processing unit 1401, the first image enlargement and reduction unit 1402, the second image enlargement and reduction unit 1403, the video output processing unit 1404, and the encoding/decoding engine 1407. The frame memory 1405 is realized as a semiconductor memory, for example, such as a DRAM.

The memory control unit 1406 receives a synchronization signal from the encoding/decoding engine 1407, and controls writing/reading access to the frame memory 1405 according to a schedule for access to the frame memory 1405 that is written on an access management table 1406A. The access management table 1406A is updated by the memory control unit 1406 according to the processing tasks that are performed by the encoding/decoding engine 1407, the first image enlargement and reduction unit 1402, the second image enlargement and reduction unit 1403, and the like.

The encoding/decoding engine 1407 performs encoding processing of the image data and decoding processing of a video stream that is the data that results from coding the image data. For example, the encoding/decoding engine 1407 codes the image data that is read from the frame memory 1405, and sequentially writes the coded image data, as the video stream, to a video ES buffer 1408A. Furthermore, for example, the video stream is sequentially read from the video ES buffer 1408B for decoding, and is sequentially written, as the image data, to the frame memory 1405. In coding or decoding this, the encoding/decoding engine 1407 uses the frame memory 1405 as a working area. Furthermore, the encoding/decoding engine 1407 outputs the synchronization signal to the memory control unit 1406 at a timing for starting the processing every macroblock.

The video ES buffer 1408A buffers the video stream that is generated by the encoding/decoding engine 1407, and supplies the buffered video stream to a multiplexer (MUX) 1412. The video ES buffer 1408B buffers the video stream that is supplied from a demultiplexer (DMUX) 1413, and supplies the buffered video stream to the encoding/decoding engine 1407.

The audio ES buffer 1409A buffers an audio stream that is generated by the audio encoder 1410, and supplies the buffered audio stream to the multiplexer (MUX) 1412. An audio ES buffer 1409B buffers the audio stream that is supplied from the demultiplexer (DMUX) 1413, and supplies the buffered audio stream to the audio decoder 1411.

The audio encoder 1410, for example, performs digital conversion on the audio signal that is input from, for example, the connectivity 1321 (in FIG. 46) and the like, and for example, codes a result of the conversion using a predetermined scheme such as an MPEG audio scheme or Audio Code number 3 (AC3). The audio encoder 1410 writes the audio stream, which is data that results from coding the audio signal, to the audio ES buffer 1409A. The audio decoder 1411 decodes the audio stream that is supplied from the audio ES buffer 1409B, performs, for example, conversion to an analog signal and the like, and supplies the resulting audio stream, as the reproduced audio signal, for example, to the connectivity 1321 (in FIG. 46).

The multiplexer (MUX) 1412 multiplexes the video stream and the audio stream. This multiplexing method (that is, a format of the bitstream generated by the multiplexing) is arbitrary. Furthermore, in a case of the multiplexing, the multiplexer (MUX) 1412 can add predetermined header information and the like to the bitstream. In other words, the multiplexer (MUX) 1412 can convert the stream format by the multiplexing. For example, the multiplexer (MUX) 1412 multiplexes the video stream and the audio stream, and thus converts a result of the multiplexing into a transport stream that is the bitstream in a transfer format. Furthermore, for example, the multiplexer (MUX) 1412 multiplexes the video stream and the audio stream, and thus converts a result of the multiplexing into data (file data) into a file format.

The demultiplexer (DMUX) 1413 demultiplexes the bitstream that results from multiplexing the video stream and the audio stream, using a scheme corresponding to the multiplexing by the multiplexer (MUX) 1412. In other words, the demultiplexer (DMUX) 1413 extracts the video stream and the audio stream from the bitstream that is read from the stream buffer 1414 (separates the video stream and the audio stream from each other). In other words, the demultiplexer (DMUX) 1413 can convert the format of the stream by the demultiplexing (can inversely convert the result of the conversion by the multiplexer (MUX) 1412). For example, the demultiplexer (DMUX) 1413 can obtain the transport stream that is supplied, for example, from the connectivity 1321, the broadband modem 1333 (both in FIG. 46), or the like, through the stream buffer 1414, and can convert the obtained transport stream into the video stream and the audio stream by the demultiplexing. Furthermore, for example, the demultiplexer (DMUX) 1413 can obtain the file data that is read from various recording media, for example, by the connectivity 1321 (in FIG. 46), through the stream buffer 1414, and can convert the obtained file data into the video stream and the audio stream by the demultiplexing.

The stream buffer 1414 buffers the bitstream. For example, the stream buffer 1414 buffers the transport stream that is supplied from the multiplexer (MUX) 1412, and supplies the buffered transport stream, for example, to the connectivity 1321, the broadband modem 1333 (both in FIG. 46), or the like at a predetermined time or based on a request from the outside.

Furthermore, for example, the stream buffer 1414 buffers the file data that is supplied from the multiplexer (MUX) 1412, and supplies the buffered file data, for example, to the connectivity 1321 or the like (in FIG. 46), at a predetermined time or based on a request from the outside for recording on various recording media.

Moreover, the stream buffer 1414 buffers the transport stream that is obtained, for example, through the connectivity 1321, the broadband modem 1333 (both in FIG. 46), or the like, and supplies the buffered transport stream to the demultiplexer (DMUX) 1413 at predetermined time or based on a request from the outside.

Furthermore, the stream buffer 1414 buffers the file data that is read from various recording media, for example, in the connectivity 1321 (in FIG. 46), and supplies the buffered file data to the demultiplexer (DMUX) 1413 at a predetermined time or based on a request from the outside.

Next, an example of operation of the video processor 1332 with this configuration is described. For example, the video signal that is input from the connectivity 1321 (in FIG. 46) or the like to the video processor 1332 is converted into the digital image data in accordance with a predetermined scheme such as a 4:2:2Y/Cb/Cr scheme in the video input processing unit 1401, and is sequentially written to the frame memory 1405. The digital image data is read by the first image enlargement and reduction unit 1402 or the second image enlargement and reduction unit 1403, the format conversion to a predetermined scheme such as the 4:2:0Y/Cb/Cr scheme and the enlargement and reduction processing are performed on the digital image data, and is again written to the frame memory 1405. The image data is coded by the encoding/decoding engine 1407 and is written, as the video stream, to the video ES buffer 1408A.

Furthermore, the audio signal that is input from the connectivity 1321 (in FIG. 46) or the like to the video processor 1332 is coded by the audio encoder 1410, and is written, as the audio stream, to the audio ES buffer 1409A.

The video stream in the video ES buffer 1408A and the audio stream in the audio ES buffer 1409A are read and multiplexed by the multiplexer (MUX) 1412, and are converted into the transport stream, the file data, or the like. The transport stream that is generated by the multiplexer (MUX) 1412 is buffered by the stream buffer 1414, and then is output to an external network, for example, through the connectivity 1321 or the broadband modem 1333 (both in FIG. 46). Furthermore, the file data that is generated by the multiplexer (MUX) 1412 is buffered by the stream buffer 1414, and then is output, for example, to the connectivity 1321 (in FIG. 46), or the like and is recorded on various recording media.

Furthermore, the transport stream that is input from the external network to the video processor 1332, for example, through the connectivity 1321 or the broadband modem 1333 (both in FIG. 46), is buffered by the stream buffer 1414, and then is multiplexed by the demultiplexer (DMUX) 1413. Furthermore, the file data that is read from various recording media, for example, in the connectivity 1321 (in FIG. 46) or the like, and is input to the video processor 1332 is buffered by the stream buffer 1414, and then is multiplexed by the demultiplexer (DMUX) 1413. In other words, the transport stream or the file data that is input to the video processor 1332 is separated into the video stream and the audio stream by the demultiplexer (DMUX) 1413.

The audio stream is supplied to the audio decoder 1411 through the audio ES buffer 1409B, and is decoded, and thus the audio signal is reproduced. Furthermore, the video stream is written to the video ES buffer 1408B. Thereafter, the video stream is sequentially read by the encoding/decoding engine 1407, is decoded, and is written to the frame memory 1405. The second image enlargement and reduction unit 1403 performs the enlargement and reduction processing on the decoded image data, and the resulting decoded image data is written to the frame memory 1405. Then, the decoded image data is read by the video output processing unit 1404, is converted into a format in accordance with a predetermined scheme, such as a 4:2:2Y/Cb/Cr scheme, and is converted into an analog signal. Thus, the video signal is output to be reproduced.

In a case where the present disclosure is applied to the video processor 1332 with this configuration, the present disclosure according to each embodiment described above may be applied to the encoding/decoding engine 1407. In other words, for example, the encoding/decoding engine 1407 may have a function of the coding apparatus or the decoding apparatus according to the first embodiment. When this is done, the video processor 1332 can obtain the same effect as the one that is described above according to FIGS. 1 to 28.

Moreover, in the encoding/decoding engine 1407, the present disclosure (the functions of the image coding apparatus or the image decoding apparatus according to each embodiment described above) may be realized in hardware, for example, by a logical circuit or the like, may be realized in software, for example, by an embedded program or the like, and may be realized both in hardware and in software.

(Other Configuration Examples of the Video Processor)

Figure 48:
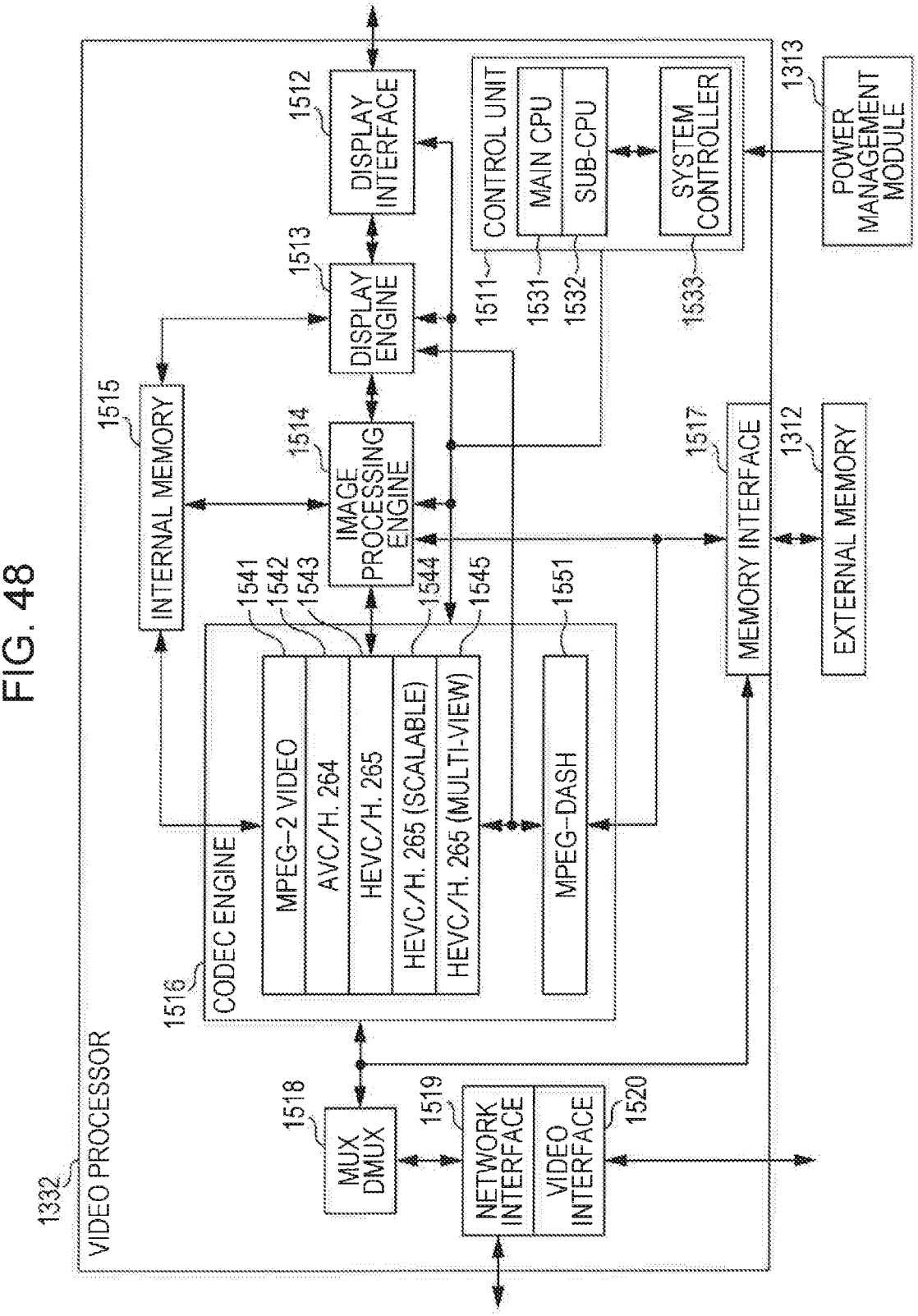
FIG. 48 is a diagram illustrating another example of the schematic configuration of the video processor to which the present disclosure is applied.

FIG. 48 illustrates other examples of a schematic configuration of the video processor 1332 (in FIG. 46) to which the present disclosure is applied. In a case of an example in FIG. 48, the video processor 1332 has a function of coding/decoding the video data using a predetermined scheme.

More specifically, as illustrated in FIG. 48, the video processor 1332 has a control unit 1511, a display interface 1512, a display engine 1513, an image processing engine 1514, and an internal memory 1515. Furthermore, the video processor 1332 has a codec engine 1516, a memory interface 1517, a multiplexr/demultiplexr (MUX/DMUX) 1518, a network interface 1519, and a video interface 1520.

The control unit 1511 controls operation of each of the processing units inside the video processor 1332, such as the display interface 1512, the display engine 1513, the image processing engine 1514, and the codec engine 1516.

As illustrated in FIG. 48, the control unit 1511 has, for example, a main CPU 1531, a sub-CPU 1532, and a system controller 1533. The main CPU 1531 executes a program or the like for controlling the operation of each processing unit inside the video processor 1332. The main CPU 1531 generates a control signal according to the program or the like, and supplies the generated program to each processing unit (that is, controls the operation of each processing unit). The sub-CPU 1532 plays a role that assists the main CPU 1531 with processing. For example, the sub-CPU 1532 executes a sub-process or a subroutine of a program or the like that is executed by the main CPU 1531. The system controller 1533 controls operation of each of the main CPU 1531 and the sub-CPU 1532, such as designating a program that is executed by the main CPU 1531 and the sub-CPU 1532.

Under the control of the control unit 1511, the display interface 1512 outputs the image data, for example, to the connectivity 1321 (in FIG. 46) or the like. For example, the display interface 1512 converts the image data of digital data into an analog signal, and outputs a result of the conversion, as the reproduced video signal, or the image data of digital data as it is, to the monitor apparatus or the like of the connectivity 1321 (in FIG. 46).

Under the control of the control unit 1511, the display engine 1513 performs various conversion processing tasks, such as format conversion, size conversion, and color gamut conversion, on the image data, in a manner that complies with hardware specifications of the monitor apparatus on which the image is displayed.

Under the control of the control unit 1511, the image processing engine 1514 performs predetermined image processing, such as for example, file processing for improving image quality, on the image data.

The internal memory 1515 is a memory that is shared by the display engine 1513, the image processing engine 1514, and the codec engine 1516, and that is provided inside the video processor 1332. The internal memory 1515 is used for transmission and reception of the data that are performed between the display engine 1513, the image processing engine 1514, and the codec engine 1516. For example, the internal memory 1515 stores data that is supplied from the display engine 1513, the image processing engine 1514, or the codec engine 1516, and supplies such data to the display engine 1513, the image processing engine 1514, or the codec engine 1516, whenever necessary (for example, in response to a request). The internal memory 1515 may be realized by any storage device. However, because generally, in most cases, the internal memory 1515 is used to store a small amount of data, such as image data in units of blocks or parameters, it is desirable that the internal memory 1515 be realized, for example, by a semiconductor memory that has a comparatively small capacity (for example, when compared with the external memory 1312) such as a static random access memory (SRAM), but has a fast response speed.

The codec engine 1516 performs processing associated with the coding or decoding of the image data. A coding/decoding scheme that is supported by the codec engine 1516 is arbitrary, and the number of the coding/decoding schemes may be 1 or 2 or greater. For example, the codec engine 1516 may include multiple codec functions in accordance with the coding/decoding scheme, and may perform the coding of the image data or the decoding of the code data, using one selected from among the multiple functions.

In an example in FIG. 48, the codec engine 1516 has, for example, MPEG-2 Video 1541, AVC/H.2641542, HEVC/H.2651543, HEVC/H.265 (scalable) 1544, HEVC/H.265 (multi-view) 1545, and MPEG-DASH 1551, as functional blocks of the processing associated with the codec.

MPEG-2 Video 1541 is a functional block that codes or decodes the image data using an MPEG-2 scheme. AVC/H.2641542 is a functional block that codes or decodes the image data using an AVC scheme. HEVC/H.2651543 is a functional block that codes or decodes the image data using the HEVC scheme. HEVC/H.265 (scalable) 1544 is a functional block that scalably codes the image data or scalably decodes the image data using the HEVC scheme. HEVC/H.265 (multi-view) 1545 is a functional block that codes the image data in a multi-view manner or decodes the image data in a multi-view manner using the HEVC scheme.

MPEG-DASH 1551 is a functional block that transmits and receives the image data using an MPEP-Dynamic Adaptive Streaming over HTTP (DASH) scheme. MPEG-DASH is a technology that performs streaming of video using HyperText Transfer Protocol (HTTP), and one feature of MPEG-DASH is that a suitable one is selected in units of segments from among multiple pieces of code data that have different prepared resolutions and the like and is transferred. MPEG-DASH 1551 performs control of generation of a stream in accordance with standards, control of transfer of the stream, or the like, and uses MPEG-2 Video 1541 to HEVC/H.265 (multi-view) 1545 that are described above, for the coding/decoding of the image data.

The memory interface 1517 is an interface for the external memory 1312. The data that is supplied from the image processing engine 1514 or the codec engine 1516 is supplied to the external memory 1312 through the memory interface 1517. Furthermore, the data that is read from the external memory 1312 is supplied to the video processor 1332 (the image processing engine 1514 or the codec engine 1516) through the memory interface 1517.

The multiplexer/demultiplexer (MUX/DMUX) 1518 performs the multiplexing or the demultiplexing of various pieces of data associated with the image, such as the bitstream of the code data, the image data, or the video signal. The multiplexing/demultiplexing method is arbitrary. For example, in a case of the multiplexing, the multiplexer/demultiplexer (MUX/DMUX) 1518 can not only arrange multiple pieces of data into one piece of data, but also can append predetermined header information and the like to one piece of data. Furthermore, in a case of the demultiplexing, the multiplexer/demultiplexer (MUX/DMUX) 1518 can not only divide one piece of data into multiple pieces of data, but also can append predetermined header information to each piece of data that results from the division. In other words, the multiplexer/demultiplexer (MUX/DMUX) 1518 can convert a data format by the multiplexing/the demultiplexing. For example, by multiplexing the bitstream, the multiplexer/demultiplexer (MUX/DMUX) 1518 can convert the bitstream into the transport stream that is a bitstream in a format for transfer, or into data (file data) in a file format for recording. Of course, inverse multiplexing of the bitstream by the demultiplexing is also possible.

The network interface 1519 is, for example, an interface to the broadband modem 1333, the connectivity 1321 (both in FIG. 46), or the like. The video interface 1520 is, for example, an interface to the connectivity 1321, the camera 1322 (both in FIG. 38), or the like.

Next, an example of operation of the video processor 1332 is described. For example, when the transport stream is received, for example, from the connectivity 1321 or the broadband modem 1333 (both in FIG. 38) through the external network, the transport stream is supplied through the network interface 1519 to the multiplexer/demultiplexer (MUX/DMUX) 1518, is demultiplexed, and is decoded by the codec engine 1516. For example, the image processing engine 1514 performs predetermined image processing on the image data that is obtained by the decoding by the codec engine 1516, the display engine 1513 performs predetermined conversion on the resulting image data, and the resulting image data is supplied, for example, to the connectivity 1321 (in FIG. 46) or the like through the display interface 1512. Thus, the image of the resulting image data is displayed on the monitor. Furthermore, for example, the image data that is obtained by the decoding by the codec engine 1516 is again coded by the codec engine 1516, is multiplexed by the multiplexer/demultiplexer (MUX/DMUX) 1518, is converted into the file data, is output, for example, to the connectivity 1321 (in FIG. 46) or the like through the video interface 1520, and is recorded on various recording media.

Moreover, for example, the file data of the code data, which is read from the recording medium which is not illustrated, by the connectivity 1321 (in FIG. 46) or the like, and which results from coding the image data, is supplied to the multiplexer/demultiplexer (MUX/DMUX) 1518 through the video interface 1520, is demultiplexed, and is decoded by the codec engine 1516. The image processing engine 1514 performs predetermined image processing on the image data that is obtained by the decoding by the codec engine 1516, the display engine 1513 performs predetermined conversion on the resulting image data, and the resulting image data is supplied, for example, to the connectivity 1321 (in FIG. 46) or the like through the display interface 1512. Thus, the image of the resulting image data is displayed on the monitor. Furthermore, for example, the image data that is obtained by the decoding by the codec engine 1516 is again coded by the codec engine 1516, is multiplexed by the multiplexer/demultiplexer (MUX/DMUX) 1518, is converted into the transport stream, is supplied, for example, to the connectivity 1321, the broadband modem 1333 (both in FIG. 46), or the like through the network interface 1519, and is transferred to a different apparatus which is not illustrated.

Moreover, the transmission and the reception of the image data or other pieces of data, between each processing unit inside the video processor 1332 are performed, for example, using the internal memory 1515 or the external memory 1312. Furthermore, the power management module 1313, for example, controls supply of electric power to the control unit 1511.

In a case where the present disclosure is applied to the video processor 1332 with this configuration, the present disclosure according to each embodiment described above may be applied to the codec engine 1516. In other words, for example, the codec engine 1516 may have a functional block that realizes the coding apparatus or the decoding apparatus according to the first embodiment. Moreover, for example, when the codec engine 1516 does this in this manner, the video processor 1332 can obtain the same effect as the one that is described referring to FIGS. 1 to 28.

Moreover, in the codec engine 1516, the present disclosure (the functions of the image coding apparatus or the image decoding apparatus according to each embodiment described above) may be realized in hardware, for example, by a logical circuit or the like, may be realized in software, for example, by an embedded program or the like, and may be realized both in hardware and in software.

The two examples of the configuration of the video processor 1332 are illustrated above, but the configuration of the video processor 1332 is arbitrary, and examples other than the two examples described above may be possible. Furthermore, the video processor 1332 may be configured from one semiconductor chip, but may be configured from multiple semiconductor chips. For example, the video processor 1332 may be a three-dimensional layered LSI that results from depositing multiple semiconductors. Furthermore, the video processor 1332 may be realized by multiple LSI's.

(Example of Application to the Apparatus)

The video set 1300 can be embedded into various apparatuses that process the image data. For example, the video set 1300 can be embedded into the television apparatus 900 (in FIG. 39), the portable telephone 920 (in FIG. 40), the recording and reproducing apparatus 940 (in FIG. 41), the imaging apparatus 960 (in FIG. 42), and the like. The apparatus into which the video set 1300 is embedded can obtain the same effect as the one that is described above referring to FIGS. 1 to 28.

Furthermore, the video set 1300 can be embedded, for example, into the terminal apparatus in the data transfer system 1000 in FIG. 43, such as the personal computer 1004, the AV apparatus 1005, the tablet device 1006, and the portable telephone 1007, the broadcasting station 1101 and the terminal apparatus 1102 in the data transfer system 1100 in FIG. 44, and the imaging apparatus 1201, and the scalable code data storage apparatus 1202 in the imaging system 1200 in FIG. 45, and the like. The apparatus into which the video set 1300 is embedded can obtain the same effect as the one that is described above referring to FIGS. 1 to 28.

Moreover, if any portion of each configuration of the video set 1300 described above includes the video processor 1332, the video set 1300 can be implemented as a configuration to which the present disclosure is applied. For example, only the video processor 1332 can be implemented as the video processor to which the present disclosure is applied. Furthermore, for example, the processor, the video module 1311, or the like that is indicated by a dotted line 1341 as illustrated above can be implemented as the processor, the module, or the like to which the present disclosure is applied. Moreover, for example, a combination of the video module 1311, the external memory 1312, the power management module 1313 and the front end module 1314 can be implemented as a video unit 1361 to which the present disclosure is applied. Even in a case of any configuration, the same effect as the one that is described referring to FIGS. 1 to 28 can be obtained.

In other words, in any configuration in which the video processor 1332 is included, the video processor 1332 can be embedded into various apparatuses that process the image data, as is the case with the video set 1300. For example, the video processor 1332, the processor indicated by a dotted line 1341, the video module 1311, or the video unit 1361 can be embedded into the television apparatus 900 (in FIG. 39), the portable telephone 920 (in FIG. 40), the recording and reproducing apparatus 940 (in FIG. 41), the imaging apparatus 960 (in FIG. 42), the terminal apparatus in the data transfer system 1000 in FIG. 43, such as the personal computer 1004, the AV apparatus 1005, the tablet device 1006, and the portable telephone 1007, the broadcasting station 1101 and the terminal apparatus 1102 in the data transfer system 1100 in FIG. 44, the imaging apparatus 1201 and the scalable code data storage apparatus 1202 in the imaging system 1200 in FIG. 45, and the like. Then, like in the case of the video set 1300, the apparatus into which any configuration to which the present disclosure is applied is embedded can obtain the same effect as the one that is described above referring to FIGS. 1 to 28.

Moreover, in the present specification, an example is described in which various pieces of information, such as the VPS and the SPS are multiplexed onto the code data and are transferred from the coding side to the decoding side. However, a technique of transferring the pieces of information is not limited to such an example. For example, the pieces of information may be transferred or recorded as an individual piece of data that is associated with the code data, without being multiplexed onto the code data. At this point, a phrase "is associated with" means that an image (which may be one portion of the image such as a slice or a block) included in the bitstream and information corresponding to the image can be linked with each other at the time of the decoding. That is, the information may be transferred on a transmission path that is independent of the code data. Furthermore, the information may be recorded on a recording medium (or a separate recording area on the same recording medium) that is independent of the code data. Moreover, the information and the code data, for example, may be associated with each other in arbitrary units, such as a unit of multiple frames, a unit of one frame, or a unit of one portion of a frame.

Furthermore, in the present specification, a system means an assembly of multiple constituent elements (an apparatus, a module (component) and the like), regardless of whether or not all the constituent elements are all in the same housing. Therefore, multiple apparatuses that are individually in different housings and are connected to one another over a network is a system, and one apparatus in which multiple modules are contained in one housing is a system as well.

Effects described in the present specification are only for illustration and thus are not limited to this illustration, and other effects may be present.

Embodiments according to the present disclosure are not limited to the embodiments described above, and various modifications are possible within a scope that does not depart from the gist of the present disclosure.

For example, the present disclosure can also be applied to a coding apparatus or the decoding apparatus that uses a coding scheme other than the HEVC scheme, which is capable of performing transformation skipping.

Furthermore, the present disclosure can be applied to the coding apparatus and the decoding apparatus that are used in a case where a code stream is received through a network medium such as a satellite broadcasting, a cable TV, the Internet, or a portable telephone, or in a case where processing is performed on a storage medium such as an optical disc, a magnetic disk, or a flash memory.

For example, according to the present disclosure, a cloud computing configuration in which over a network, one function is shared among multiple apparatuses and is jointly processed by the multiple apparatuses may be employed.

Furthermore, each step that is described referring to the flowchart may be shared among multiple apparatuses and jointly performed by the multiple apparatuses, in addition to being performed by one apparatus.

Moreover, in a case where multiple processing tasks are included in one step, the multiple processing tasks included in the one step may be shared among multiple apparatuses and jointly performed by the multiple apparatuses, in addition to being performed by one apparatus.

Suitable embodiments according to the present disclosure are described in detail above referring to the accompanying drawings, but the present disclosure is not limited to such an example. The devising of various alteration examples or modification examples within a scope of the technological idea described in a scope of each claim is obvious to a person of ordinary skill in the art relating to the present disclosure, and thus these are justifiably interpreted as falling into the technological scope of the present disclosure.

Moreover, according to the present technology, the following configurations can be employed.

(1) An image coding apparatus including: circuitry configured to set a correspondence relationship between resolution information and an enhancement layer, in a case where the number of the layers is greater than the number of multiple candidates for the resolution information on a layer of an image; and code the image and generate a bitstream including information relating to the set correspondence relationship.

(2) The image coding apparatus according to (1), wherein in a case where the number of the candidates is greater than the number of the layers, the correspondence relationship between the resolution information and the enhancement layer is set, beginning with a leading candidate.

(3) The image coding apparatus according to (1) or (2), wherein in a case where multiple candidates are present, the information is set that indicates whether or not the correspondence relationship between the resolution information and the enhancement layer is present.

(4) The image coding apparatus according to any one of (1) to (3), wherein in a case where the number of the candidates is 1, the updating of the correspondence relationship between the resolution information and the enhancement layer is prohibited in a sequence parameter set.

(5) An image coding method including: setting a correspondence relationship between resolution information and an enhancement layer, in a case where the number of the layers is greater than the number of multiple candidates for the resolution information on a layer of an image; and coding the image and generating a bitstream including information relating to the correspondence relationship that is set.

(6) An image decoding apparatus including: circuitry configured to extract, from a bitstream generated by coding an image, information relating to a correspondence relationship between resolution information and an enhancement layer, wherein the correspondence information is set in a case where the number of the layers is greater than the number of multiple candidates for the resolution information on a layer of the image; and decode the bitstream using the extracted information relating to the correspondence relationship between the resolution information and the enhancement layer.

(7) The image decoding apparatus according to (6), wherein in a case where the number of the candidates is greater than the number of the layers, the correspondence relationship between the resolution information and the enhancement layer is set, beginning with a leading candidate.

(8) The image decoding apparatus according to (6) or (7), wherein in a case where multiple candidates are present, information is set that indicates whether or not the correspondence relationship between the resolution information and the enhancement layer is present.

(9) The image decoding apparatus according to any one of (6) to (8), wherein in a case where the number of the candidates is 1, updating of the correspondence relationship between the resolution information and the enhancement layer in a sequence parameter set is prohibited.

(10) An image decoding method including: extracting, from a bitstream generated by coding an image, information relating to a correspondence relationship between resolution information and an enhancement layer, wherein the correspondence information is set in a case where the number of the layers is greater than the number of multiple candidates for the resolution information on a layer of the image; and decoding the bitstream using the extracted information relating to the correspondence relationship between the resolution information and the enhancement layer.

(11) A non-transitory computer-readable medium having embodied thereon a program, which when executed by a computer causes the computer to execute an image coding method, the method including: setting a correspondence relationship between resolution information and an enhancement layer, in a case where the number of the layers is greater than the number of multiple candidates for the resolution information on a layer of an image; and coding the image and generating a bitstream including information relating to the correspondence relationship that is set.

(12) A non-transitory computer-readable medium having embodied thereon a program, which when executed by a computer causes the computer to execute an image decoding method, the method including: extracting, from a bitstream generated by coding an image, information relating to a correspondence relationship between resolution information and an enhancement layer, wherein the correspondence information is set in a case where the number of the layers is greater than the number of multiple candidates for the resolution information on a layer of the image; and decoding the bitstream using the extracted information relating to the correspondence relationship between the resolution information and the enhancement layer.

(13) An image coding apparatus including: a setting unit configured to set a correspondence relationship between resolution information and an enhancement layer, in a case where the number of the layers is greater than the number of multiple candidates for the resolution information on a layer of an image; and a coding unit configured to code the image and generate a bitstream including information relating to the correspondence relationship that is set by the setting unit.

(14) The image coding apparatus according to (13), wherein the setting unit and the coding unit are each implemented via at least one processor.

(15) The image coding apparatus according to (13) or (14), wherein in a case where the number of the candidates is greater than the number of the layers, the setting unit sets the correspondence relationship between the resolution information and the enhancement layer, beginning with a leading candidate.

(16) The image coding apparatus according to any one of (13) to (15), wherein in a case where multiple candidates are present, the setting unit sets information that indicates whether or not the correspondence relationship between the resolution information and the enhancement layer is present.

(17) The image coding apparatus according to any one of (13) to (16), wherein in a case where the number of the candidates is 1, the setting unit prohibits updating of the correspondence relationship between the resolution information and the enhancement layer in a sequence parameter set.

(18) An image coding apparatus including: circuitry configured to set a correspondence relationship between resolution information and an enhancement layer, in a case where the number of the layers is greater than the number of multiple candidates for the resolution information on a layer of an image; automatically map the layers and the multiple candidates onto each other; and code the image and generate a bitstream including information relating to the set correspondence relationship.

(19) An image coding apparatus including: circuitry configured to set a correspondence relationship between Rep_formats on a layer of an image and an enhancement layer, in a case where the number of Rep_formats is less than the number of the layers; and code the image and generate a bitstream including information relating to the set correspondence relationship, wherein in a case where the number of Rep_formats is less than the number of the layers, the correspondence relationship between the Rep_formats and the enhancement layer is set, beginning with a leading candidate, and an automatic mapping is performed between the Rep_formats and the layers.

(20) An image coding apparatus including: a setting unit that sets a correspondence relationship between resolution information and an enhancement layer in a case where multiple candidates for the resolution information on a layer of an image are present, and the number of the layers is greater than the number of the candidates, a coding unit that codes the image and generates a bitstream; and a transfer unit that transfers information relating to the correspondence relationship that is set by the setting unit and the bitstream that is generated by the coding unit.

(21) The image coding apparatus according to (20), in which in a case where the number of the candidates is greater than the number of the layers, the setting unit sets the correspondence relationship between the resolution information and the enhancement layer, beginning with the leading candidate.

(22) The image coding apparatus according to (20) or (21), in which in a case where multiple candidates are present, the setting unit sets information that indicates whether or not the correspondence relationship between the resolution information and the enhancement layer is present.

(23) The image coding apparatus according to any one of (20) to (22), in which in a case where the number of the candidates is 1, the setting unit prohibits updating of the correspondence relationship between the resolution information and the enhancement layer in a sequence parameter set.

(24) An image coding method causing an image coding apparatus to perform: setting a correspondence relationship between resolution information and an enhancement layer in a case where multiple candidates for the resolution information on a layer of an image are present, and the number of the layers is greater than the number of the candidates; coding the image and generating a bitstream; and transferring information relating to the correspondence relationship that is set and the generated bitstream.

(25) An image decoding apparatus including: a receiving unit that receives a bitstream generated by coding an image; an extraction unit that extracts information relating to a correspondence relationship between resolution information and an enhancement layer from the bitstream received by the receiving unit, which is set in a case where multiple candidates for the resolution information on a layer of the image are present, and the number of the layers is greater than the number of the candidates; and a decoding unit that decodes the bitstream received by the receiving unit and generates the image, using the information relating to the correspondence relationship between the resolution information and the enhancement layer, which is extracted by the extraction unit.

(26) The image decoding apparatus according to (25), in which in a case where the number of the candidates is greater than the number of the layers, the correspondence relationship between the resolution information and the enhancement layer is set, beginning with the leading candidate.

(27) The image decoding apparatus according to (25) or (26), in which in a case where multiple candidates are present, information is set that indicates whether or not the correspondence relationship between the resolution information and the enhancement layer is present.

(28) The image decoding apparatus according to any one of (25) to (27), in which in a case where the number of the candidates is 1, updating of the correspondence relationship between the resolution information and the enhancement layer in a sequence parameter set is prohibited.

(29) An image decoding method causing an image decoding apparatus to perform: receiving a bitstream generated by coding an image; extracting information relating to a correspondence relationship between resolution information and an enhancement layer from the bitstream received by the receiving unit, which is set in a case where multiple candidates for the resolution information on a layer of the image are present, and the number of the layers is greater than the number of the candidates; and decoding the bitstream and generating the image, using the extracted information relating to the correspondence relationship between the resolution information and the enhancement layer.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

10 CODING APPARATUS
11 SETTING UNIT
12 CODING UNIT
13 TRANSFER UNIT
110 DECODING APPARATUS
111 RECEIVING UNIT
112 EXTRACTION UNIT
113 DECODING UNIT

The invention claimed is:

1. An image decoding apparatus comprising:
circuitry configured to:
extract, from a bitstream generated by coding an image, information relating to a correspondence relationship between resolution information and an enhancement layer, wherein the correspondence information is set to a first correspondence relationship in a case where a number of enhancement layers is greater than a number of candidates for the resolution information on a layer of the image, and set to a second correspondence relationship different than the first correspondence relationship in a case where the number of candidates is greater than the number of enhancement layers; and
decode the bitstream using the extracted information relating to the correspondence relationship between the resolution information and the enhancement layer;
wherein the second correspondence relationship is set, beginning with a leading candidate, and
wherein the second correspondence relationship is a correspondence relationship between each of the candidates and at least one of the enhancement layers so that at least one of the candidates corresponds to at least two of the enhancement layers.

2. The image decoding apparatus according to claim 1, wherein the first correspondence relationship is a one-to-one correspondence so that at least one of the candidates do not correspond to at least two of the enhancement layers.

3. The image decoding apparatus according to claim 1, wherein in a case where multiple candidates are present, information is set that indicates whether or not the correspondence relationship between the resolution information and the enhancement layer is present.

4. The image decoding apparatus according to claim 1, wherein in a case where the number of the candidates is 1, updating of the correspondence relationship between the resolution information and the enhancement layer in a sequence parameter set is prohibited.

5. The image decoding apparatus according to claim 1, wherein each of the enhancement layers is set to correspond to at least one of the candidates.

6. An image decoding method comprising:
extracting, from a bitstream generated by coding an image, information relating to a correspondence relationship between resolution information and an enhancement layer, wherein the correspondence information is set to a first correspondence relationship in a case where a number of enhancement layers is greater than a number of candidates for the resolution information on a layer of the image, and set to a second correspondence relationship different than the first correspondence relationship in a case where the number of candidates is greater than the number of enhancement layers; and
decoding the bitstream using the extracted information relating to the correspondence relationship between the resolution information and the enhancement layer,
wherein the second correspondence relationship is set, beginning with a leading candidate, and
wherein the second correspondence relationship is a correspondence relationship between each of the candidates and at least one of the enhancement layers so that at least one of the candidates corresponds to at least two of the enhancement layers.

7. The image decoding method according to claim 6, wherein the first correspondence relationship is a one-to-one correspondence so that at least one of the candidates do not correspond to at least two of the enhancement layers.

8. The image decoding method according to claim 6, wherein in a case where multiple candidates are present, information is set that indicates whether or not the correspondence relationship between the resolution information and the enhancement layer is present.

9. The image decoding method according to claim 6, wherein in a case where the number of the candidates is 1, updating of the correspondence relationship between the resolution information and the enhancement layer in a sequence parameter set is prohibited.

10. The image decoding method according to claim 6, wherein each of the enhancement layers is set to correspond to at least one of the candidates.

11. A non-transitory computer-readable medium having embodied thereon a program, which when executed by a computer causes the computer to execute a method, the method comprising:
extracting, from a bitstream generated by coding an image, information relating to a correspondence relationship between resolution information and an enhancement layer, wherein the correspondence information is set to a first correspondence relationship in a case where a number of enhancement layers is greater than a number of candidates for the resolution information on a layer of the image, and set to a second correspondence relationship different than the first correspondence relationship in a case where the number of candidates is greater than the number of enhancement layers; and decoding the bitstream using the extracted information relating to the correspondence relationship between the resolution information and the enhancement layer, wherein the second correspondence relationship is set, beginning with a leading candidate, and wherein the second correspondence relationship is a correspondence relationship between each of the candidates and at least one of the enhancement layers so that at least one of the candidates corresponds to at least two of the enhancement layers.

12. The non-transitory computer-readable medium according to claim 11, wherein the first correspondence relationship is a one-to-one correspondence so that at least one of the candidates do not correspond to at least two of the enhancement layers.

13. The non-transitory computer-readable medium according to claim 11, wherein in a case where multiple candidates are present, information is set that indicates whether or not the correspondence relationship between the resolution information and the enhancement layer is present.

14. The non-transitory computer-readable medium according to claim 11, wherein in a case where the number of the candidates is 1, updating of the correspondence relationship between the resolution information and the enhancement layer in a sequence parameter set is prohibited.

15. The non-transitory computer-readable medium according to claim 11, wherein each of the enhancement layers is set to correspond to at least one of the candidates.

* * * * *